(12) United States Patent
Sugita et al.

(10) Patent No.: US 12,277,807 B2
(45) Date of Patent: Apr. 15, 2025

(54) ELECTRIC VERTICAL TAKEOFF AND LANDING AIRCRAFT AND CONTROL DEVICE FOR ELECTRIC VERTICAL TAKEOFF AND LANDING AIRCRAFT

(71) Applicant: DENSO CORPORATION, Kariya (JP)

(72) Inventors: Syun Sugita, Kariya (JP); Akira Iwakawa, Kariya (JP); Mariko Hashimoto, Kariya (JP); Yuuichi Takemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 17/678,156

(22) Filed: Feb. 23, 2022

(65) Prior Publication Data

US 2022/0180670 A1   Jun. 9, 2022

Related U.S. Application Data

(63) Continuation of application No. PCT/JP2020/030598, filed on Aug. 11, 2020.

(30) Foreign Application Priority Data

| Aug. 28, 2019 | (JP) | 2019-155209 |
| Aug. 28, 2019 | (JP) | 2019-155214 |
| Jun. 9, 2020 | (JP) | 2020-099899 |

(51) Int. Cl.
*G07C 5/00* (2006.01)
*B64C 29/00* (2006.01)
*G07C 5/08* (2006.01)

(52) U.S. Cl.
CPC .............. *G07C 5/006* (2013.01); *B64C 29/00* (2013.01); *G07C 5/0808* (2013.01); *G07C 5/085* (2013.01)

(58) Field of Classification Search
CPC ...... G07C 5/006; G07C 5/0808; G07C 5/085; B64C 29/00; B64C 29/0025; B64D 31/14;
(Continued)

(56) References Cited

U.S. PATENT DOCUMENTS 7,266,938 B1 * 9/2007 Hauser .................. A01D 34/64
56/11.8
11,820,525 B2 * 11/2023 Arnold .................. B64D 27/24
(Continued)

FOREIGN PATENT DOCUMENTS

| CN | 106655509 A | * | 5/2017 |
| CN | 206224250 | * | 6/2017 |

(Continued)

OTHER PUBLICATIONS

Oct. 27, 2020 Search Report issued in International Patent Application No. PCT/JP2020/030598.

*Primary Examiner* — Redhwan K Mawari
(74) *Attorney, Agent, or Firm* — Oliff PLC

(57) ABSTRACT

An electric vertical takeoff and landing aircraft with a plurality of electric drive systems each including a drive motor for turning a rotor and a drive unit for driving the drive motor includes: a drive information detection unit that detects, for each of the plurality of electric drive systems, drive information including at least one of motor information serving as an indicator of the deterioration state of the drive motor and drive unit information serving as an indicator of the deterioration state of the drive unit; and a maintenance necessity detection unit that detects the necessity or lack of necessity of maintenance on each of the plurality of electric drive systems based on the detected drive information.

19 Claims, 31 Drawing Sheets

(58) Field of Classification Search
CPC .............. B64D 2045/0085; B64D 45/00; B64D 27/24; B64F 5/60
See application file for complete search history.

(56) References Cited

U.S. PATENT DOCUMENTS

| | | |
|---|---|---|
| 2005/0033557 A1 | 2/2005 | House et al. |
| 2015/0292527 A1* | 10/2015 | Marger .................. F15B 11/22 60/494 |
| 2017/0259944 A1 | 9/2017 | Malta et al. |
| 2018/0170535 A1* | 6/2018 | Sato ....................... B64C 27/57 |
| 2018/0174383 A1* | 6/2018 | Diaz .................. G01M 13/028 |
| 2018/0183379 A1* | 6/2018 | Yokoyama .............. H02P 27/08 |
| 2018/0237148 A1* | 8/2018 | Hehn ...................... B64D 31/06 |
| 2018/0357840 A1* | 12/2018 | Gansler ................ G07C 5/0808 |
| 2019/0080524 A1* | 3/2019 | Tucker ..................... B64F 5/60 |
| 2019/0250206 A1* | 8/2019 | Noguchi ............ G06F 16/9035 |
| 2020/0010187 A1* | 1/2020 | Bevirt ..................... B64D 27/34 |
| 2020/0398994 A1 | 12/2020 | Hehn et al. |

FOREIGN PATENT DOCUMENTS

| | | | | |
|---|---|---|---|---|
| CN | 109506330 A | * | 3/2019 | .............. F24F 11/32 |
| CN | 109733641 A | * | 5/2019 | |
| JP | 2017-132461 A | | 8/2017 | |
| JP | 2017-210111 A | | 11/2017 | |
| JP | 7052347 B2 | * | 12/2017 | |
| WO | 2018/061823 A1 | | 4/2018 | |
| WO | WO-2020152613 A1 | * | 7/2020 | .............. B60L 15/20 |

\* cited by examiner

ELECTRIC VERTICAL TAKEOFF AND LANDING AIRCRAFT AND CONTROL DEVICE FOR ELECTRIC VERTICAL TAKEOFF AND LANDING AIRCRAFT

CROSS-REFERENCE TO RELATED APPLICATION

This application is the U.S. bypass application of International Application No. PCT/JP2020/030598 filed on Aug. 11, 2020 which designated the U.S. and claims the benefit of priority from earlier Japanese Patent Applications No. 2019-155209 filed on Aug. 28, 2019, No. 2020-099899 filed on Jun. 9, 2020, and No. 2019-155214 filed on Aug. 28, 2019, the entire descriptions of all of which are incorporated herein by reference.

TECHNICAL FIELD

The present disclosure relates to control over an electric vertical takeoff and landing aircraft.

BACKGROUND

In recent years, manned or unmanned aircraft referred to as electric vertical takeoff and landing aircraft (eVTOLs) have been developed increasingly as aircraft different from airplanes equipped with a gas turbine engine. An electric vertical takeoff and landing aircraft includes a plurality of electric drive systems (EDSs) each including a motor, and the multiple motors turn multiple rotors to produce lift and thrust for the aircraft body. To ensure safety, it is desirable to replace or inspect the electric drive systems as appropriate. JP 2017-159891 A describes the need to replace an airplane engine in cases where the exhaust gas temperature of the engine exceeds a predetermined value.

SUMMARY

An aspect of the present disclosure provides an electric vertical takeoff and landing aircraft. The electric vertical takeoff and landing aircraft is an electric vertical takeoff and landing aircraft with a plurality of electric drive systems each including a drive motor for turning a rotor and a drive unit for driving the drive motor. The electric vertical takeoff and landing aircraft includes: a drive information detection unit that detects, for each of the plurality of electric drive systems, drive information including at least one of motor information serving as an indicator of the deterioration state of the drive motor and drive unit information serving as an indicator of the deterioration state of the drive unit; and a maintenance necessity detection unit that detects the necessity or lack of necessity of maintenance on each of the plurality of electric drive systems based on the detected drive information.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

An electric vertical takeoff and landing aircraft may incorporate more motors and rotors than the engines and the propellers included in an airplane. An electric vertical takeoff and landing aircraft may also incorporate a combination of multiple rotors individually having different functions, such as a lifting rotor intended mainly to produce the lift for the body and a cruising rotor intended mainly to produce the thrust for the body. The present inventors have found that in such an electric vertical takeoff and landing aircraft, different electric drive systems may have different maintenance timings. Thus, there is a desire for a technique that can appropriately determine the maintenance timing for each of the multiple electric drive systems.

The present disclosure may be embodied in the aspects described below.

An aspect of the present disclosure provides an electric vertical takeoff and landing aircraft. The electric vertical takeoff and landing aircraft is an electric vertical takeoff and landing aircraft with a plurality of electric drive systems each including a drive motor for turning a rotor and a drive unit for driving the drive motor. The electric vertical takeoff and landing aircraft includes: a drive information detection unit that detects, for each of the plurality of electric drive systems, drive information including at least one of motor information serving as an indicator of the deterioration state of the drive motor and drive unit information serving as an indicator of the deterioration state of the drive unit; and a maintenance necessity detection unit that detects the necessity or lack of necessity of maintenance on each of the plurality of electric drive systems based on the detected drive information.

The electric vertical takeoff and landing aircraft in this aspect includes the drive information detection unit that detects, for each of the plurality of electric drive systems, the drive information including at least one of the motor information serving as an indicator of the deterioration state of the drive motor and the drive unit information serving as an indicator of the deterioration state of the drive unit, and the maintenance necessity detection unit that detects the necessity or lack of necessity of maintenance on each of the plurality of electric drive systems based on the detected drive information. This configuration allows appropriate determination of the maintenance timing for each of the plurality of electric drive systems that may have different maintenance timings.

The present disclosure may also be embodied in a variety of aspects. For example, the disclosure may be embodied in aspects such as a control device for an electric vertical takeoff and landing aircraft, and a control method for an electric vertical takeoff and landing aircraft.

A. First Embodiment

A-1. Device Configuration

Figure 1:
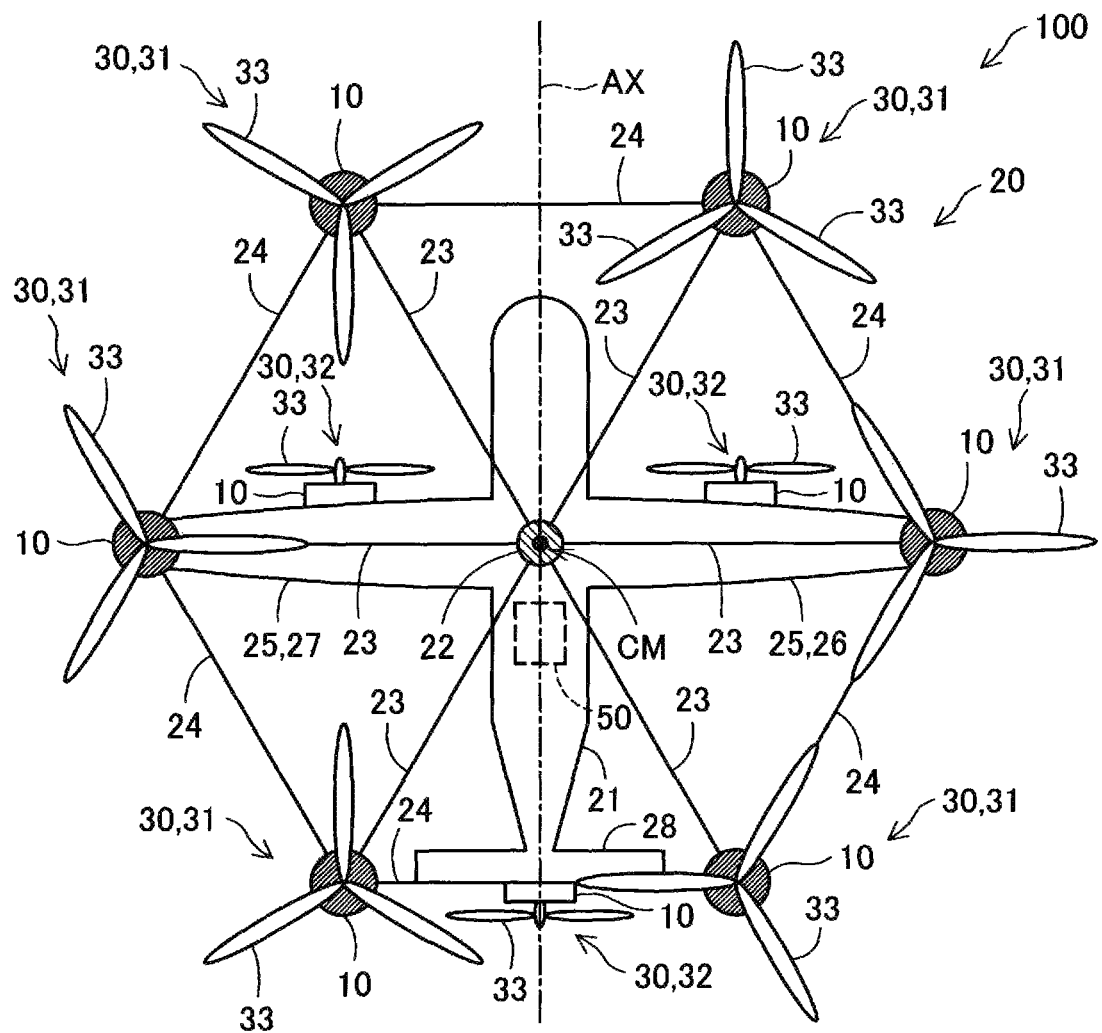
FIG. 1 is a schematic top view illustrating the external structure of an electric vertical takeoff and landing aircraft.
Figure 2:
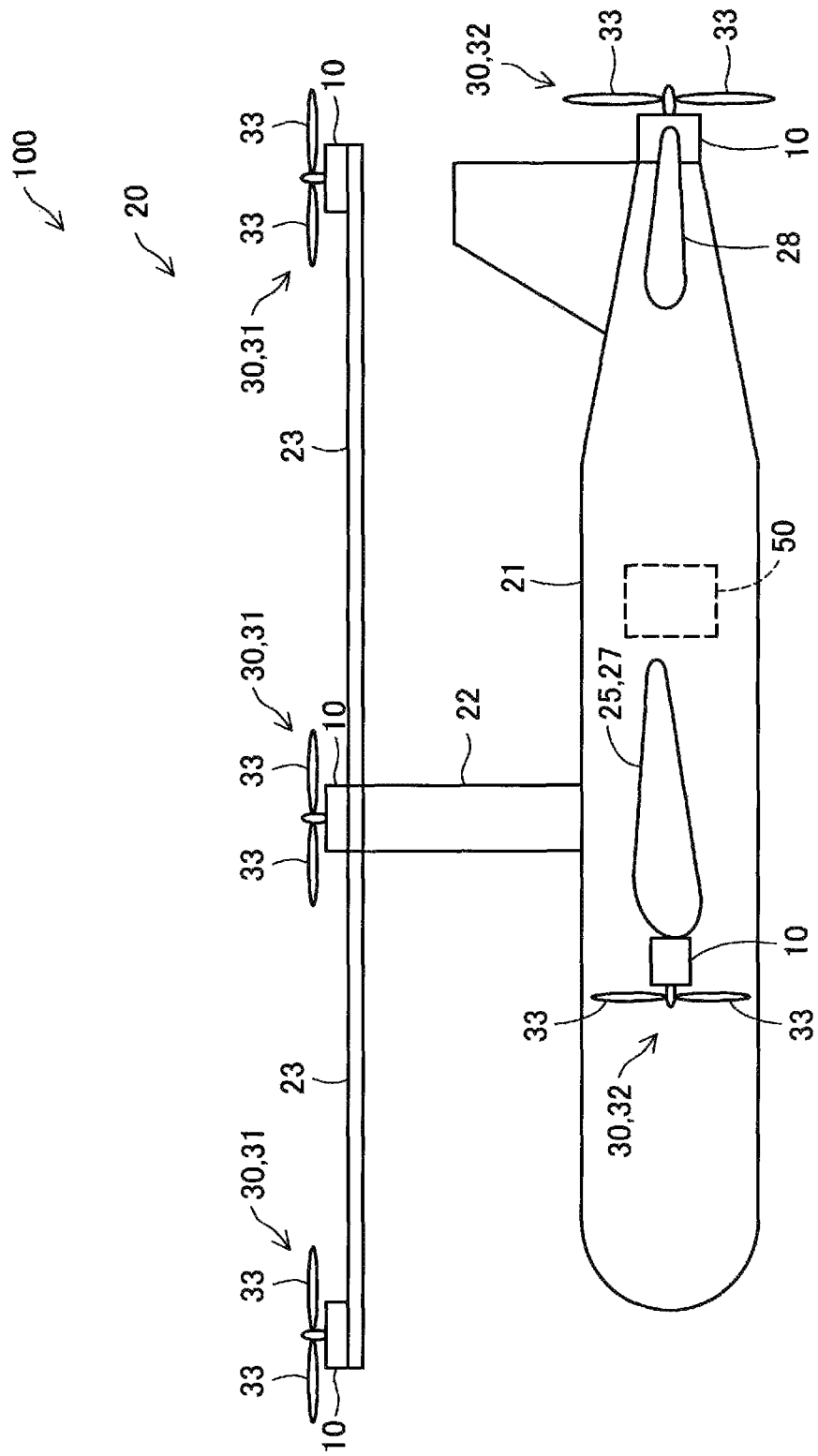
FIG. 2 is a schematic side view illustrating the external structure of the electric vertical takeoff and landing aircraft.

An electric vertical takeoff and landing aircraft 100 (hereinafter also referred to as an eVTOL 100) shown in FIGS. 1 and 2 is driven by electricity and structured as a manned aircraft that can take off and land vertically. The eVTOL 100 includes a body 20, a plurality of rotors 30, and a plurality of electric drive systems 10 (hereinafter also referred to as the EDSs 10) that turn the corresponding rotors 30. The eVTOL 100 according to the present embodiment includes nine rotors 30 and nine EDSs 10.

The body 20 corresponds to the parts of the eVTOL 100 excluding the nine rotors 30 and the nine EDSs 10. The body 20 includes an aircraft main body 21, a prop 22, six first supports 23, six second supports 24, main wings 25, and a tail assembly 28.

The aircraft main body 21 forms the fuselage of the eVTOL 100. The aircraft main body 21 is bilaterally symmetrical about a body axis AX serving as the axis of symmetry. In the present embodiment, the term "body axis AX" refers to an axis passing through a body gravity center CM and extending in the front-and-rear direction of the eVTOL 100. The term "body gravity center CM" refers to the position of the gravity center of the eVTOL 100 in an empty weight condition without any passengers. The aircraft main body 21 has an internal passenger compartment (not shown).

The prop 22 has a substantially columnar outside shape extending in a vertical direction, and is secured on the top of the aircraft main body 21. In the present embodiment, the prop 22 is positioned at the body gravity center CM of the eVTOL 100 as viewed in a vertical direction. One end of each of the six first supports 23 is fixed to the upper end of the prop 22. The six first supports 23 each have a substantially rodlike outside shape, and are arranged radially at equal angles with respect to each other in a manner to extend along a plane orthogonal to a vertical direction. Each first support 23 has a rotor 30 and an EDS 10 placed on the other end, that is, the end positioned opposite the prop 22. The six second supports 24 each have a substantially rodlike outside shape and connect the other ends of adjacent first supports 23 (the ends not connected to the prop 22).

The main wings 25 include a right wing 26 and a left wing 27. The right wing 26 extends rightward from the aircraft main body 21. The left wing 27 extends leftward from the aircraft main body 21. The tail assembly 28 is formed at the rear end of the aircraft main body 21. The right wing 26, the left wing 27, and the tail assembly 28 are each equipped with one rotor 30 and one EDS 10.

Six of the nine rotors 30 are arranged at the ends of the second supports 24 and serve as lifting rotors 31 intended mainly to produce the lift for the body 20. The other three of the nine rotors 30 are arranged on the right wing 26, the left wing 27, and the tail assembly 28 on a one-to-one basis, and serve as cruising rotors 32 intended mainly to produce the thrust for the body 20. The rotors 30 turn about their own rotation axes independently of each other. Each rotor 30 includes three blades 33 arranged at equal angles with respect to each other.

The nine EDSs 10 are configured as drive devices intended to turn the corresponding rotors 30. Six of the nine EDSs 10 turn the corresponding lifting rotors 31. The other three of the nine EDSs 10 turn the corresponding cruising rotors 32.

Figure 3:
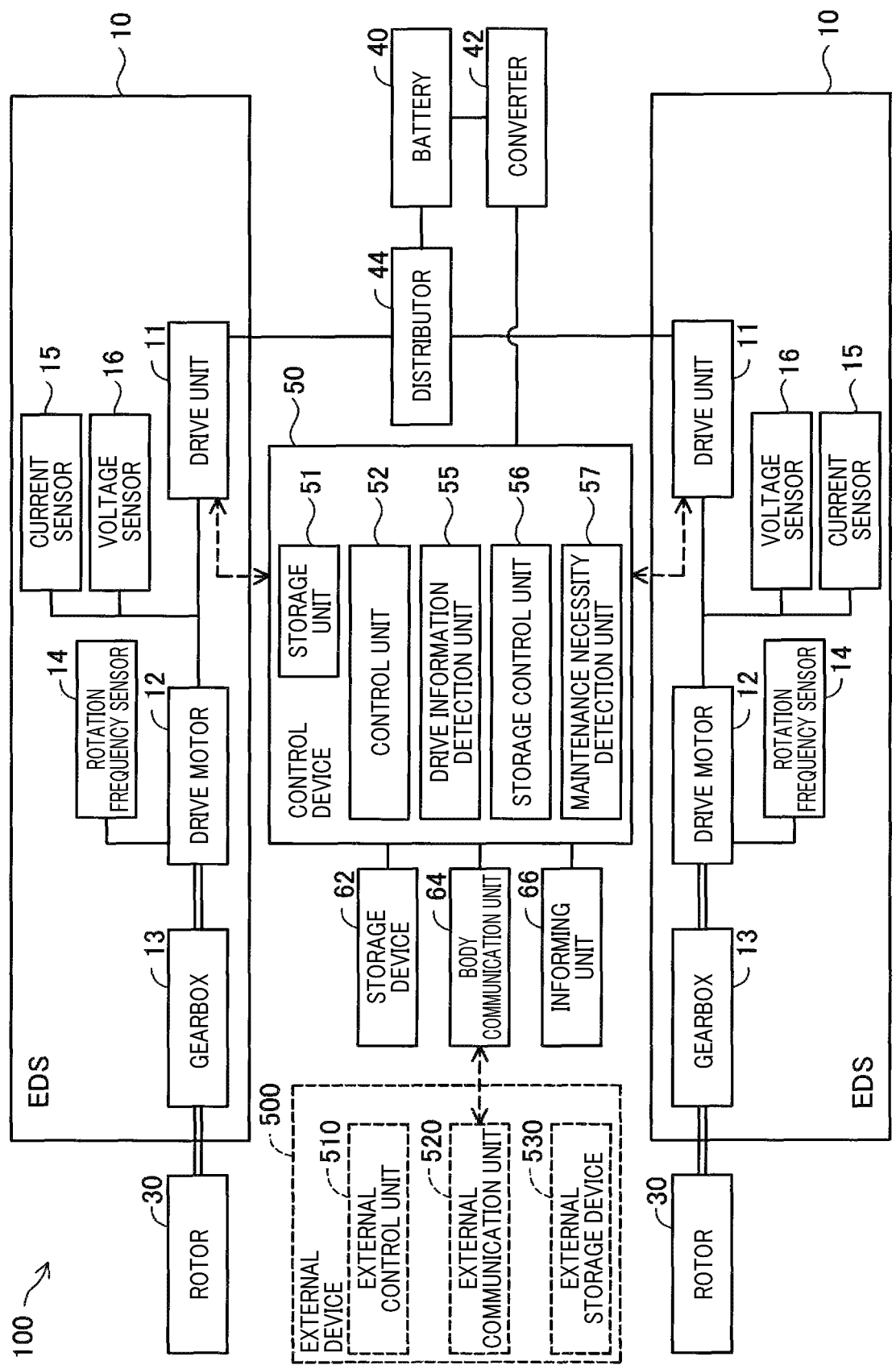
FIG. 3 is a schematic block diagram illustrating the configuration of the electric vertical takeoff and landing aircraft.

As shown in FIG. 3, each EDS 10 includes a drive unit 11, a drive motor 12, a gearbox 13, a rotation frequency sensor 14, a current sensor 15, and a voltage sensor 16. The eVTOL 100 further includes a battery 40, a converter 42, a distributor 44, a control device 50, a storage device 62, a body communication unit 64, and an notification unit 66. In FIG. 3, of the nine rotors 30 and the nine EDSs 10 included in the eVTOL 100, two rotors 30 and two EDSs 10 are shown as representative items for convenience of illustration.

The drive unit 11 is configured as an electronic device including an inverter circuit (not shown) and a controller (not shown) that controls the inverter circuit. The inverter circuit is a power device such as an insulated gate bipolar transistor (IGBT) or a metal-oxide-semiconductor field-effect transistor (MOSFET), and feeds a driving voltage to the drive motor 12 at a duty ratio according to a control signal received from the controller. The controller is electrically connected to the control device 50 and sends a control signal to the inverter circuit in accordance with a command from the control device 50.

The drive motor 12 in the present embodiment is a brushed motor and outputs the rotational motion corresponding to the voltage and the current fed from the inverter circuit in the drive unit 11. It is noted that the brushed motor may be replaced with any motor such as an induction motor or a reluctance motor.

The gearbox 13 physically connects the drive motor 12 and the rotor 30. The gearbox 13 includes multiple gears (not shown), and decelerates and transmits the rotation of the drive motor 12 to the rotor 30. It is noted that the gearbox 13 may be removed, and the drive motor 12 may be connected directly with the rotational shaft of the rotor 30.

The rotation frequency sensor 14 is installed on the drive motor 12 and measures the rotation frequency of the drive motor 12. The current sensor 15 and the voltage sensor 16 are installed between the drive unit 11 and the drive motor 12, and measure the driving current and the driving voltage, respectively. The sensors 14 to 16 output their measurement results through the drive unit 11 to a drive information detection unit 55 described later and included in the control device 50.

The battery 40 includes lithium ion cells and functions as a power source for the eVTOL 100. The battery 40 mainly feeds electricity to the drive unit 11 included in each EDS 10 to drive the corresponding drive motor 12. The lithium ion cells may be replaced with any secondary cells such as nickel metal hydride cells. In place of the battery 40 or in addition to the battery 40, any power source such as a fuel cell or an electric generator may be installed.

The converter 42 is connected to the battery 40, and steps down and feeds the voltage of the battery 40 to the body control device 50 and the auxiliary equipment (not shown) included in the eVTOL 100. The distributor 44 distributes the voltage of the battery 40 to the drive unit 11 included in each EDS 10.

The control device 50 is a microcomputer including a storage unit 51 and a central processing unit (CPU), and configured as an electronic control unit (ECU). The storage unit 51 includes read only memory (ROM) and random access memory (RAM). The CPU executes the control programs prestored in the storage unit 51 to function as a control unit 52 that controls the overall operation of the eVTOL 100 and also as the drive information detection unit 55, a storage control unit 56, and a maintenance necessity detection unit 57.

For example, the overall operation of the eVTOL 100 includes vertical takeoff and landing operations and flight operations. The vertical takeoff and landing operations and the flight operations may be performed based on set flight path information, by passenger piloting, or based on commands from an external control unit 510 included in an external device 500 described later. In the operation of the eVTOL 100, the control unit 52 controls the rotation frequency and the rotational direction of the drive motor 12 included in each EDS 10.

The drive information detection unit 55 detects drive information on each EDS 10. The drive information includes at least one of motor information serving as an indicator of the deterioration state of the drive motor 12 and drive unit information serving as an indicator of the deterioration state of the drive unit 11. The motor information corresponds to, for example, information measured by the rotation frequency sensor 14 included in each EDS 10 (the rotation frequency of the drive motor 12), and the operating time of the drive motor 12, serving as an indicator of the deterioration state of the hardware of the drive motor 12. The drive unit information corresponds to, for example, direct information such as information items measured by the current sensor 15 and the voltage sensor 16 included in each EDS 10 (a driving current value and a driving voltage value), indirect information such as a command value of the rotation frequency of the drive motor 12 calculated from a driving current value and a driving voltage value, and the operating time of the drive unit 11, serving as an indicator of the deterioration states of the inverter circuit and the controller. It is noted that the drive information is not limited to these items of information, but may include information items measured by sensors (not shown) such as a torque sensor, a temperature sensor, and a vibration sensor or may be some of these information items. These information items are sent to the drive information detection unit 55 via the drive unit 11 in each EDS 10.

The storage control unit 56, as described later, performs drive history information update processing on the history of the drive information on each EDS 10. The storage control unit 56 in the present embodiment stores the updated drive history information into the storage device 62 included in the eVTOL 100. The drive history information is information correlated with the degree of deterioration in the EDS 10 and corresponds to, for example, cumulative load values such as the cumulative operating time of the EDS 10, the cumulative number of rotations of the drive motor 12, and the cumulative driving current of the drive motor 12. The cumulative operating time of the EDS 10 may be, for example, a period of time during which at least a predetermined driving current value is measured.

The maintenance necessity detection unit 57 performs the processing of detecting the necessity or lack of necessity of maintenance on each EDS 10 (hereinafter referred to as the maintenance necessity detection processing). The necessity or lack of necessity of maintenance is detected based on the drive information detected by the drive information detection unit 55. In the present embodiment, the maintenance necessity detection unit 57 determines and detects the necessity or lack of necessity of maintenance using the drive history information on each EDS 10 stored in the storage device 62. In the present embodiment, the maintenance on the EDS 10 includes a replacement of a component in the EDS 10.

The storage device 62 is configured as a memory including ROM and RAM, and stores drive history information in accordance with an instruction from the storage control unit 56.

The body communication unit 64 has the function of wireless communications, which allows transmission and reception of information between the eVTOL 100 and an external communication unit 520 included in the external device 500, and also communication with the control device 50. Examples of wireless communications include civilian VHF (VERY HIGH FREQUENCY) wireless communications, wireless communications provided by telecommunications carriers such as 4G (fourth generation wireless system) or 5G (fifth generation wireless system) wireless communications, and wireless LAN communications according to the IEEE 802.11 standard. In other examples, wired communications may be used according to the USB (UNIVERSAL SERIAL BUS) standard or the IEEE 802.3 standard.

The notification unit 66 gives notification in accordance with an instruction from the control device 50. In the present embodiment, the notification unit 66 includes a display device that is installed in the passenger compartment and displays characters and images and a speaker that outputs voice and a warning sound, and informs the passenger of various types of information through visual information and audio information.

The external device 500 is a device different from the eVTOL 100 and configured as, for example, a computer for management and control such as a server device that records maintenance on each EDS 10. The external device 500 may be, for example, a server device placed in an air traffic control room or a personal computer brought to a place for use of the eVTOL 100 by a maintenance worker who performs maintenance on each EDS 10. The external device 500 includes the external control unit 510, the external communication unit 520, and an external storage device 530. The external communication unit 520 has the function of wireless communications, which allows transmission and reception of information to and from the body communication unit 64 included in the eVTOL 100. The external storage device 530 is configured as a memory including ROM and RAM.

A-2. Maintenance Necessity Detection Processing

Figure 4:
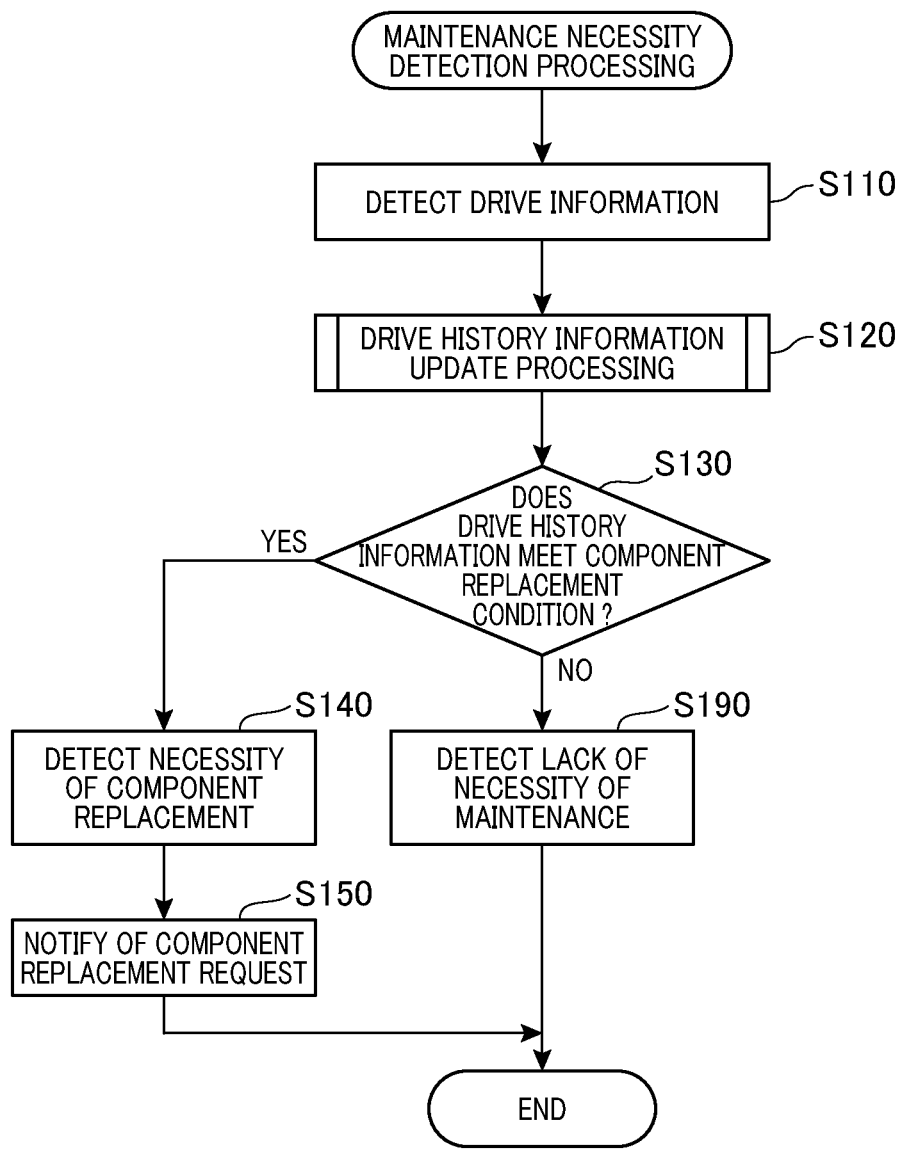
FIG. 4 is a flowchart showing the procedure of maintenance necessity detection processing.

The maintenance necessity detection processing shown in FIG. 4 is executed repeatedly by the control device 50 when the start switch of the eVTOL 100 is turned on. The maintenance necessity detection processing is performed on each of the multiple EDSs 10 included in the eVTOL 100.

The drive information detection unit 55 detects drive information about the EDS 10 (step S110). The storage control unit 56 performs the drive history information update processing on the EDS 10 (step S120).

Figure 5:
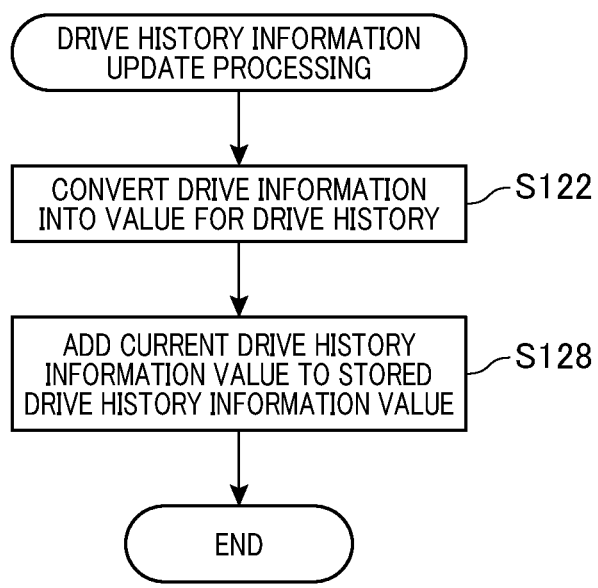
FIG. 5 is a flowchart showing the procedure of drive history information update processing.

As shown in FIG. 5, in the drive history information update processing according to the present embodiment, the storage control unit 56 converts the drive information detected by the drive information detection unit 55 into a value for drive history information (step S122). In the present embodiment, the value for drive history information is a value obtained by combining the rotation frequency of the drive motor 12 measured by the rotation frequency sensor 14 and the driving current value measured by the current sensor 15 (hereinafter referred to as a combination). The combination may be calculated by, for example, substituting the rotation frequency and the driving current value of the drive motor 12 into a predetermined operation expression. The operation expression may be, for example, an expression in which the driving current value is weighted to be more reflective of the degree of deterioration than the rotation frequency of the drive motor 12. In a configuration that can further detect the winding resistance of the drive motor 12, the winding resistance may be used to estimate winding temperature information. In addition to the rotation frequency and the driving current value of the drive motor 12, the value indicating the temperature information may be substituted into a predetermined operation expression to calculate a combination. The winding temperature affects the life of the insulation coating on the winding and thus corresponds to motor information serving as an indicator of the deterioration state of the drive motor 12. Typically, the drive motor 12 deteriorates with increasing winding temperature, and thus the use of the winding temperature information enables the degree of deterioration in the drive motor 12 to be estimated with high accuracy. It is noted that the value for drive history information is not limited to these values, but may be a value obtained by combining any types of drive information or a converted value obtained by changing the drive information in line with the deterioration rate of the EDS 10. The use of a value obtained by combining multiple items of drive information can save the memory of the storage device 62. The use of a converted value allows the degree of deterioration in the EDS 10 to be indicated more appropriately even if the drive information does not correspond linearly to the deterioration rate of the EDS 10. Alternatively, the detected drive information may be used directly as a value for drive history information. In other words, step S122 may be skipped.

The storage control unit 56 adds the current drive history information value, or in other words, the newly calculated combination, to the drive history information value stored in the storage device 62 (step S128). In response to the execution of step S128, the drive history information stored in the storage device 62 is updated and stored. In the present embodiment, the cumulative load value is updated and stored in the form of the drive history information that combines the cumulative number of rotations and the cumulative driving current of the drive motor 12. The motor information and the drive unit information may be added and stored as separate drive history information items without being combined. After that, the drive history information update processing in each EDS 10 is ended.

As shown in FIG. 4, the maintenance necessity detection unit 57 determines whether the drive history information updated and stored in step S120 meets a component replacement condition (step S130). The component replacement condition is preset and stored in the storage device 62 as a condition under which the EDS 10 may be estimated to have deteriorated to such an extent that the replacement of a component in the EDS 10 is recommended. The component replacement condition in the present embodiment is that the cumulative load value as the drive history information is equal to or greater than a predetermined component replacement threshold.

If the drive history information is determined to meet the component replacement condition (step S130: YES), the maintenance necessity detection unit 57 detects the necessity of component replacement for the EDS 10 (step S140). The control unit 52 determines that the EDS 10 needs component replacement, and gives notification of a component replacement request (step S150).

The notification of a component replacement request may be notification issued to the passenger of the eVTOL 100 through the notification unit 66. More specifically, for example, when the display device in the passenger compartment indicates the installation positions of multiple EDSs 10, the EDS 10 that needs component replacement may be indicated by a red lamp. The notification of a component replacement request may be notification issued to the external device 500 through the body communication unit 64. When receiving the notification of a component replacement request, the passenger or a maintenance worker for the eVTOL 100 is expected to perform component replacement for the EDS 10 determined to need component replacement. In response to the execution of step S150, the maintenance necessity detection processing is ended.

If the drive history information is determined not to meet the component replacement condition (step S130: NO), the maintenance necessity detection unit 57 detects the lack of necessity of maintenance on the EDS 10 (step S190). The control unit 52, after the execution of step S190, may give notification of the unnecessary of component replacement for the EDS 10 by the same method as in step S150. In response to the execution of step S190, the maintenance necessity detection processing is ended.

In the eVTOL 100 according to the first embodiment described above, the storage control unit 56 performs the drive history information update processing on each of the multiple EDSs 10, thus allowing the drive history information items on the multiple EDSs 10 to be managed individually. Furthermore, the maintenance necessity detection unit 57 performs the maintenance necessity detection processing to detect the necessity or lack of necessity of component replacement for each of the multiple EDSs 10 using the stored drive history information. This allows the component replacement timing for each of the multiple EDSs 10 to be determined appropriately using its individual drive history information.

The eVTOL 100 in the present embodiment includes a combination of multiple rotors 30 having different roles, such as the lifting rotors 31 intended mainly to produce the lift for the body and the cruising rotors 32 intended mainly to produce the thrust for the body. In the eVTOL 100 with such a structure, each EDS 10 that turns the corresponding rotor 30 may have a different degree of deterioration. For example, the cumulative load values of the EDSs 10 that turn the lifting rotors 31 may be different from the cumulative load values of the EDSs 10 that turn the cruising rotors 32. Additionally, for example, the cumulative load values of the EDSs 10 that turn the lifting rotors 31 on the right of the body 20 may be different from the cumulative load values of the EDSs 10 that turn the lifting rotors 31 on the left of the body 20 due to factors such as flight paths or wind directions. Accordingly, the multiple EDSs 10 may have different maintenance timings.

However, in the eVTOL 100 according to the present embodiment, the necessity or lack of necessity of component replacement for each of the multiple EDSs 10 is detected based on its individual drive history information. This allows appropriate determination of the component replacement timing for each of the multiple EDSs 10 that may have different maintenance timings. Thus, for example, compared with a configuration in which all EDSs 10 simultaneously undergo maintenance, the configuration in the present embodiment can prevent component replacement for a particular EDS 10 from being late due to a failure to notice a state in which the EDS 10 has deteriorated to such an extent that component replacement is recommended. The configuration in the present embodiment can also prevent component replacement from being too early for a particular EDS 10 that has a low degree of deterioration.

The maintenance necessity detection unit 57 detects the necessity or lack of necessity of component replacement using the drive history information, and can thus detect the necessity or lack of necessity of component replacement in accordance with the degree of deterioration such as the cumulative load value of the EDS 10. This enables accurate detection of the necessity or lack of necessity of component replacement for each EDS 10. The maintenance necessity detection unit 57 also detects the necessity of component replacement for an EDS 10 with its cumulative load value as the drive history information being equal to or greater than the predetermined threshold, and can thus detect the necessity or lack of necessity of component replacement with high accuracy.

Furthermore, the eVTOL 100 includes the storage device 62, and the storage control unit 56 stores the drive history information on each of the multiple EDSs 10 into the storage device 62. This eliminates the need for communication with the external device 500 during the drive history information update processing, preventing an interruption of the drive history information update processing caused by, for example, a communication failure.

Furthermore, the drive history information on each EDS 10 is a combination of at least two types of drive information. This can save the memory of the storage device 62 and enable the degree of deterioration in each EDS 10 to be indicated more appropriately.

Furthermore, the storage device 62 and the body communication unit 64 are each connected to the control device 50. This structure can eliminate the need for a complicated configuration for achieving the maintenance necessity detection processing. In addition, this structure can regulate the processing load compared with a configuration in which the storage device 62 and the body communication unit 64 are installed via an additional member other than the control device 50.

B. Second Embodiment

Figure 6:
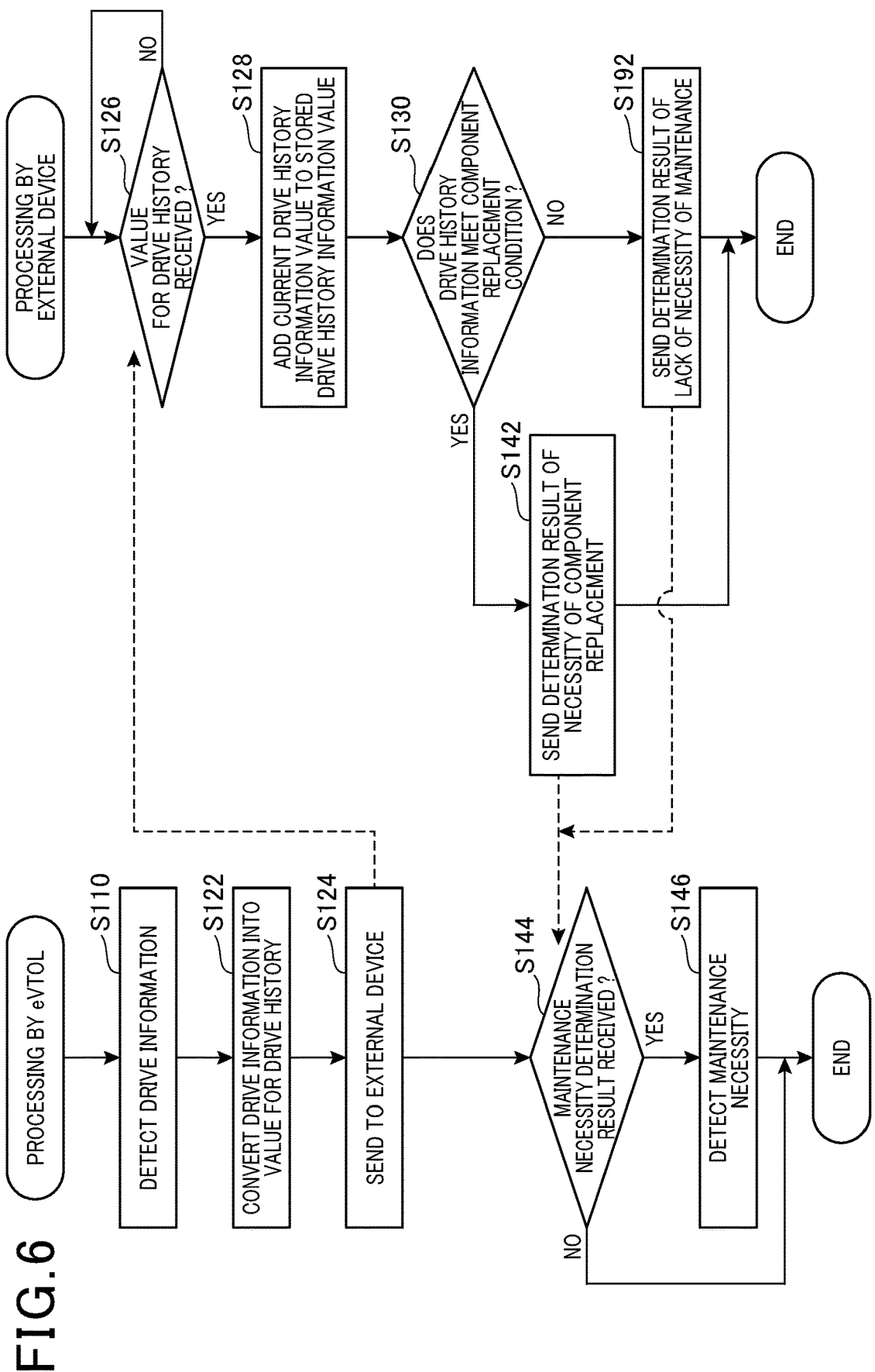
FIG. 6 is a flowchart showing the procedure of maintenance necessity detection processing in a second embodiment.

As shown in FIG. 6, an eVTOL 100 according to a second embodiment is different from the eVTOL 100 according to the first embodiment in that maintenance necessity detection processing including drive history information update processing is performed by the control device 50 in the eVTOL 100 and the external device 500 in cooperation with each other. The other components including the device configuration are the same as in the eVTOL 100 according to the first embodiment, and thus a detailed description thereof will be omitted by using the same reference numerals to denote the same components. The dashed arrows in FIG. 6 indicate information communication between the control device 50 in the eVTOL 100 and the external device 500.

The storage control unit 56 in the eVTOL 100 according to the second embodiment stores the drive history information on each EDS 10 into the external storage device 530 of the external device 500. Thus, in the present embodiment, the storage device 62 in the eVTOL 100 may be removed. In the maintenance necessity detection processing according to the second embodiment, the necessity or lack of necessity of maintenance on the EDS 10 is determined by the external control unit 510 of the external device 500. In the present embodiment, the external device 500 includes an arithmetic unit higher in performance than the control device 50. When the external device 500 is powered on, the processing shown in FIG. 6 is executed repeatedly.

The drive information detection unit 55 of the control device 50 detects drive information on each EDS 10 (step S110). The storage control unit 56 converts the drive information detected by the drive information detection unit 55 into values for the drive history (step S122). The storage control unit 56 causes the body communication unit 64 to send values for the drive history to the external communication unit 520 of the external device 500 (step S124).

The external control unit 510 of the external device 500 determines whether values for the drive history sent from the eVTOL 100 has been received (step S126). If values for the drive history is determined not to have been received (step S126: NO), step S126 is repeated. If values for the drive history is determined to have been received (step S126: YES), the external control unit 510 adds the current drive history information value to the drive history information value stored in the external storage device 530 (step S128).

The external control unit 510 determines whether the drive history information about the EDS 10 updated and stored in step S128 meets a component replacement condition (step S130).

If the drive history information is determined to meet the component replacement condition (step S130: YES), the external control unit 510 determines that component replacement for the EDS 10 is necessary and sends the determination result to the body communication unit 64 via the external communication unit 520 (step S142).

If the drive history information is determined not to meet the component replacement condition (step S130: NO), the external control unit 510 determines that maintenance on the EDS 10 is not necessary and sends the determination result to the body communication unit 64 via the external communication unit 520 (step S192). In response to the execution of steps S142 and S192, the processing by the external device 500 is ended.

The maintenance necessity detection unit 57 of the control device 50 determines whether the body communication unit 64 has received the maintenance necessity determination result sent from the external device 500 (step S144). If the body communication unit 64 is determined not to have received the maintenance necessity determination result (step S144: NO), the maintenance necessity detection processing is ended. In step S144, the maintenance necessity detection unit 57 may determine whether the body communication unit 64 has received the maintenance necessity determination result within a predetermined period. In other words, if the body communication unit 64 is determined not to have received the maintenance necessity determination result within the predetermined period, the maintenance necessity detection processing may be ended.

If the body communication unit 64 is determined to have received the maintenance necessity determination result (step S144: YES), the maintenance necessity detection unit 57 detects the necessity or lack of necessity of maintenance (step S146). In the case where the external communication unit 520 has sent the determination result of the necessity of component replacement (step S142), the maintenance necessity detection unit 57, in step S146, detects the necessity of component replacement for the EDS 10 (step S146). After the execution of step S146, the control unit 52 determines that the EDS 10 needs component replacement, and gives notification of a component replacement request. In the case where the external communication unit 520 has sent the determination result of the lack of necessity of maintenance (step S192), the maintenance necessity detection unit 57, in step S146, detects the lack of necessity of maintenance on the EDS 10 (step S146). In the case of the detection of the lack of necessity of maintenance, after the execution of step S146, the control unit 52 may give notification that the EDS 10 needs no component replacement. In response to the execution of step S146, the maintenance necessity detection processing is ended.

The eVTOL 100 according to the second embodiment described above achieves the same effects as the eVTOL 100 according to the first embodiment. In addition, the storage control unit 56 stores the drive history information on each EDS 10 into the external storage device 530 of the external device 500. This can save the memory of the storage device 62 in the eVTOL 100. Furthermore, the maintenance necessity detection unit 57 detects the necessity of maintenance on each EDS 10 determined by the external control unit 510 of the external device 500, thus reducing the computational load on the control device 50. Additionally, the external control unit 510 of the high-performance external device 500 determines whether maintenance is necessary, thus improving the accuracy in determining the necessity or lack of necessity of maintenance. This allows the maintenance timing for each of the multiple EDSs 10 to be determined more appropriately.

C. Third Embodiment

Figure 7:
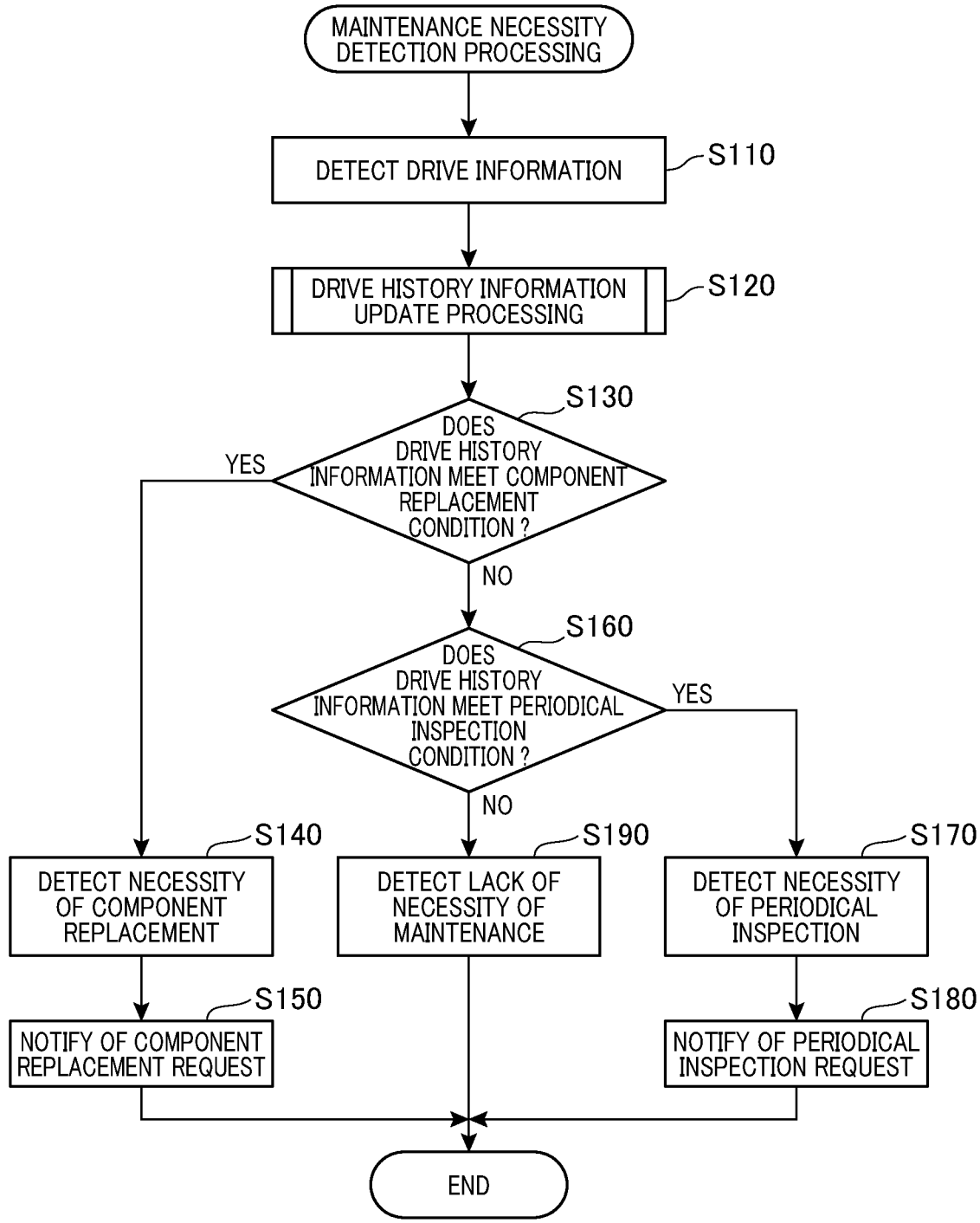
FIG. 7 is a flowchart showing the procedure of maintenance necessity detection processing in a third embodiment.

As shown in FIG. 7, an eVTOL 100 according to a third embodiment is different from the eVTOL 100 according to the first embodiment in that the maintenance necessity detection processing further includes steps S160 to S180, which are performed after step S130 to detect the necessity or lack of necessity of a periodic inspection. The other components including the device configuration are the same as in the eVTOL 100 according to the first embodiment, and thus a detailed description thereof will be omitted by using the same reference numerals to denote the same components. The maintenance on an EDS 10 in the third embodiment includes the replacement of a component in the EDS 10 and a periodic inspection of the EDS 10.

If the drive history information is determined not to meet the component replacement condition (step S130: NO), the maintenance necessity detection unit 57 determines whether the drive history information on the EDS 10 meets a periodic inspection condition (step S160). The periodic inspection condition is preset and stored in the storage device 62 as a condition under which the EDS 10 may be estimated to have deteriorated to such an extent that a periodic inspection of the EDS 10 is recommended. The periodic inspection condition in the present embodiment is that the cumulative load value as the drive history information is equal to or greater than a predetermined periodic inspection threshold. The periodic inspection threshold is set at a value smaller than the component replacement threshold. In other words, each EDS 10 in the present embodiment undergoes a periodic inspection and then further operates before component replacement.

If the drive history information is determined to meet the periodic inspection condition (step S160: YES), the maintenance necessity detection unit 57 detects the necessity of a periodic inspection of the EDS 10 (step S170). The control unit 52 determines that the EDS 10 needs a periodic inspection, and gives notification of a periodic inspection request (step S180). In response to the execution of step S180, the maintenance necessity detection processing is ended.

If the drive history information is determined not to meet the periodic inspection condition (step S160: NO), the maintenance necessity detection unit 57 detects the lack of necessity of maintenance on the EDS 10 (step S190). The control unit 52, after the execution of step S190, may give notification of the lack of necessity of maintenance. In response to the execution of step S190, the maintenance necessity detection processing is ended.

The notification of maintenance requests may be given variously. For example, when the display device in the passenger compartment indicates the installation positions of multiple EDSs 10, the EDS 10 that needs component replacement may be indicated by a red lamp, the EDS 10 that needs a periodic inspection may be indicated by an orange lamp, and the EDS 10 that needs no maintenance may be indicated by a green lamp. The notification of a maintenance request may be another type of notification issued to the passenger of the eVTOL 100 through the notification unit 66 or may be notification issued to the external device 500 through the body communication unit 64.

The eVTOL 100 according to the third embodiment described above achieves the same effects as the eVTOL 100 according to the first embodiment. In addition, the necessity or lack of necessity of maintenance for each EDS 10 is detected with component replacement and a periodic inspection separated from each other, thus allowing the component replacement timing and the periodic inspection timing for each of the multiple EDSs 10 to be determined appropriately.

D. Fourth Embodiment

Figure 8:
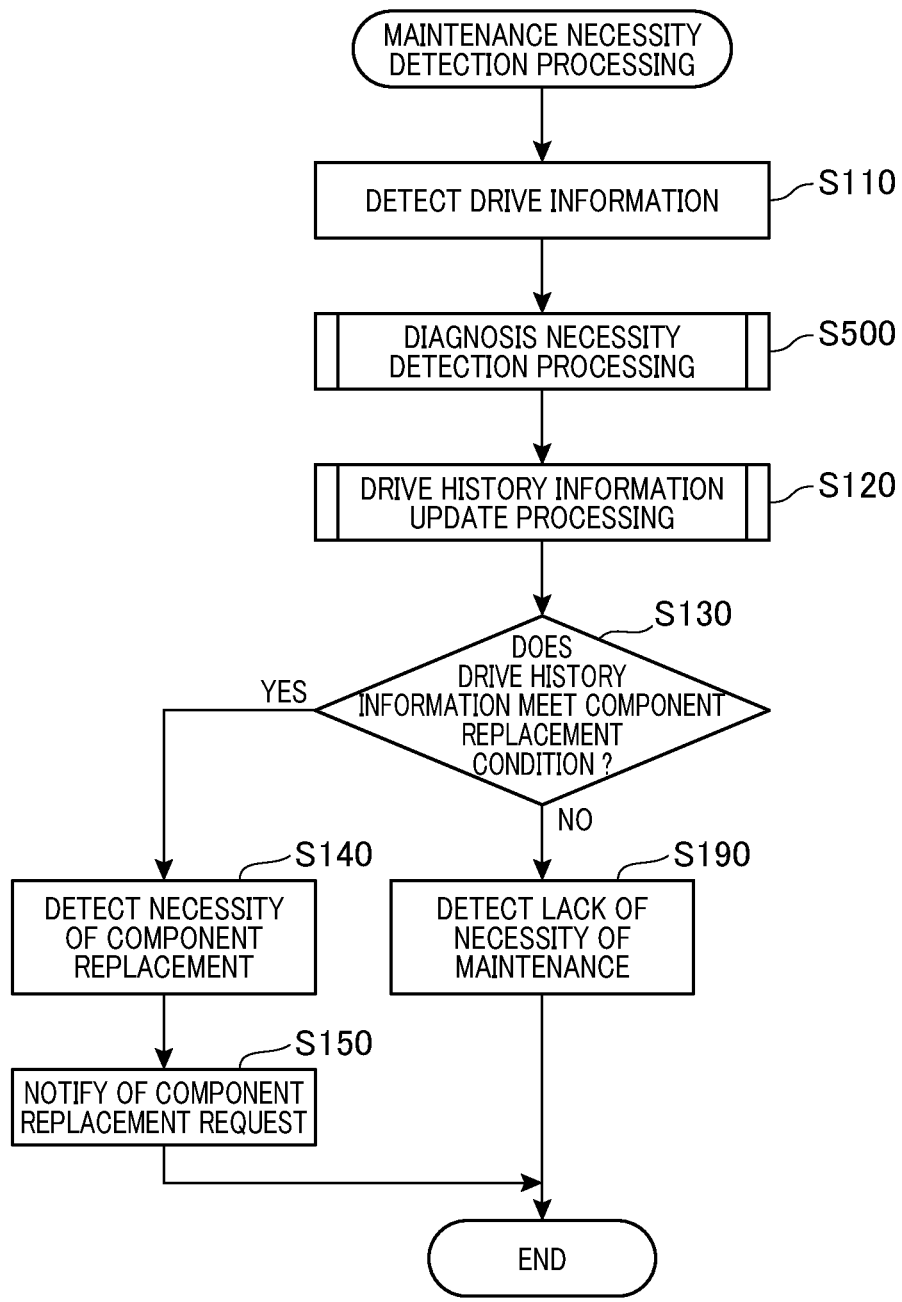
FIG. 8 is a flowchart showing the procedure of maintenance necessity detection processing in a fourth embodiment.

As shown in FIG. 8, an eVTOL 100 according to a fourth embodiment is different from the eVTOL 100 according to the first embodiment in that the maintenance necessity detection processing further includes step S500, which is performed between steps S110 and S120 to detect the necessity of diagnosis for each EDS 10. The other components including the device configuration are the same as in the eVTOL 100 according to the first embodiment, and thus a detailed description thereof will be omitted by using the same reference numerals to denote the same components.

The drive information detection unit 55 detects drive information on an EDS 10 (step S110). The maintenance necessity detection unit 57 performs diagnosis necessity detection processing (step S500). After the execution of step S500, the storage control unit 56 performs the drive history information update processing on the EDS 10 (step S120). The diagnosis corresponds to examination to be performed for an EDS 10 in a state in which the drive information value of the EDS 10 is out of a normal range, or in other words, the EDS 10 is estimated to have an abnormality. Unlike the periodic inspection in which the necessity or lack of necessity is detected in the maintenance necessity detection processing according to the third embodiment, the diagnosis detects the necessity or lack of necessity of maintenance based on the drive information in place of the drive history information such as the cumulative load value.

Figure 9:
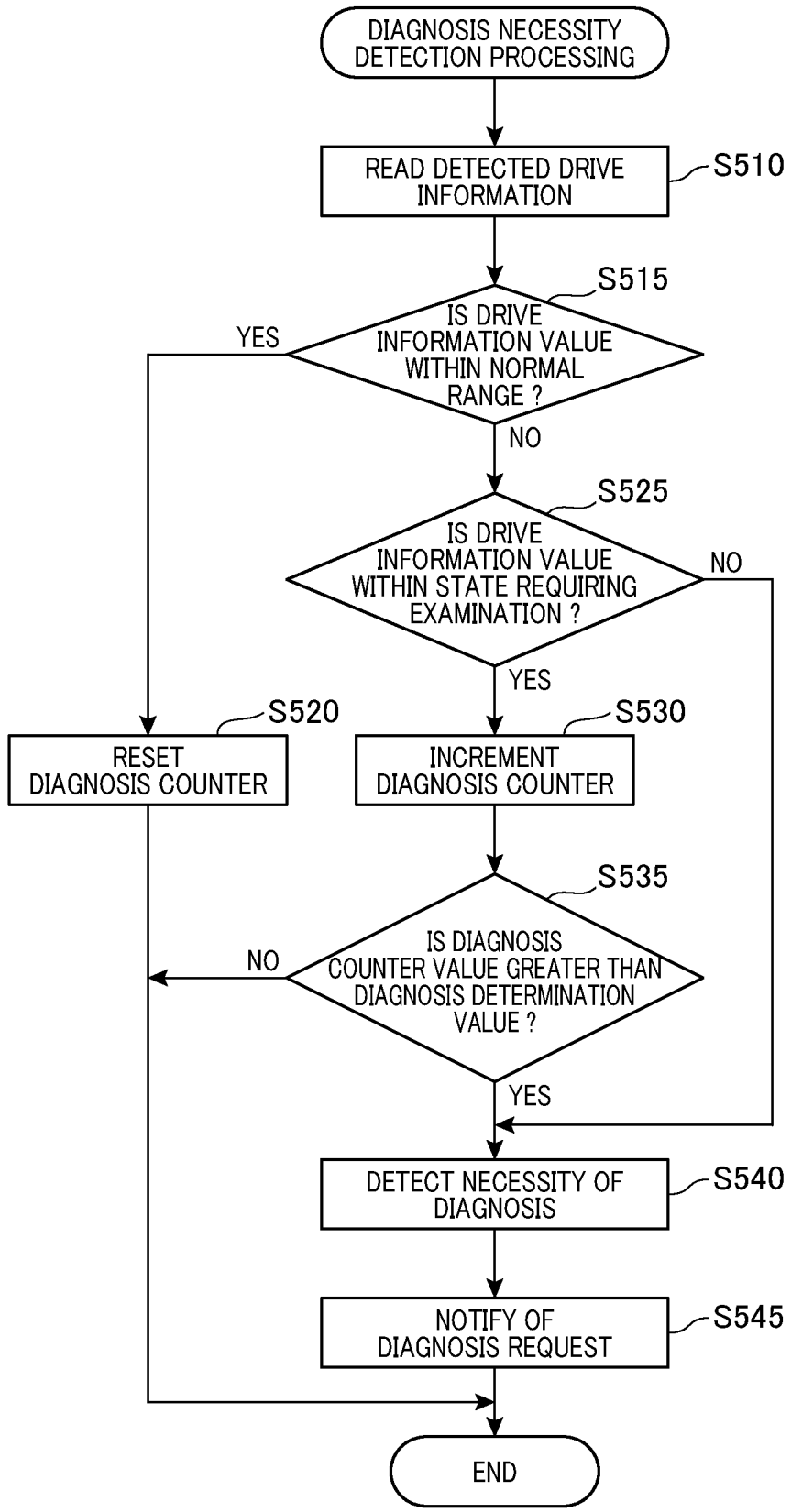
FIG. 9 is a flowchart showing the procedure of diagnosis necessity detection processing.

In the diagnosis necessity detection processing shown in FIG. 9, the maintenance necessity detection unit 57 reads the drive information on the EDS 10 detected in step S110 of the maintenance necessity detection processing (step S510). The maintenance necessity detection unit 57 determines whether the drive information value of the EDS 10 read in step S510 is within the normal range (step S515). In the present embodiment, a value within the normal range means that the EDS 10 is estimated to be operating normally and is to be determined to need no examination. In the present embodiment, it is determined whether the drive information value is within the normal range by whether the drive information value is equal to or smaller than a first threshold. The first threshold is preset and stored in the storage device 62.

If the drive information value is determined to be within the normal range (step S515: YES), the maintenance necessity detection unit 57 resets the diagnosis counter associated with the EDS 10 (step S520). In response to the execution of step S520, the diagnosis necessity detection processing is ended.

If the drive information value is determined not to be within the normal range (step S515: NO), the maintenance necessity detection unit 57 determines whether the drive information value of the EDS 10 is within a state requiring examination (step S525). In the present embodiment, a drive information value within the state requiring examination means that the value is out of the normal range although not being quite beyond the normal range. In the present embodiment, it is determined whether the drive information value is within the state requiring examination by whether the drive information value is equal to or smaller than a second threshold. The second threshold is a value for indicating that the drive information value is farther from the normal range than the first threshold, and preset and stored in the storage device 62.

If the drive information value is determined to be within the state requiring examination (step S525: YES), the maintenance necessity detection unit 57 increments the diagnosis counter associated with the EDS 10 (step S530). The maintenance necessity detection unit 57 determines whether the diagnosis counter value of the EDS 10 exceeds a diagnosis determination value (step S535). The diagnosis determination value is, for example, an integer greater than or equal to two and preset and stored in the storage device 62. The diagnosis determination value is set as a value for determining a state in which diagnosis of an EDS 10 is recommended due to the drive information value of the EDS 10 remaining slightly out of the normal range.

If it is determined that the diagnosis counter value does not exceed the diagnosis determination value (step S535: NO), the diagnosis necessity detection processing is ended. If it is determined that the diagnosis counter value exceeds the diagnosis determination value (step S535: YES), the maintenance necessity detection unit 57 detects the necessity of diagnosis of the EDS 10 (step S540). The control unit 52 determines that the EDS 10 needs diagnosis, and gives notification of a diagnosis request (step S545). The notification of a diagnosis request may be notification issued to the passenger of the eVTOL 100 through the notification unit 66 or may be notification issued to the external device 500 through the body communication unit 64. When receiving the notification of a diagnosis request, the passenger or a maintenance worker for the eVTOL 100 is expected to perform examination for the EDS 10 determined to need diagnosis. In response to the execution of step S545, the diagnosis necessity detection processing is ended.

If the drive information value is determined not to be within the state requiring examination (step S525: NO), the maintenance necessity detection unit 57 detects the necessity of diagnosis for the EDS 10 (step S540). When the drive information value is not within the state requiring examination, the EDS 10 may have an abnormality that causes the drive information value to be quite beyond the normal range, and thus it is desirable to examine the EDS 10 promptly. The control unit 52 determines that the EDS 10 needs diagnosis, and gives notification of a diagnosis request (step S545). In response to the execution of step S545, the diagnosis necessity detection processing is ended.

The eVTOL 100 according to the fourth embodiment described above achieves the same effects as the eVTOL 100 according to the first embodiment. In addition, the maintenance necessity detection unit 57 detects the necessity of diagnosis for each EDS 10 based on its drive information, thus allowing appropriate determination that diagnosis is to be performed for the EDS 10 that may be estimated to have an abnormality.

Furthermore, the drive information is used to detect the necessity or lack of necessity of diagnosis, thus allowing the diagnosis necessity detection processing to be performed without the execution of the drive information update processing. This enables rapid detection of the necessity or lack of necessity of diagnosis. In addition, the maintenance necessity detection unit 57 determines whether the drive information value of the EDS 10 is within the state requiring examination, thus eliminating the need for communication with the external device 500 during the diagnosis necessity detection processing. This enables rapid detection of the necessity or lack of necessity of diagnosis and also prevents an interruption of the diagnosis necessity detection processing caused by, for example, a communication failure.

E. Fifth Embodiment

Figure 10:
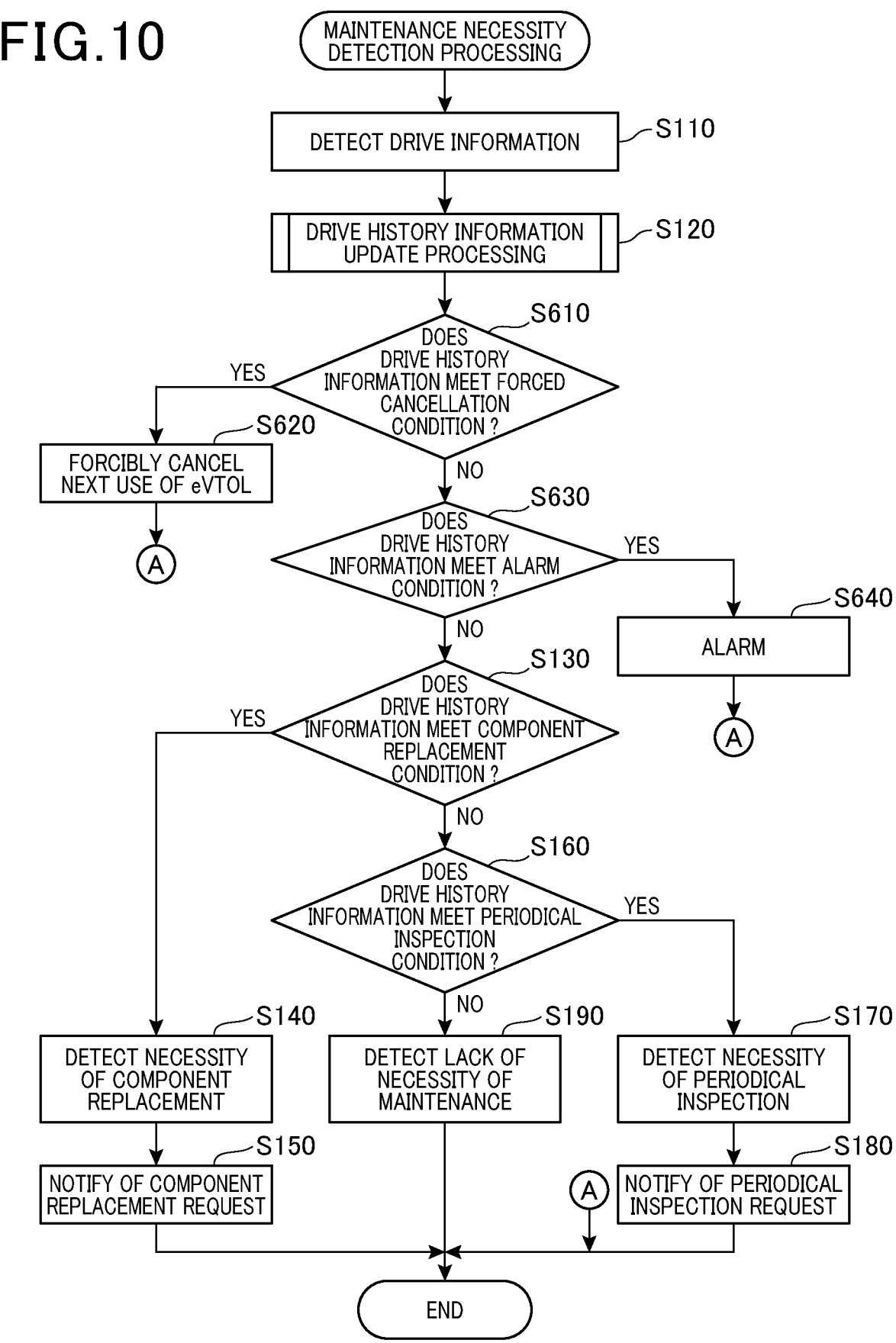
FIG. 10 is a flowchart showing the procedure of maintenance necessity detection processing in a fifth embodiment.

As shown in FIG. 10, an eVTOL 100 according to a fifth embodiment is different from the eVTOL 100 according to the third embodiment in that the maintenance necessity detection processing further includes steps S610 to S640, which are performed between steps S120 and S130 to allow a forced cancellation of the next use of the eVTOL 100. The other components including the device configuration are the same as in the eVTOL 100 according to the third embodiment, and thus a detailed description thereof will be omitted by using the same reference numerals to denote the same components.

The maintenance necessity detection unit 57 determines whether the drive history information about the EDS 10 updated and stored in step S120 meets a forced cancellation condition (step S610). The forced cancellation condition is preset and stored in the storage device 62 as a condition for forcibly canceling the next use of the eVTOL 100 when an EDS 10 continues to be used without undergoing maintenance regardless of notification of a periodic inspection request or a component replacement request. The forced cancellation condition in the present embodiment is that the period of use exceeds a predetermined period, and the cumulative load value as the drive history information is equal to or greater than a predetermined forced cancellation threshold.

Figure 11:
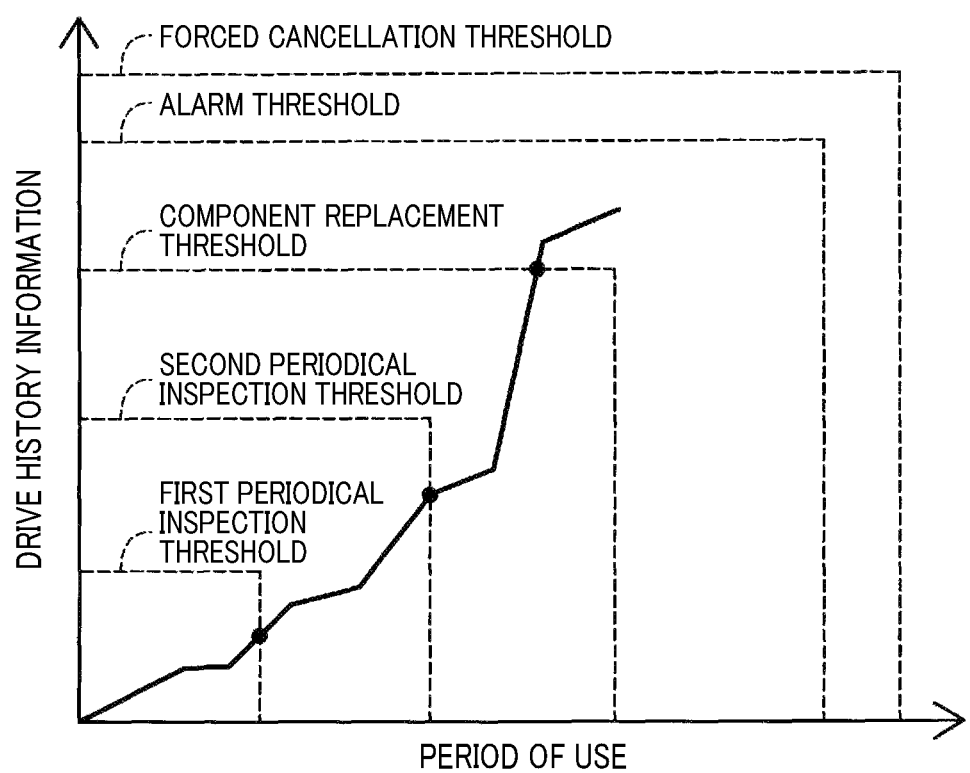
FIG. 11 is a diagram illustrating thresholds set in the fifth embodiment.

The thresholds associated with maintenance on each EDS 10 will now be described with reference to FIG. 11. In FIG. 11, the vertical axis represents drive history information, and the horizontal axis represents the period of use of the EDS 10. The period of use of the EDS 10 refers to the amount of time elapsed from the installation of the EDS 10 on the body 20 to the current time, irrespective of whether the EDS 10 is driven. The drive unit 11 of the EDS 10 may include a timer that automatically starts counting when connected to the battery 40, and the period of use may be determined based on, for example, information sent from the timer to the control device 50. In the fifth embodiment, the thresholds associated with maintenance on the EDS 10 are preset as the periodic inspection threshold, the component replacement threshold, an alarm threshold, and the forced cancellation threshold, which are listed in stepwise ascending order. In some aspects, the periodic inspection threshold may be, as shown in FIG. 11, set as two values: a first periodic inspection threshold and a second periodic inspection threshold. In such an aspect, the first periodic inspection is performed and followed by a further operation before the second periodic inspection is performed, and after a further operation, component replacement is performed.

As shown in FIG. 10, if the drive history information about the EDS 10 is determined to meet the forced cancellation condition (step S610: YES), or in other words, the period of use or the drive history information is determined to have exceeded the forced cancellation threshold, then the control unit 52 forcibly cancels the next use of the eVTOL 100 (step S620). In step S620, for example, the next takeoff operation of the eVTOL 100 is forbidden. In response to the execution of step S620, the maintenance necessity detection processing is ended.

If the drive history information about the EDS 10 is determined not to meet the forced cancellation condition (step S610: NO), the maintenance necessity detection unit 57 determines whether the drive history information about the EDS 10 meets an alarm condition (step S630). The alarm condition is preset and stored in the storage device 62 as a condition for warning that the next use of the eVTOL 100 is forcibly canceled when an EDS 10 continues to be used without undergoing maintenance regardless of notification of a periodic inspection request or a component replacement request. The alarm condition in the present embodiment is that the period of use exceeds a predetermined period or the cumulative load value as the drive history information is equal to or greater than the predetermined alarm threshold.

As shown in FIG. 10, if the drive history information about the EDS 10 is determined to meet the alarm condition (step S630: YES), or in other words, the period of use or the drive history information is determined to have exceeded the alarm threshold, then the control unit 52 issues an alarm about the forced cancellation of the next use of the eVTOL 100 (step S640). The alarm may be issued by the same method as for the notification of a maintenance request given in step S150. In response to the execution of step S640, the maintenance necessity detection processing is ended.

If the drive history information about the EDS 10 is determined not to meet the alarm condition (step S630: NO), the processing proceeds to step S130.

The eVTOL 100 according to the fifth embodiment described above achieves the same effects as the eVTOL 100 according to the third embodiment. In addition, the next use of the eVTOL 100 is forcibly canceled when an EDS 10 continues to be used without undergoing maintenance regardless of notification of a periodic inspection request or a component replacement request. This prevents the eVTOL 100 from continuing to be used without maintenance being performed on the EDS 10 that needs maintenance. The safety of the eVTOL 100 is thus maintained. Furthermore, when the alarm condition is met prior to forced cancellation, an alarm is issued, and thus component replacement is expected to be performed before the forced cancellation.

F. Sixth Embodiment

Figure 12:
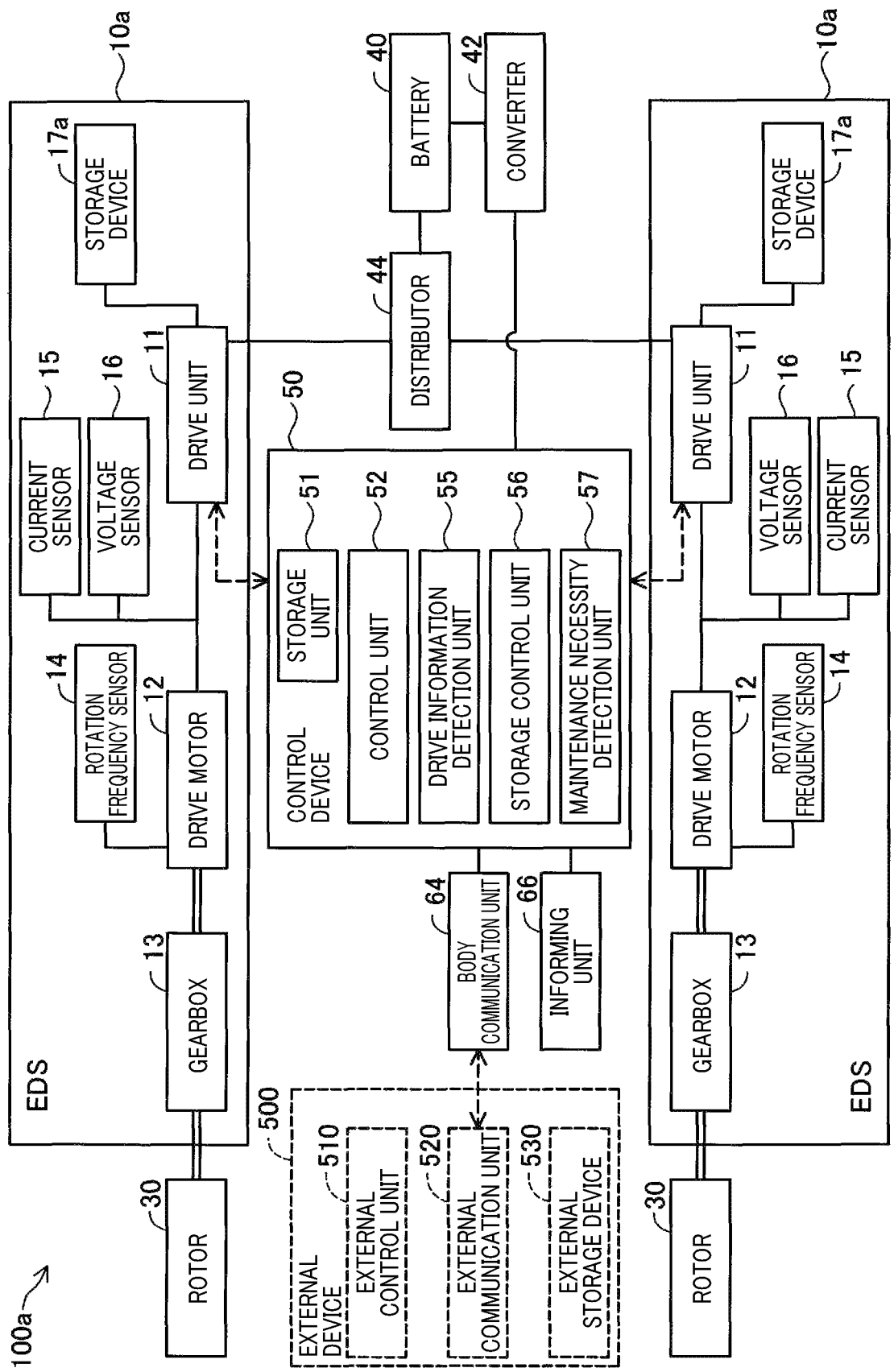
FIG. 12 is a schematic block diagram illustrating the configuration of an electric vertical takeoff and landing aircraft in a sixth embodiment.

As shown in FIG. 12, an eVTOL 100*a* according to a sixth embodiment is different from the eVTOL 100 according to the first embodiment in that the EDSs 10 are replaced with EDSs 10*a* each including a storage device 17*a*, and the storage device 62 is removed. In this configuration, the storage device 17*a* of each EDS 10*a* stores its drive history information during the maintenance necessity detection processing performed in the eVTOL 100*a* according to the sixth embodiment. The other components are the same as in the eVTOL 100 according to the first embodiment, and thus a detailed description thereof will be omitted by using the same reference numerals to denote the same components.

In each EDS 10*a*, the storage device 17*a* is configured as a memory including ROM and RAM and connected to the drive unit 11. The storage device 17*a* stores drive unit information and motor information as the drive history information on the EDS 10*a* in accordance with an instruction from the storage control unit 56. In other words, the storage control unit 56 in the sixth embodiment stores the drive history information on each EDS 10a into the storage device 17a.

The eVTOL 100a according to the sixth embodiment described above achieves the same effects as the eVTOL 100 according to the first embodiment. In addition, each EDS 10a includes the storage device 17a, and the drive history information on each EDS 10a is stored in its storage device 17a. Thus, the storage device 17a may have a small memory capacity, preventing an increase in the costs of manufacturing the eVTOL 100a. Furthermore, since the storage device 17a installed in each EDS 10a stores its drive history information, the drive history information on the multiple EDSs 10a may be managed easily also in an aspect in which rotation is performed among the EDSs 10a. More specifically, this can eliminate the need for sending the drive history information and the identification information on each EDS 10a to the control device 50, and remove the need for storing the identification information on each EDS 10a into the storage device 62. The rotation among EDSs 10a refers to an interchange of the multiple EDSs 10a, such as physically interchanging the installation positions of the multiple EDSs 10a or electrically combining the multiple EDSs 10a and the rotors 30 differently.

G. Seventh Embodiment

Figure 13:
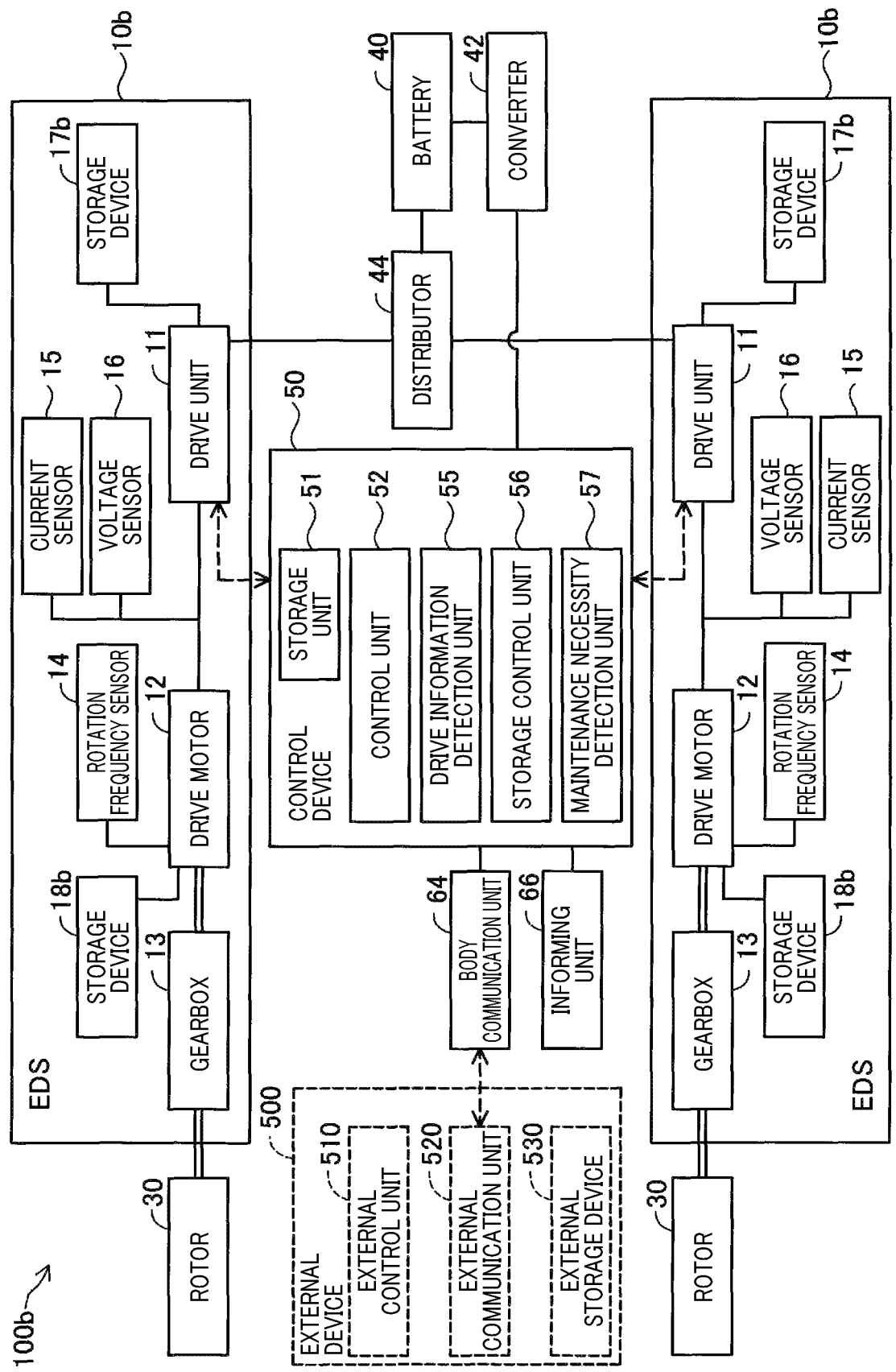
FIG. 13 is a schematic block diagram illustrating the configuration of an electric vertical takeoff and landing aircraft in a seventh embodiment.

As shown in FIG. 13, an eVTOL 100b according to a seventh embodiment is different from the eVTOL 100a according to the sixth embodiment in that the EDSs 10a are replaced with EDSs 10b each including two storage devices 17b and 18b. The other components are the same as in the eVTOL 100a according to the sixth embodiment, and thus a detailed description thereof will be omitted by using the same reference numerals to denote the same components.

In each EDS 10b, the storage device 17b is connected to the drive unit 11, and stores the drive unit information included in the drive history information and serving as an indicator of the deterioration state of the drive unit 11. In each EDS 10b, the storage device 18b is connected to the drive motor 12, and stores the motor information included in the drive history information and serving as an indicator of the deterioration state of the drive motor 12. In other words, the storage control unit 56 in the seventh embodiment stores, of the drive history information on each EDS 10b, the drive unit information into the storage device 17b and the motor information into the storage device 18b.

The storage device 18b may store motor information measured mechanically. In one example, the rotations of the rotor of the drive motor 12 may be summed with a counter, and the resulting number may be stored. In another example, the contact wear on a brushed motor may be used. The storage device 18b may store the cumulative number of rotations of the drive motor 12 estimated from the length of the worn contact. In still another example, the motor information may be measured with a seal including an indicator formed of a material that dissolves at a specified temperature. With the seal affixed to the drive motor 12, the temperatures of the drive motor 12 operating may be summed mechanically and stored. The storage device 18b may be configured as, for example, a memory including ROM and RAM and electronically store the motor information.

The eVTOL 100b according to the seventh embodiment described above achieves the same effects as the eVTOL 100a according to the sixth embodiment. In addition, each EDS 10b includes the storage device 17b for storing the drive unit information and the storage device 18b for storing the motor information, thus facilitating achievement of a configuration that separately manages the degree of deterioration in the drive unit 11 and the degree of deterioration in the drive motor 12. This further facilitates determination of when the drive unit 11 or the drive motor 12 in each EDS 10b is to be replaced.

H. Eighth Embodiment

Figure 14:
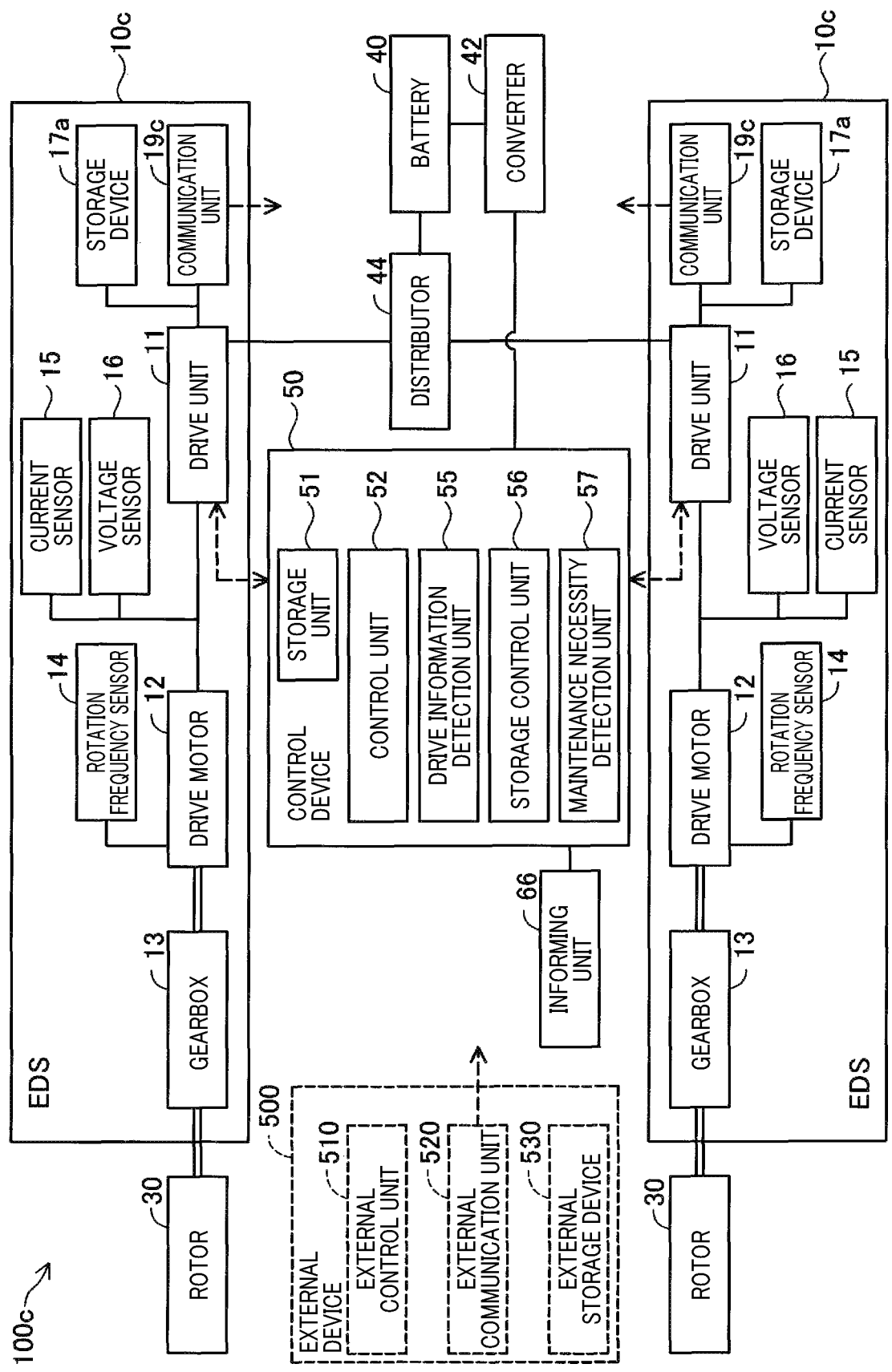
FIG. 14 is a schematic block diagram illustrating the configuration of an electric vertical takeoff and landing aircraft in an eighth embodiment.

As shown in FIG. 14, an eVTOL 100c according to an eighth embodiment is different from the eVTOL 100a according to the sixth embodiment in that the EDSs 10a are replaced with EDSs 10c each further including a communication unit 19c, and the body communication unit 64 is removed. The other components are the same as in the eVTOL 100a according to the sixth embodiment, and thus a detailed description thereof will be omitted by using the same reference numerals to denote the same components.

In each EDS 10c, the communication unit 19c is connected to the drive unit 11. The communication unit 19c has the function of wireless communications, which allows transmission and reception of information between the eVTOL 100c and the external communication unit 520 in the external device 500, and also communication with the control device 50.

In some aspects, the maintenance necessity detection processing according to the eighth embodiment may be performed, as in the second embodiment, by the control device 50 and the external device 500 in cooperation with each other. In such an aspect, the communication unit 19c corresponds to the body communication unit in the present disclosure.

The eVTOL 100c according to the eighth embodiment described above achieves the same effects as the eVTOLs 100 and 100a according to the second and sixth embodiments.

I. Ninth Embodiment

Figure 15:
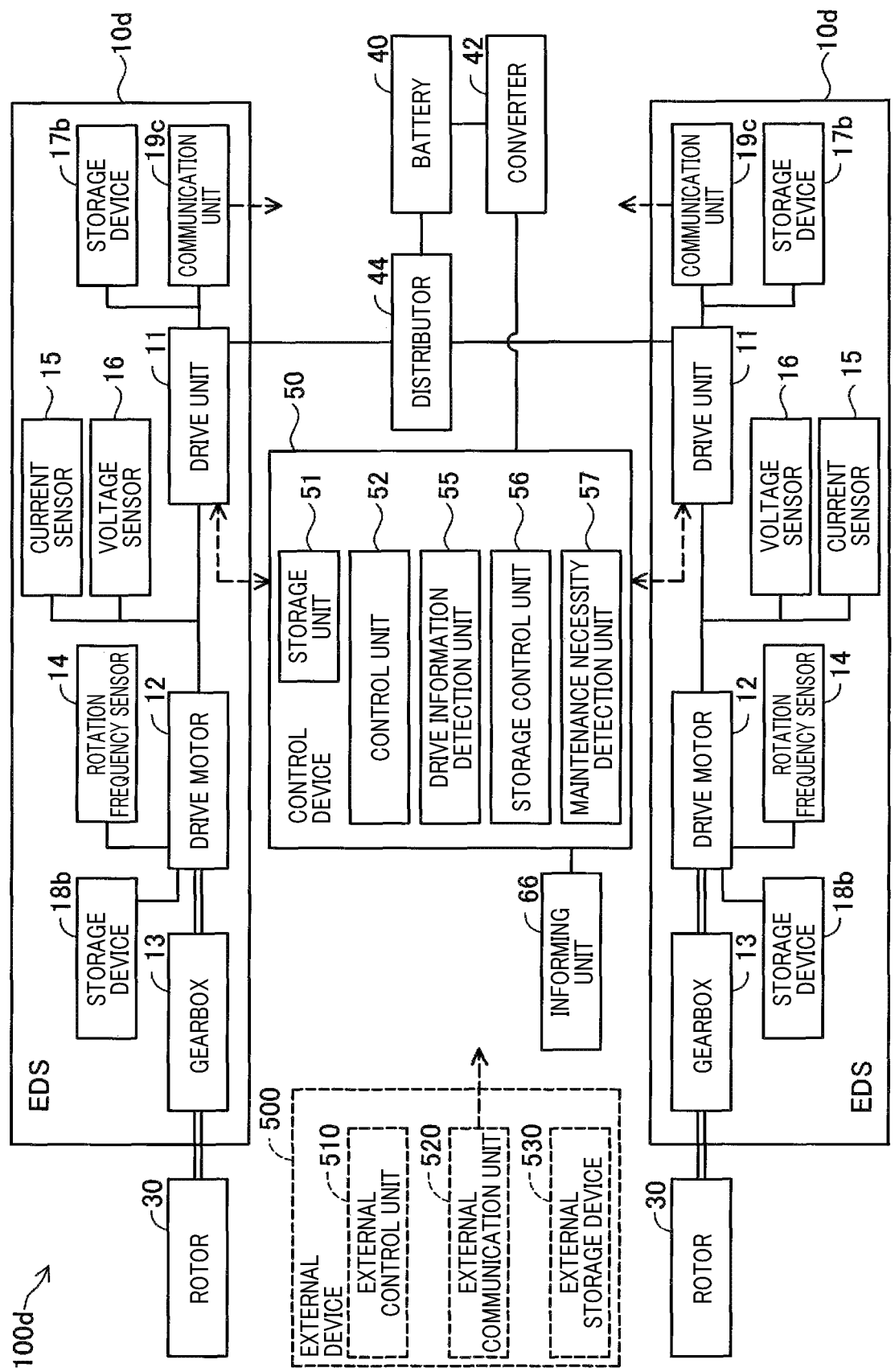
FIG. 15 is a schematic block diagram illustrating the configuration of an electric vertical takeoff and landing aircraft in a ninth embodiment.

As shown in FIG. 15, an eVTOL 100d according to a ninth embodiment is different from the eVTOL 100b according to the seventh embodiment in that the EDSs 10b are replaced with EDSs 10d each further including the same communication unit 19c as in the eighth embodiment, and the body communication unit 64 is removed. The other components are the same as in the eVTOL 100b according to the seventh embodiment, and thus a detailed description thereof will be omitted by using the same reference numerals to denote the same components.

In some aspects, the maintenance necessity detection processing according to the ninth embodiment may be performed, as in the second embodiment, by the control device 50 and the external device 500 in cooperation with each other. In such an aspect, the communication unit 19c corresponds to the body communication unit in the present disclosure.

The eVTOL 100d according to the ninth embodiment described above achieves the same effects as the eVTOL 100b according to the seventh embodiment.

J. Tenth Embodiment

Figure 16:
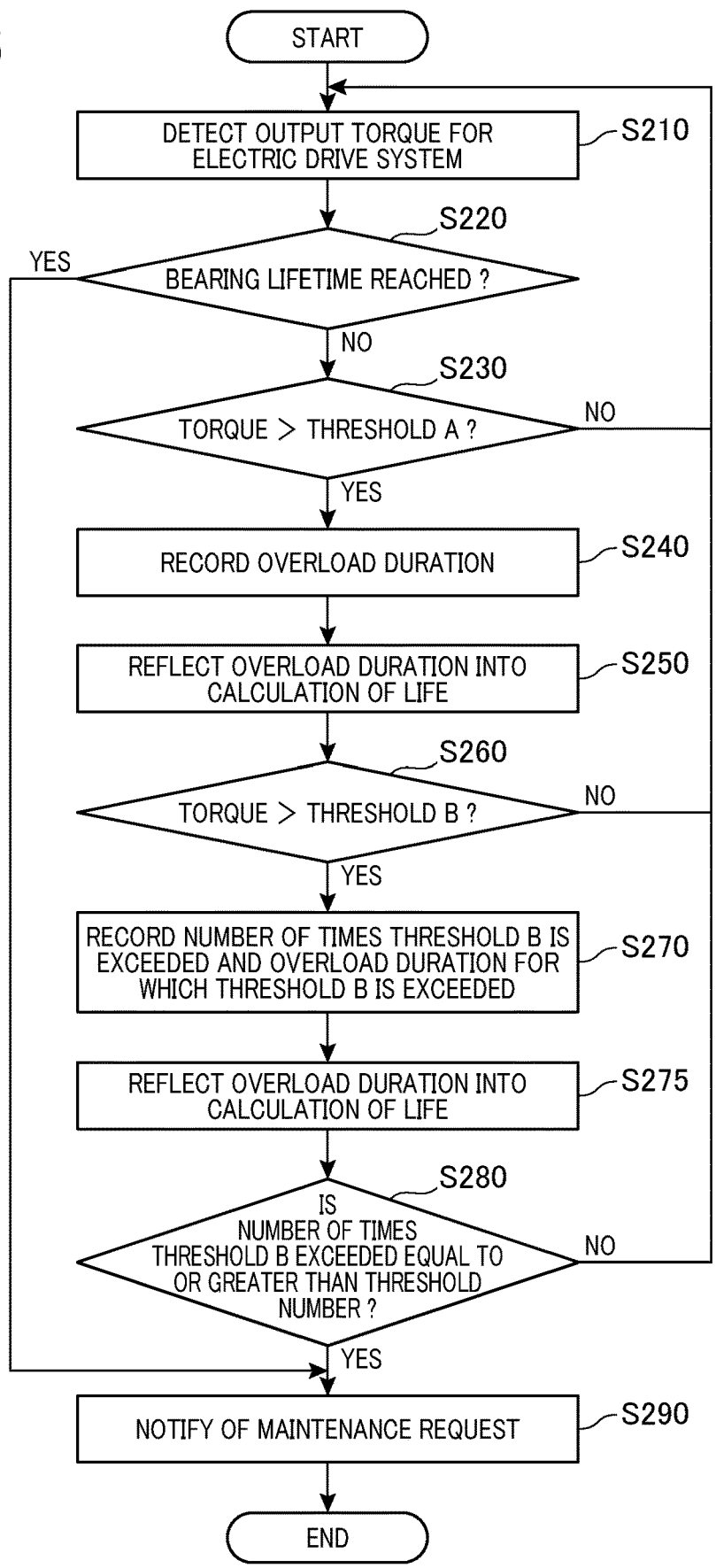
FIG. 16 is a flowchart showing the procedure of bearing maintenance necessity detection processing in a tenth embodiment.

An eVTOL 100 according to a tenth embodiment is different from the eVTOL 100 according to the first embodiment in that the bearing maintenance necessity detection processing shown in FIG. 16 is performed. In the eVTOL 100 according to the tenth embodiment, the other components including the device configuration and the other processing procedures are the same as in the eVTOL 100 according to the first embodiment, and thus a detailed description thereof will be omitted by using the same reference numerals to denote the same components and processing procedures.

Although not shown in FIGS. 1 to 3, a bearing unit including a bearing is provided between the gearbox 13 and the rotor 30. The bearing maintenance necessity detection processing shown in FIG. 16 is the processing for detecting the necessity or lack of necessity of periodic replacement of the bearing worn by the rotation of the rotor 30. The bearing maintenance necessity detection processing is performed by the control device 50 when the start switch of the eVTOL 100 is turned on. The bearing maintenance necessity detection processing is performed on each of the multiple EDSs 10 included in the eVTOL 100.

The drive information detection unit 55 detects the output torque of the eVTOL 100 through a torque sensor (not shown) (step S210). The maintenance necessity detection unit 57 determines whether the bearing life value has reached the bearing lifetime (step S220). The bearing life value refers to the value of the lifetime after which the bearing needs periodic replacement. The bearing life value decreases gradually from a preset default lifetime value by the period of time for which the eVTOL 100 has been used, and as described later, decreases depending on the overload state. In step S220, it is determined whether the lifetime has reached 0 (zero). If the lifetime has reached 0 (zero), the bearing life value is determined to have reached the bearing lifetime. When a new bearing is installed, the default bearing life value is a preset given life value and prestored in the storage device 62.

If the bearing life value is determined to have reached the bearing lifetime (step S220: YES), the control unit 52 gives notification of a maintenance request for maintenance on the EDS 10 (step S290).

The notification of a maintenance request may be notification issued to the passenger of the eVTOL 100 through the notification unit 66. More specifically, for example, when the display device in the passenger compartment indicates the installation positions of multiple EDSs 10, the EDS 10 that needs component replacement may be indicated by a red lamp. The notification of a maintenance request may be notification issued to the external device 500 through the body communication unit 64. This way of notification raises the expectation that the passenger or a maintenance worker for the eVTOL 100 will perform maintenance on the EDS 10. In response to the execution of step S290, the maintenance necessity detection processing is ended.

If the bearing life value is determined not to have reached the bearing lifetime (step S220: NO), the maintenance necessity detection unit 57 determines whether the output torque detected in step S210 is greater than a threshold A (step S230). The threshold A is a predetermined value determined beforehand by, for example, experiment and set as a threshold torque value indicating that the drive motor 12 is in an overload state.

If the output torque is determined not to be greater than the threshold A (step S230: NO), the processing returns to step S210. In contrast, if the output torque is determined to be greater than the threshold A (step S230: YES), the maintenance necessity detection unit 57 stores the period of time for which the torque value continues to be greater than the threshold A (hereinafter referred to as the overload duration) into the storage device 62 (step S240).

The maintenance necessity detection unit 57 uses the overload duration stored in the storage device 62 in step S240 in the calculation of the bearing life (step S250). Specifically, the maintenance necessity detection unit 57 multiplies the overload duration by a predetermined coefficient (hereinafter referred to as the life reduction coefficient), and subtracts the resultant value from the current lifetime. The degree of life shortening depending on the duration of an overload state is determined beforehand by, for example, experiment, and the life reduction coefficient is set based on the results of the experiment. In the present embodiment, to predict the life more accurately, two or more life reduction coefficients are set for load levels. For an overload state in which the output torque is greater than the threshold A and equal to or smaller than a threshold B described later, a first life reduction coefficient is set. For an overload state in which the output torque is greater than the threshold B, a second life reduction coefficient is set. The second life reduction coefficient is greater than the first life reduction coefficient. The threshold B is a value greater than the threshold A.

The maintenance necessity detection unit 57 determines whether the output torque detected in step S210 is greater than the threshold B (step S260). The threshold B is a predetermined value determined beforehand by, for example, experiment and set as a threshold torque value indicating that the drive motor 12 is in an overload state and the bearing is likely to fail.

If the output torque is determined not to be greater than the threshold B (step S260: NO), the processing returns to step S210. In contrast, if the output torque is determined to be greater than the threshold B (step S260: YES), the maintenance necessity detection unit 57 stores the number of times the output torque exceeds the threshold B and the overload duration for which the output torque is greater than the threshold B into the storage device 62 (step S270). For the number of times the output torque exceeds the threshold B, specifically, one is added to "the number of times the threshold B is exceeded" stored in the storage device 62. By default, "the number of times the threshold B is exceeded" stored in the storage device 62 is set at 0 (zero).

The maintenance necessity detection unit 57 uses the overload duration stored in the storage device 62 in step S270, for which the threshold B is exceeded, in the calculation of the bearing life (step S275). As described above, the second life reduction coefficient is set for an overload state in which the threshold B is exceeded.

The maintenance necessity detection unit 57 determines whether the number of times the threshold B is exceeded is equal to or greater than a predetermined threshold number (step S280). If the number of times the threshold B is exceeded is determined to be smaller than the threshold number (step S280: NO), the processing returns to step S210. If the maintenance necessity detection unit 57 determines that the number of times the threshold B is exceeded is equal to or greater than the threshold number (step S280: YES), then step S290, which is described above, is performed to give notification of a maintenance request for maintenance on the EDS 10.

Figure 17:
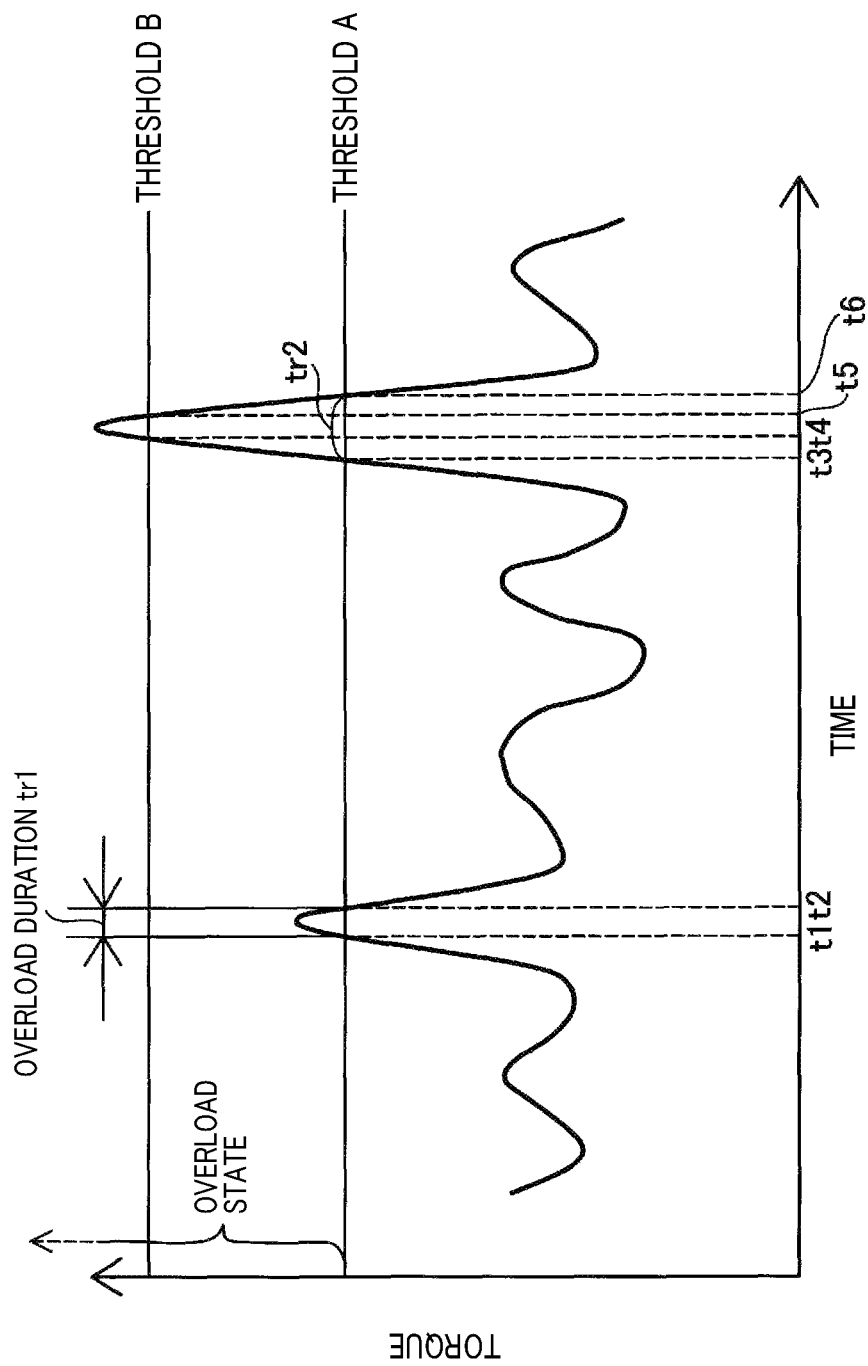
FIG. 17 is a diagram illustrating thresholds set in the tenth embodiment.

As shown in FIG. 17, when excessive torque is temporarily applied to the drive motor 12, the output torque surges to cause an overload state. In FIG. 17, the horizontal axis represents time, and the vertical axis represents output torque. When the output torque exceeds the predetermined threshold A by, for example, external forces, the drive motor 12 enters into an overload state. Moreover, output torque higher than the threshold B increases the likelihood that the bearing will fail.

An overload state runs from a time T1 to a time T2, or during an overload duration TR1. The overload duration TR1 is multiplied by the first life reduction coefficient, and the resultant value is subtracted from the lifetime. Similarly, with an overload state running from a time T3 to a time T6, or during an overload duration TR2, the period from the time T3 to the time T4 of the overload duration TR2 is multiplied by the first life reduction coefficient, and the resultant value is subtracted from the lifetime.

The overload duration ranging from the time T4 to the time T5 is multiplied by the second life reduction coefficient, and the resultant value is subtracted from the lifetime. The overload duration ranging from the time T5 to the time T6 is multiplied by the first life reduction coefficient, and the resultant value is subtracted from the lifetime. For the overload state from the time T4 to the time T5, during which the output torque exceeds the threshold B, the number of times the threshold B is exceeded increases by one, as described above.

The eVTOL 100 according to the tenth embodiment described above achieves the same effects as the eVTOL 100 according to the first embodiment. In addition, for each EDS 10, even if the drive motor 12 itself does not typically need maintenance, the output torque overload duration and the number of times the output torque exceeds the threshold B provide a guide to periodic replacement of the bearing. This allows the bearing to be used up until its lifetime, controlling the running costs of the EDS 10. Moreover, a suspected failure in the bearing can be detected appropriately.

K. 11th Embodiment

Figure 18:
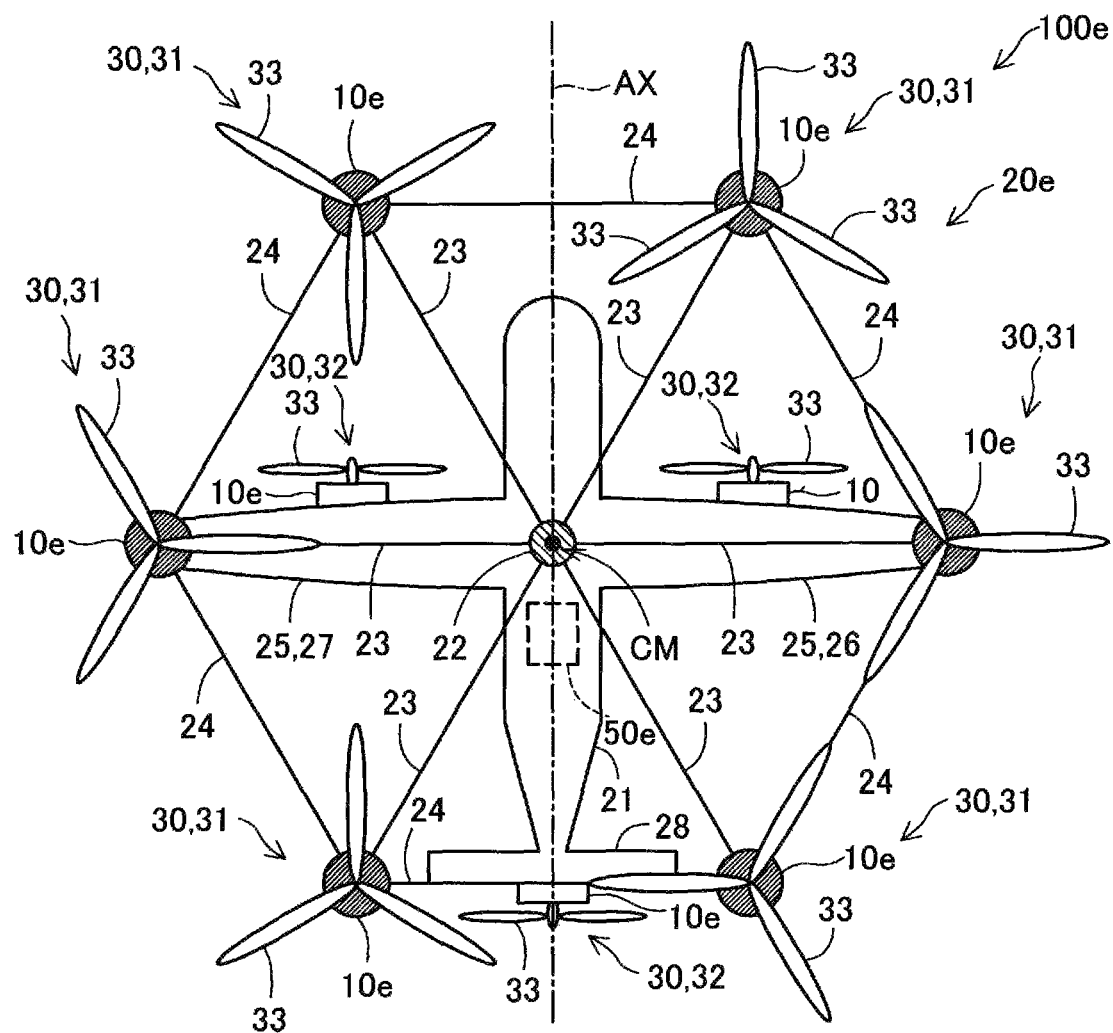
FIG. 18 is a schematic top view illustrating the external structure of an electric vertical takeoff and landing aircraft in an 11th embodiment.
Figure 19:
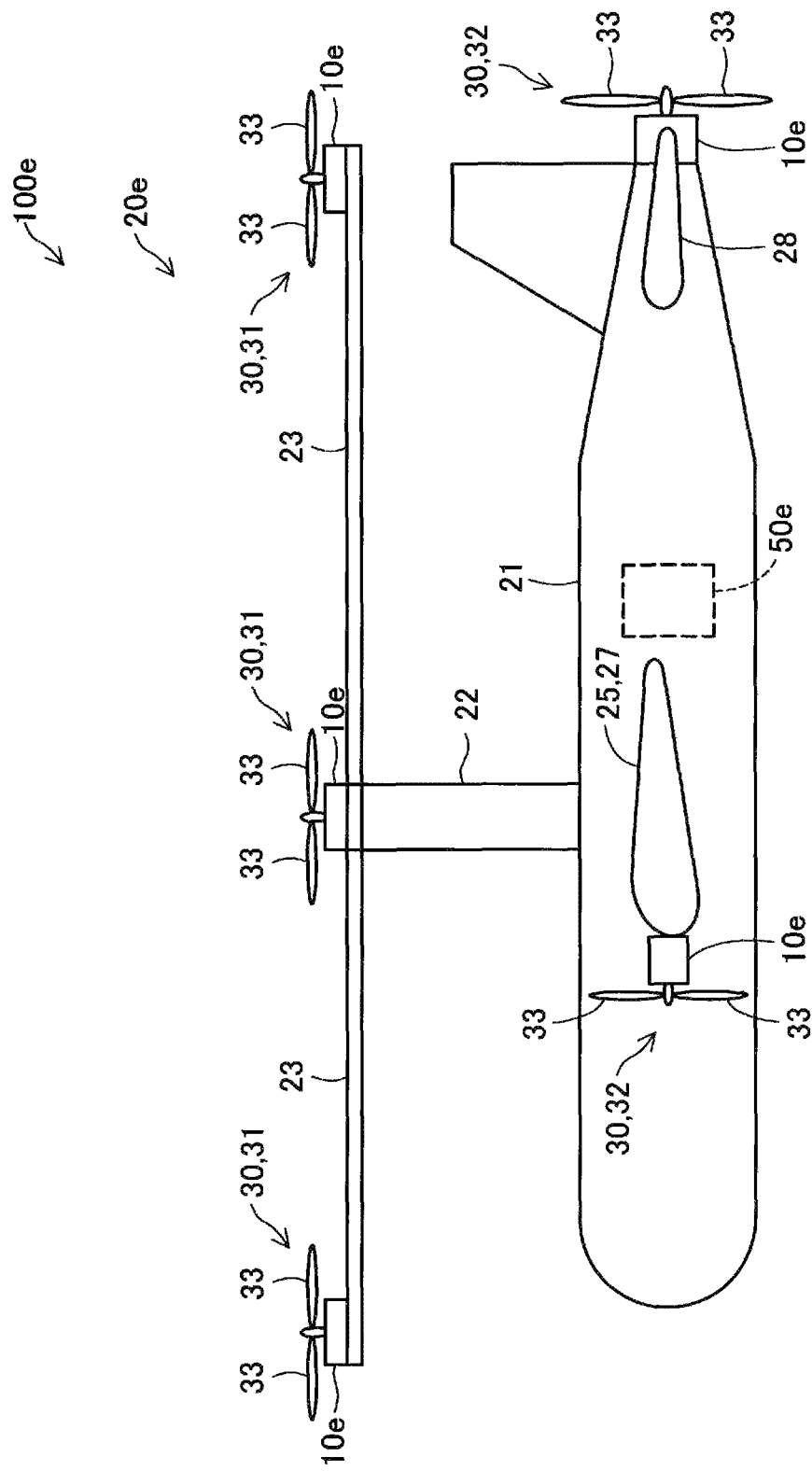
FIG. 19 is a schematic side view illustrating the external structure of the electric vertical takeoff and landing aircraft in the 11th embodiment.

An electric vertical takeoff and landing aircraft 100E (hereinafter also referred to as the eVTOL 100e) shown in FIGS. 18 and 19 is driven by electricity and structured as a manned aircraft that can take off and land vertically. The eVTOL 100e includes a body 20, a plurality of rotors 30, and a plurality of electric drive systems 10e (hereinafter also referred to as the EDSs 10e) that turn the corresponding rotors 30. The eVTOL 100e according to the present embodiment includes nine rotors 30 and nine EDSs 10e.

The body 20 corresponds to the eVTOL 100e from which the nine rotors 30 and the nine EDSs 10e are removed. The body 20 includes an aircraft main body 21, a prop 22, six first supports 23, six second supports 24, main wings 25, and a tail assembly 28.

The aircraft main body 21 forms the fuselage of the eVTOL 100e. The aircraft main body 21 is bilaterally symmetrical about a body axis AX serving as the axis of symmetry. In the present embodiment, the term "body axis AX" refers to an axis passing through a body gravity center CM and extending in the front-and-rear direction of the eVTOL 100e. The term "body gravity center CM" refers to the position of the gravity center of the eVTOL 100e in an empty weight condition without a passenger. The aircraft main body 21 has an internal passenger compartment (not shown).

The prop 22 has a substantially columnar outside shape extending in a vertical direction, and is secured on the top of the aircraft main body 21. In the present embodiment, the prop 22 is positioned at the body gravity center CM of the eVTOL 100e as viewed in a vertical direction. One end of each of the six first supports 23 is fixed to the upper end of the prop 22. The six first supports 23 each have a substantially rodlike outside shape, and are arranged radially at equal angles with respect to each other in a manner to extend along a plane orthogonal to a vertical direction. Each first support 23 has a rotor 30 and an EDS 10e placed on the other end, that is, the end positioned opposite the prop 22. The six second supports 24 each have a substantially rodlike outside shape and connect the other ends of adjacent first supports 23 (the ends not connected to the prop 22).

The main wings 25 include a right wing 26 and a left wing 27. The right wing 26 extends rightward from the aircraft main body 21. The left wing 27 extends leftward from the aircraft main body 21. The tail assembly 28 is formed at the rear end of the aircraft main body 21. The right wing 26, the left wing 27, and the tail assembly 28 are each equipped with one rotor 30 and one EDS 10e.

Six of the nine rotors 30 are arranged at the ends of the second supports 24 and serve as lifting rotors 31 intended mainly to produce the lift for the body 20. The other three of the nine rotors 30 are arranged on the right wing 26, the left wing 27, and the tail assembly 28 on a one-to-one basis, and serve as cruising rotors 32 intended mainly to produce the thrust for the body 20. The rotors 30 turn about their own rotation axes independently of each other. Each rotor 30 includes three blades 33 arranged at equal angles with respect to each other.

The nine EDSs 10e are configured as drive devices intended to turn the corresponding rotors 30. Six of the nine EDSs 10e turn the corresponding lifting rotors 31. The other three of the nine EDSs 10e turn the corresponding cruising rotors 32.

Figure 20:
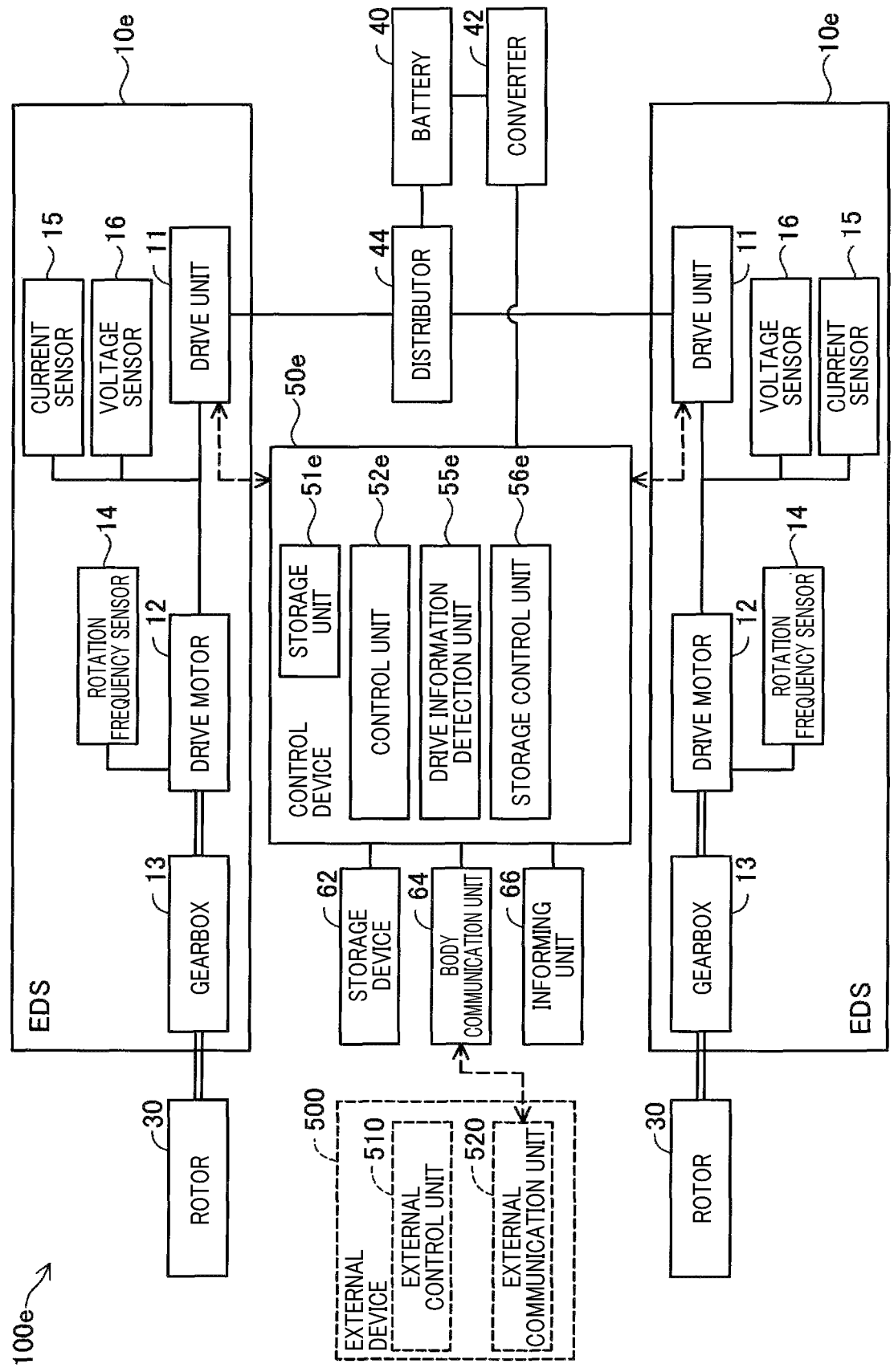
FIG. 20 is a schematic block diagram illustrating the configuration of the electric vertical takeoff and landing aircraft in the 11th embodiment.

As shown in FIG. 20, each EDS 10e includes a drive unit 11, a drive motor 12, a gearbox 13, a rotation frequency sensor 14, a current sensor 15, and a voltage sensor 16. The eVTOL 100e further includes a battery 40, a converter 42, a distributor 44, a control device 50e, a storage device 62, a body communication unit 64, and an notification unit 66. In FIG. 20, of the nine rotors 30 and the nine EDSs 10e included in the eVTOL 100e, two rotors 30 and two EDSs 10e are shown as representatives for convenience of illustration.

The drive unit 11 is configured as an electronic device including an inverter circuit (not shown) and a controller (not shown) that controls the inverter circuit. The inverter circuit is a power device such as an insulated gate bipolar transistor (IGBT) or a metal-oxide-semiconductor field-effect transistor (MOSFET), and feeds a driving voltage to the drive motor 12 at a duty ratio according to a control signal received from the controller. The controller is electrically connected to the control device 50e and sends a control signal to the inverter circuit in accordance with a command from the control device 50e.

The drive motor 12 in the present embodiment is a brushless motor and outputs the rotational motion corresponding to the voltage and the current fed from the inverter circuit in the drive unit 11. It is noted that the brushless motor may be replaced with any motor such as an induction motor or a reluctance motor.

The gearbox 13 physically connects the drive motor 12 and the rotor 30. The gearbox 13 includes multiple gears (not shown), and decelerates and transmits the rotation of the drive motor 12 to the rotor 30. It is noted that the gearbox 13 may be removed, and the drive motor 12 may be connected directly with the rotational shaft of the rotor 30.

The rotation frequency sensor 14 is installed on the drive motor 12 and measures the rotation frequency of the drive motor 12. The current sensor 15 and the voltage sensor 16 are installed between the drive unit 11 and the drive motor 12, and measure the driving current and the driving voltage, respectively. The sensors 14 to 16 output their measurement results through the drive unit 11 to a drive information detection unit 55e described later and included in the control device 50e.

The battery 40 includes lithium ion cells and functions as a power source for the eVTOL 100e. The battery 40 mainly feeds electricity to the drive unit 11 included in each EDS 10e to drive the corresponding drive motor 12. The lithium ion cells may be replaced with any secondary cells such as nickel metal hydride cells. In place of the battery 40 or in addition to the battery 40, any power source such as a fuel cell or an electric generator may be installed.

The converter 42 is connected to the battery 40, and steps down and feeds the voltage of the battery 40 to the control device 50e and the auxiliary equipment (not shown) included in the eVTOL 100e. The distributor 44 distributes the voltage of the battery 40 to the drive unit 11 included in each EDS 10e.

The control device 50e is a microcomputer including a storage unit 51e and a central processing unit (CPU), and configured as an electronic control unit (ECU). The storage unit 51e includes read only memory (ROM) and random access memory (RAM). The CPU executes the control programs prestored in the storage unit 51e to function as a control unit 52, the drive information detection unit 55e, and a storage control unit 56e.

The control unit 52 controls the overall operation of the eVTOL 100e. For example, the overall operation of the eVTOL 100e includes vertical takeoff and landing operations and flight operations. The vertical takeoff and landing operations and the flight operations may be performed based on set flight path information, by passenger piloting, or based on commands from an external control unit 510 included in an external device 500 described later. In the operation of the eVTOL 100e, the control unit 52 controls the rotation frequency and the rotational direction of the drive motor 12 included in each EDS 10e. The control unit 52 also executes processing for regulating the frequency of maintenance in the eVTOL 100e as a whole, that is, processing for causing the requested output for an EDS 10e having a higher degree of deterioration to be smaller than the requested output for an EDS 10e having a lower degree of deterioration (hereinafter referred to as the cumulative load leveling processing). The cumulative load leveling processing will be described in detail later.

The drive information detection unit 55e detects drive information on each EDS 10e. The drive information includes motor information serving as an indicator of the deterioration state of the drive motor 12 and drive unit information serving as an indicator of the deterioration state of the drive unit 11. The motor information corresponds to, for example, information measured by the rotation frequency sensor 14 included in each EDS 10e (the rotation frequency of the drive motor 12). The drive unit information corresponds to, for example, information measured by the current sensor 15 and the voltage sensor 16 included in each EDS 10e (a driving current value and a driving voltage value). It is noted that the drive information is not limited to these items of information, but may include information measured by sensors (not shown) such as a torque sensor, a temperature sensor, and a vibration sensor or may be some of these information items. These information items are sent to the drive information detection unit 55e via the drive unit 11 in each EDS 10e.

The storage control unit 56e, as described later, performs drive history information update processing on the history of the drive information. The storage control unit 56e in the present embodiment stores the updated drive history information into the storage device 62 included in the eVTOL 100e. The drive history information is information correlated with the degree of deterioration in the EDS 10e and corresponds to, for example, cumulative load values such as the cumulative operating time of the EDS 10e, the cumulative number of rotations of the drive motor 12, and the cumulative driving current of the drive motor 12. The cumulative operating time of the EDS 10e may be, for example, a period of time during which at least a predetermined driving current value is measured.

The storage device 62 is configured as a memory including ROM and RAM, and stores drive history information in accordance with an instruction from the storage control unit 56e.

The body communication unit 64 has the function of wireless communications, which allows transmission and reception of information between the eVTOL 100e and an external communication unit 520 included in the external device 500, and also communication with the control device 50e. Examples of wireless communications include civilian VHF (VERY HIGH FREQUENCY) wireless communications, wireless communications provided by telecommunications carriers such as 4G (fourth generation wireless system) or 5G (fifth generation wireless system) wireless communications, and wireless LAN communications according to the IEEE 802.11 standard. In other examples, wired communications may be used according to the USB (UNIVERSAL SERIAL BUS) standard or the IEEE 802.3 standard. The external device 500 corresponds to, for example, a computer for management and control such as a server device that records maintenance on each EDS 10e. For example, the computer for management and control may be a server device placed in an air traffic control room or a personal computer brought to a place for use of the eVTOL 100e by a maintenance worker who performs maintenance on each EDS 10e.

The notification unit 66 gives notification in accordance with an instruction from the control device 50e. In the present embodiment, the notification unit 66 includes a display device that is installed in the passenger compartment and displays characters and images and a speaker that outputs voice and a warning sound, and informs the passenger of various types of information through visual information and audio information.

Figure 21:
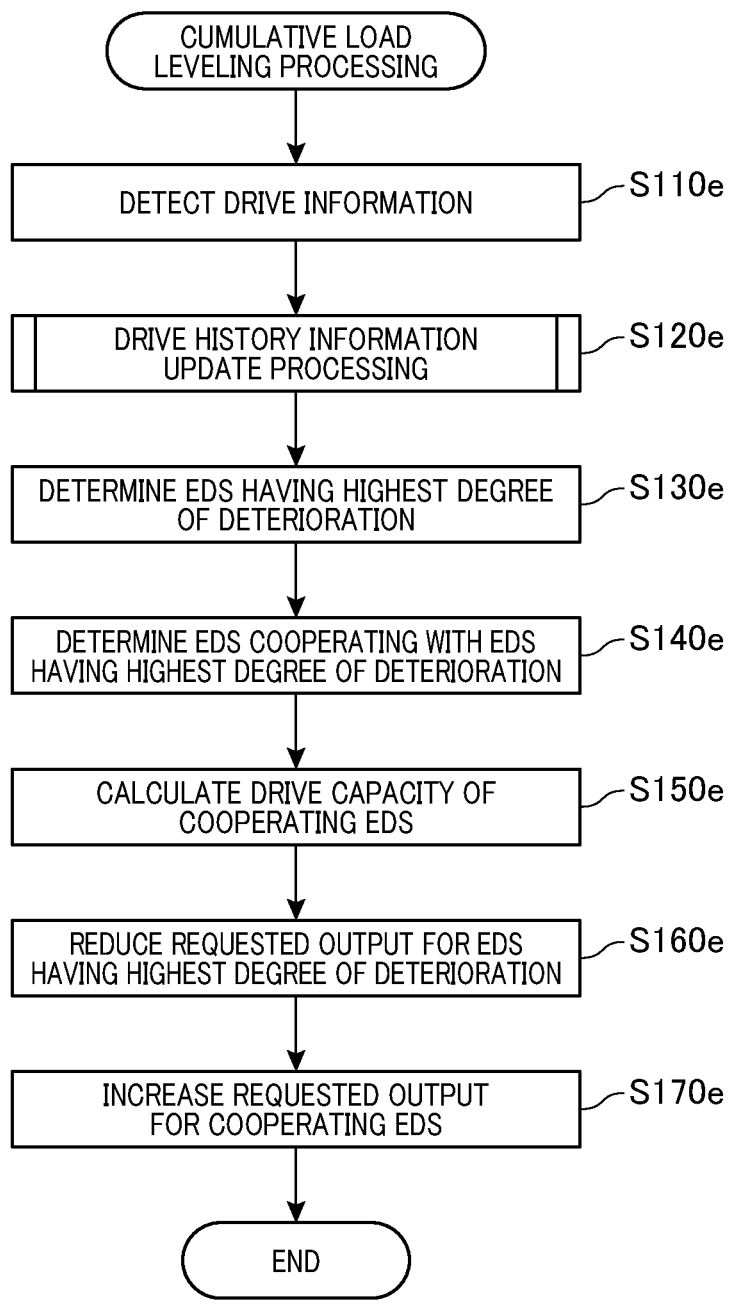
FIG. 21 is a flowchart showing the procedure of cumulative load leveling processing.

The cumulative load leveling processing shown in FIG. 21 is executed repeatedly by the control device 50e when the start switch of the eVTOL 100e is turned on.

The drive information detection unit 55e detects drive information (step S110e). The storage control unit 56e performs the drive history information update processing (step S120e).

Figure 22:
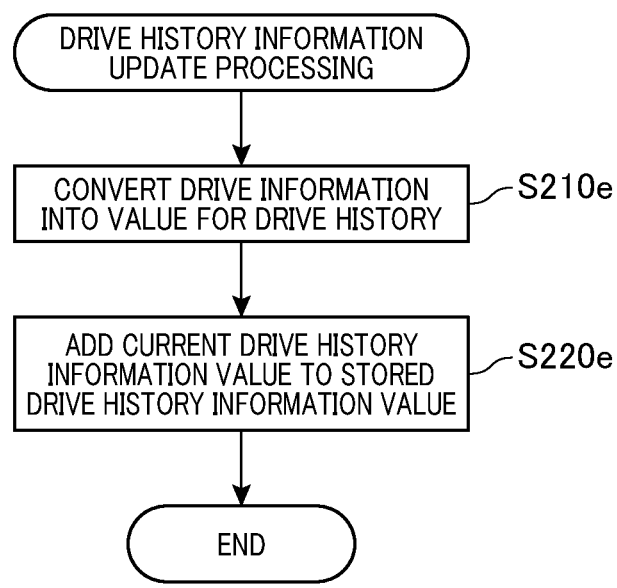
FIG. 22 is a flowchart showing the procedure of drive history information update processing.

As shown in FIG. 22, in the drive history information update processing according to the present embodiment, the storage control unit 56e converts the drive information detected by the drive information detection unit 55e into a value for drive history information (step S210e). In the present embodiment, the value for drive history information is history information obtained by combining the rotation frequency of the drive motor 12 measured by the rotation frequency sensor 14 and the driving current value measured by the current sensor 15. The history information may be produced by, for example, substituting the rotation frequency and the driving current value of the drive motor 12 into a predetermined operation expression. The operation expression may be, for example, an expression in which the driving current value is weighted to be more reflective of the degree of deterioration than the rotation frequency of the drive motor 12. It is noted that the value for drive history information is not limited to these values, but may be history information obtained by combining any types of drive information or information that is a converted value obtained by changing the drive information in line with the deterioration rate of the EDS 10e. The use of history information obtained by combining multiple items of drive information can save the memory of the storage device 62. The use of a converted value allows the degree of deterioration in the EDS 10e to be indicated more appropriately even if the drive information does not correspond linearly to the deterioration rate of the EDS 10e. Alternatively, the detected drive information may be used directly as a value for drive history information. In other words, step S210e may be skipped.

The storage control unit 56e adds the current drive history information value to the drive history information value stored in the storage device 62 (step S220e). In response to the execution of step S220e, the drive history information stored in the storage device 62 is updated and stored. In the present embodiment, the drive history information is updated and stored in the form of the information that combines the cumulative number of rotations and the cumulative driving current of the drive motor 12. After that, the drive history information update processing is ended.

As shown in FIG. 21, the control unit 52e uses the drive history information updated and stored in step S120e to determine the EDS 10e having the highest degree of deterioration among the multiple EDSs 10e (step S130e). The EDS 10e having the highest degree of deterioration has the highest cumulative load value and is thus estimated to need maintenance earliest among the multiple EDSs 10e. The maintenance on the EDS 10e corresponds to the replacement of the EDS 10e, the replacement of a component in the EDS 10e, or a periodic inspection of the EDS 10e.

The control unit 52e determines an EDS 10e cooperating with the EDS 10e having the highest degree of deterioration (step S140e). The cooperating EDS 10e refers to an EDS 10e that cooperates in producing the lift or the thrust for the eVTOL 100e. The cooperating EDS 10e corresponds to, for example, the EDS 10e that produces the thrust in the same direction. The requested output for EDSs 10e cooperating with each other is assumed to be substantially equal. The cooperating EDS 10e determined in step S140e refers to an EDS 10e that functions similarly to the EDS 10e having the highest degree of deterioration and is located near the EDS 10e having the highest degree of deterioration, and can serve as a cooperating system. In step S140e, the control unit 52e may determine a single EDS 10e as a cooperating EDS 10e or multiple EDSs 10e as cooperating EDSs 10e. The cooperating EDS 10e determined in step S140e is lower in the degree of deterioration than the EDS 10e having the highest degree of deterioration determined in step S130e.

The control unit 52e calculates the drive capacity of the cooperating EDS 10e (step S150E). The drive capacity corresponds to the amount of reducible load on the EDS 10e having the highest degree of deterioration.

The control unit 52e reduces the requested output for the EDS 10e having the highest degree of deterioration determined in step S130e (step S160e). The requested output is set in accordance with the drive capacity calculated in step S150E. In step S160e, the control unit 52e may set the requested output to zero.

The control unit 52e increases the requested output for the cooperating EDS 10e determined in step S140e (step S170e). As a result of steps S160e and S170e, the requested output for the EDS 10e having the highest degree of deterioration becomes smaller than the requested output for the cooperating EDS 10e. In each EDS 10e, the drive motor 12 is driven in accordance with its requested output to turn the corresponding rotor 30. After that, the cumulative load leveling processing is ended.

In the eVTOL 100e according to the 11th embodiment described above, the control unit 52e performs the cumulative load leveling processing for causing the requested output for an EDS 10e having a higher degree of deterioration to be smaller than the requested output for an EDS 10e having a lower degree of deterioration, thus enabling the leveling of the cumulative load values of the multiple EDSs 10e. This processing allows a delay in maintenance on an EDS 10e of the multiples EDSs 10e that is estimated to need maintenance relatively early. For example, this enables maintenance on an EDS 10e having a higher degree of deterioration to be timed to coincide with maintenance on another EDS 10e. Thus, in the eVTOL 100e according to the present embodiment, the stored drive history information is used to perform the cumulative load leveling processing as processing as to maintenance on the multiple EDSs 10e, preventing variations among maintenance timings for the different EDSs 10e. This can regulate the frequency of maintenance in the eVTOL 100e as a whole.

Furthermore, the requested output for the EDS 10e having the highest degree of deterioration becomes smaller than the requested output for the other EDS 10e cooperating with the EDS 10e, thus enabling a delay in maintenance on the EDS 10e estimated to need maintenance earliest among the multiple EDSs 10e. This allows an effective delay in maintenance for the eVTOL 100e as a whole and thus more effectively regulates the frequency of maintenance in the eVTOL 100e as a whole.

Furthermore, the use of the drive history information that is history information obtained by combining multiple drive information items can save the memory of the storage device 62. Furthermore, the control device 50e is installed in the eVTOL 100e, and the storage device 62 stores the drive history information. This structure eliminates the need for communication with the external device 500 during the cumulative load leveling processing, preventing an interruption of the cumulative load leveling processing caused by, for example, a communication failure.

L. 12th Embodiment

Figure 23:
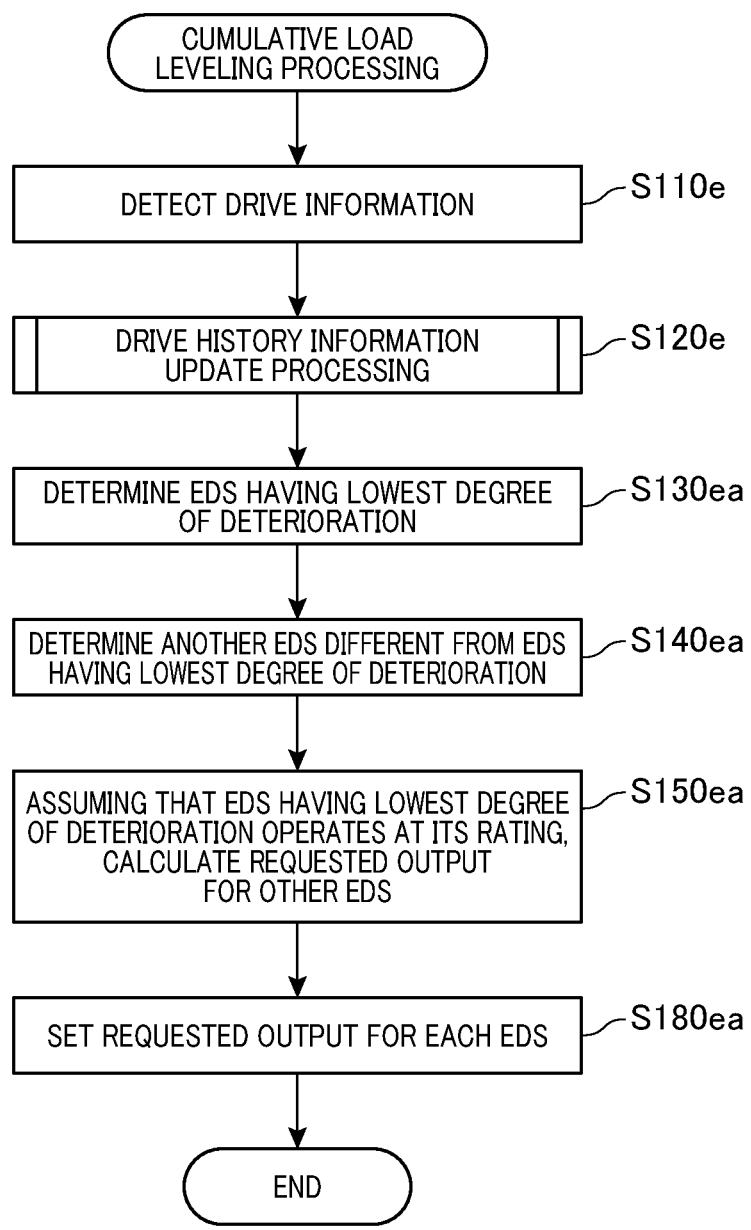
FIG. 23 is a flowchart showing the procedure of cumulative load leveling processing in a 12th embodiment.

As shown in FIG. 23, an eVTOL 100 according to a 12th embodiment is different from the eVTOL 100 according to the 11th embodiment in that the cumulative load leveling processing performed by the control unit 52e includes steps S130ea to S180ea in place of steps S130e to S170e. The other components including the device configuration are the same as in the eVTOL 100 according to the 11th embodiment, and thus a detailed description thereof will be omitted by using the same reference numerals to denote the same components.

The control unit 52e uses the drive history information updated and stored in step S120e to determine the EDS 10 having the lowest degree of deterioration among the multiple EDSs 10 (step S130ea). The EDS 10 having the lowest degree of deterioration corresponds to the EDS 10 having the lowest cumulative load value and estimated to need maintenance latest among the multiple EDSs 10.

The control unit 52e determines another EDS 10 different from the EDS 10 having the lowest degree of deterioration determined in step S130ea (step S140ea). In step S140ea, the control unit 52e may determine a single EDS 10 or multiple EDSs 10. The EDS 10 determined in step S140ea corresponds to an EDS 10 having a load to be leveled because of being higher in the degree of deterioration than the EDS 10 having the lowest degree of deterioration determined in step S130ea. The other EDS 10 different from the EDS 10 having the lowest degree of deterioration may be the EDS 10 corresponding to the cooperating EDS 10 determined in the cumulative load leveling processing according to the 11th embodiment.

Assuming that the EDS 10 having the lowest degree of deterioration operates at its rating with the maximum requested output, the control unit 52e calculates the requested output for the other EDS 10 determined in step S140ea (step S150ea).

The control unit 52e sets the requested output for a rated operation to the EDS 10 determined in step S130ea, and sets the requested output calculated in step S150ea to the other EDS 10 determined in step S140ea (step S180ea). This enables the requested output for the EDS 10 having the lowest degree of deterioration to be smaller than the requested output for the EDS 10 having a higher degree of deterioration. As a result of step S180ea, in each EDS 10, the drive motor 12 is driven in accordance with its requested output to turn the corresponding rotor 30. After that, the cumulative load leveling processing is ended.

The eVTOL 100 according to the 12th embodiment described above achieves the same effects as the eVTOL 100 according to the 11th embodiment. In addition, the control unit 52e performs the cumulative load leveling processing for causing the requested output for the EDS 10 having the lowest degree of deterioration to be greater than the requested output for an EDS 10 having a higher degree of deterioration. This processing stimulates the operation of the EDS 10 estimated to need maintenance relatively late among the multiple EDSs 10, reducing the load on the other EDS 10 estimated to need maintenance relatively early. This enables a delay in maintenance on the other EDS 10. For example, after replacement of one of the multiple EDSs 10, the new EDS 10 may have a cumulative load value much lower than the cumulative load value of the other EDSs 10. Even in such a case, the leveling of the cumulative load values of the multiple EDSs 10 can prevent variations among maintenance timings for the different EDSs 10. This can regulate the frequency of maintenance in the eVTOL 100 as a whole.

M. 13th Embodiment

Figure 24:
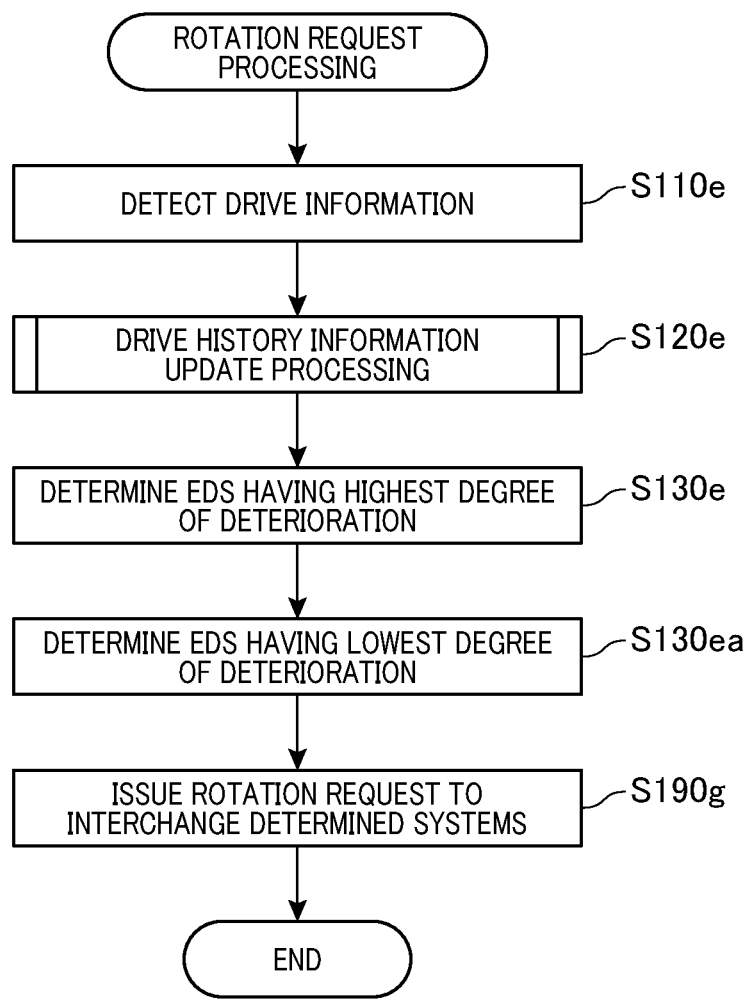
FIG. 24 is a flowchart showing the procedure of rotation request processing.

As shown in FIG. 24, an eVTOL 100 according to a 13th embodiment is different from the eVTOL 100 according to the 11th embodiment in that the cumulative load leveling processing is replaced with or the cumulative load leveling processing is added to processing for issuing a request to interchange an EDS 10 having a high degree of deterioration and an EDS 10 having a low degree of deterioration (hereinafter referred to as the rotation request processing). The other components including the device configuration are the same as in the eVTOL 100 according to the 11th embodiment, and thus a detailed description thereof will be omitted by using the same reference numerals to denote the same components. In the 13th embodiment, the storage device 62 stores the drive history information on each EDS 10 and also the identification information on each EDS 10.

The rotation request processing is executed repeatedly by the control device 50 when the start switch of the eVTOL 100 is turned on.

The drive information detection unit 55e detects drive information (step S110e). The storage control unit 56e performs the drive history information update processing (step S120e). The control unit 52e uses the drive history information updated and stored in step S120e to determine the EDS 10 having the highest degree of deterioration among the multiple EDSs 10 (step S130e). The processing of steps S110e to S130e is performed in the same manner as steps S110e to S130e in the cumulative load leveling processing in the 11th embodiment.

The control unit 52e uses the drive history information updated and stored in step S120e to determine the EDS 10 having the lowest degree of deterioration among the multiple EDSs 10 (step S130ea). Step S130ea is performed in the same manner as step S130ea in the 12th embodiment. Step S130ea may be performed before the execution of step S130e.

The control unit 52e issues a request to interchange the EDS 10 determined in step S130e and the EDS 10 determined in step S130ea (step S190g). Hereinafter, this request is also referred to as a rotation request. The rotation request may be a request to physically interchange the installation positions of the two determined EDSs 10 or a request to electrically combine the EDSs 10 and the rotors 30 differently by, for example, switching the wiring connections. The installation positions of the two determined EDSs 10 may be physically interchanged by not only the rotation between the EDSs 10 but also the interchange of the sets of the EDSs 10 and the rotors 30 turned by the corresponding EDSs 10. The rotation request may be issued via the notification unit 66 to the passenger or a maintenance worker for the eVTOL 100 or via the body communication unit 64 to the external device 500. In response to the execution of step S190g, the rotation request processing is ended. The issue of the rotation request forms the expectation that the passenger or a maintenance worker for the eVTOL 100 will perform the rotation between an EDS 10 having a high degree of deterioration and an EDS 10 having a low degree of deterioration.

In the eVTOL 100 according to the 13th embodiment described above, the control unit 52e performs the rotation request processing to issue a rotation request to interchange an EDS 10 having a high degree of deterioration and an EDS 10 having a low degree of deterioration. Then, the execution of the rotation can reduce future variations among the cumulative load values of the multiple EDSs 10, enabling a delay in maintenance on the EDS 10 having the high degree of deterioration. Thus, in the eVTOL 100 according to the 13th embodiment, the stored drive history information is used to perform the rotation request processing as processing as to maintenance on the multiple EDSs 10, preventing variations among maintenance timings for the different EDSs 10. This can regulate the frequency of maintenance on the eVTOL 100 as a whole.

Furthermore, a rotation request is issued to interchange the EDS 10 having the highest degree of deterioration and the EDS 10 having the lowest degree of deterioration. Thus, the EDS 10 estimated to need maintenance earliest among the multiple EDSs 10 and the EDS 10 estimated to need maintenance latest among the multiple EDSs 10 may have maintenance timings made closer to each other. This can effectively prevent variations among maintenance timings for the different EDSs 10 even when, for example, the EDS 10 at a particular installation position has a much higher degree of deterioration.

Furthermore, the issue of a rotation request enables a reduction in future variations among the cumulative load values of the multiple EDSs 10. Thus, for example, even an eVTOL 100 with few or no cooperating EDSs 10 due to smaller numbers of installed EDSs 10 and rotors 30 also allows effective prevention of variations among maintenance timings for the EDSs 10. In addition, since the storage device 62 stores the drive history information on each EDS 10 and also the identification information on each EDS 10, the drive history information on the multiple EDSs 10 can be managed appropriately after the execution of rotation. Moreover, the eVTOL 100 according to the 13th embodiment described above achieves the same effects as the eVTOL 100 according to the 11th embodiment.

N. 14th Embodiment

Figure 25:
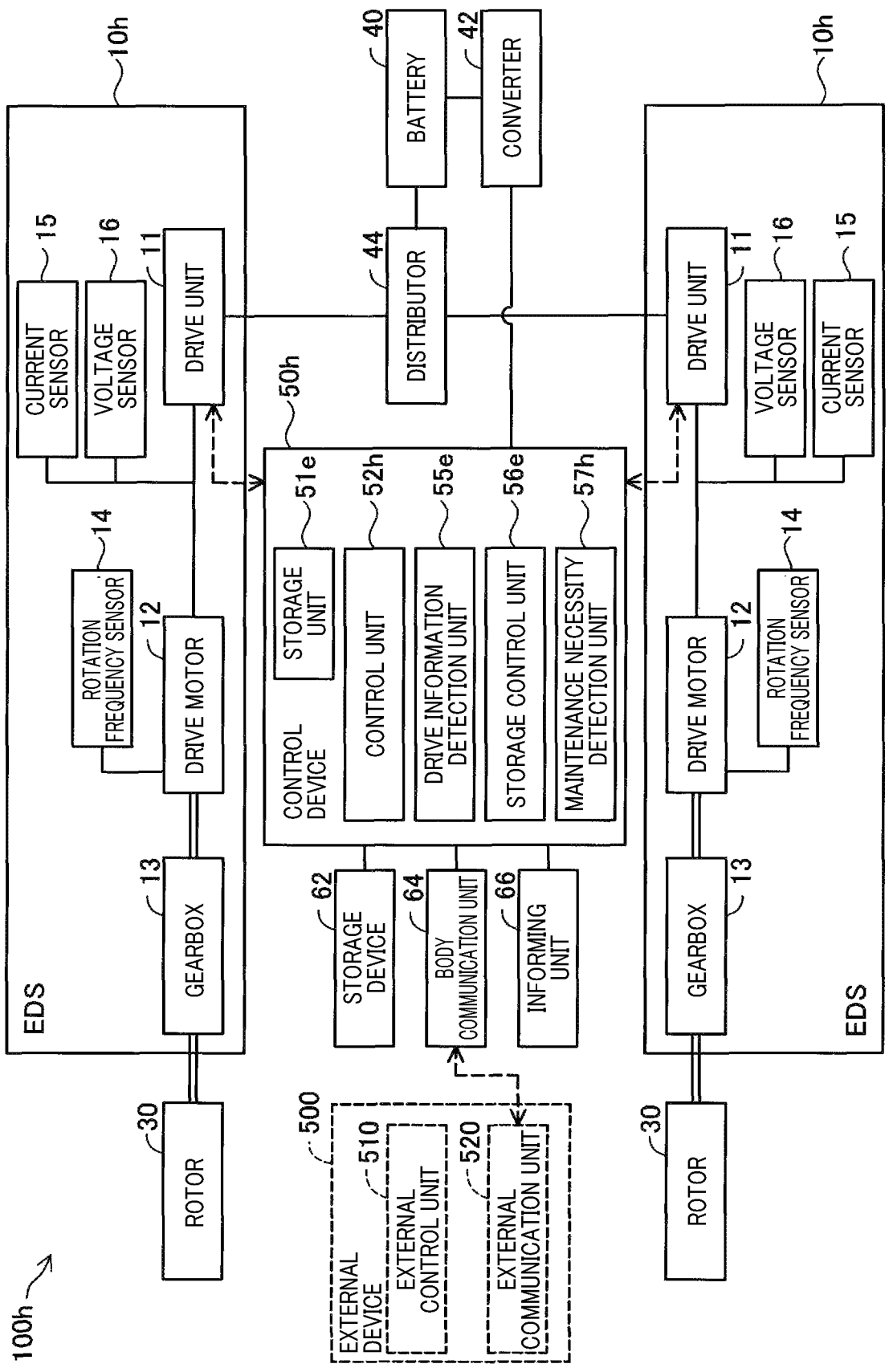
FIG. 25 is a schematic block diagram illustrating the configuration of an electric vertical takeoff and landing aircraft in a 14th embodiment.

An eVTOL 100h according to a 14th embodiment shown in FIG. 25 is different from the eVTOL 100e according to the 13th embodiment in including a control device 50h in place of the control device 50. The control device 50h includes a control unit 52h, which further performs the processing of detecting the necessity or lack of necessity of maintenance on EDSs 10h (hereinafter referred to as the maintenance necessity detection processing), and performs the rotation request processing depending on the results of the maintenance necessity detection processing. The other components are the same as in the eVTOL 100e according to the 13th embodiment, and thus a detailed description thereof will be omitted by using the same reference numerals to denote the same components.

The control device 50h further includes a maintenance necessity detection unit 57h. The maintenance necessity detection unit 57h uses the drive history information stored in the storage device 62 to detect the necessity or lack of necessity of maintenance on each EDS 10h.

Figure 26:
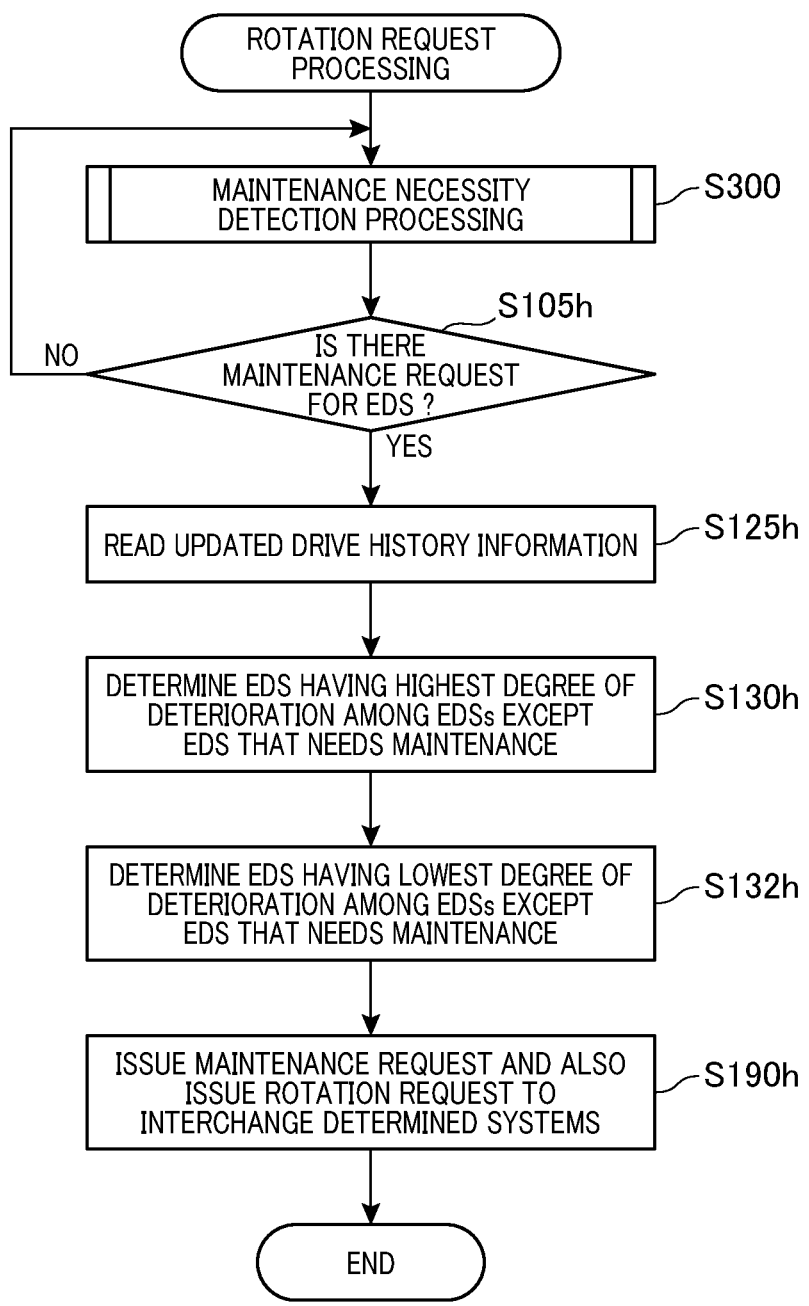
FIG. 26 is a flowchart showing the procedure of rotation request processing in the 14th embodiment.

In the rotation request processing in the 14th embodiment shown in FIG. 26, a rotation request is issued depending on the results of the maintenance necessity detection processing.

Figure 27:
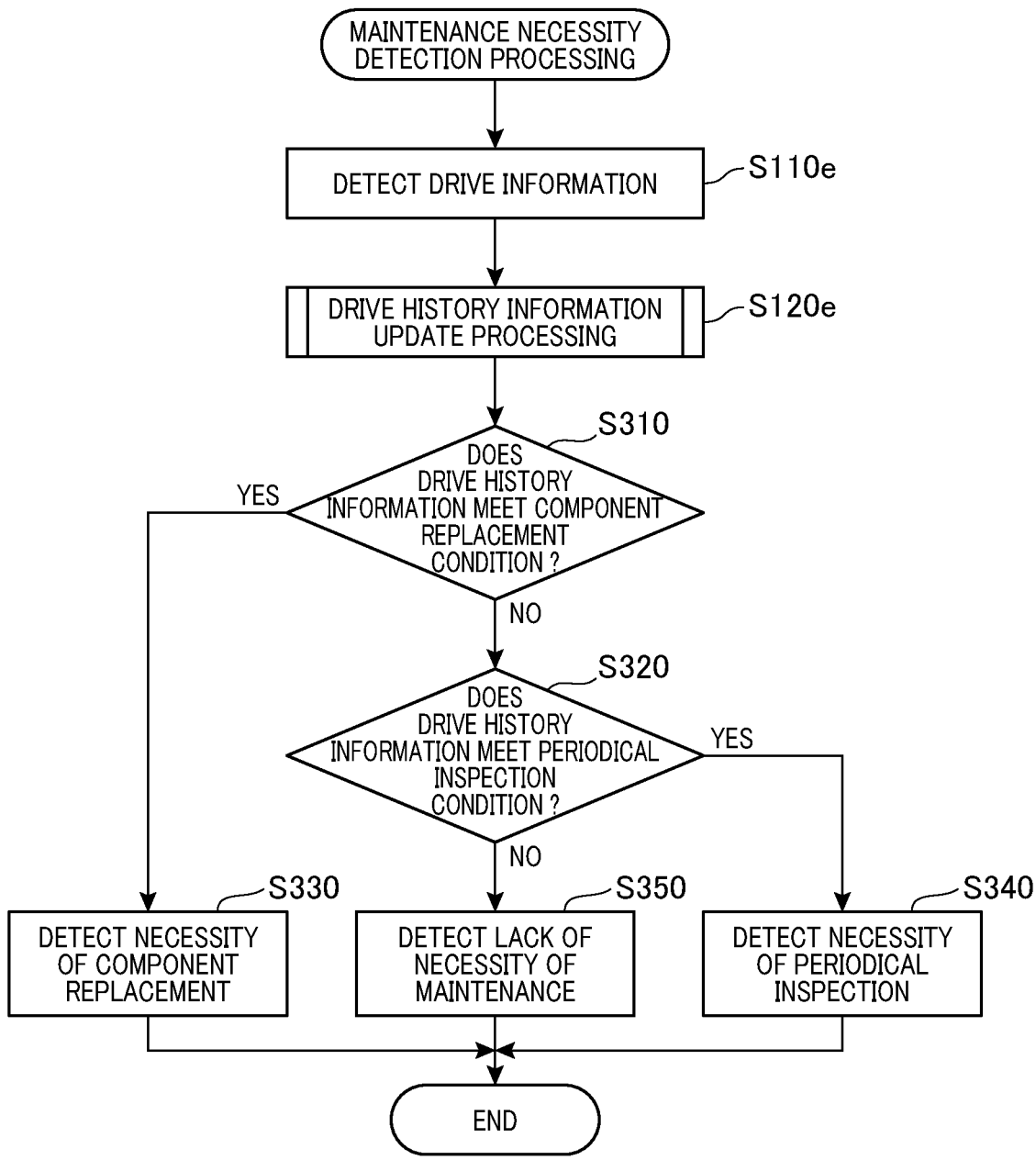
FIG. 27 is a flowchart showing the procedure of maintenance necessity detection processing.

The maintenance necessity detection processing shown in FIG. 27 is executed repeatedly by the control device 50h as the start switch of the eVTOL 100h is turned on.

The drive information detection unit 55e detects drive information (step S110e). The storage control unit 56e performs the drive history information update processing (step S120e). The processing of steps S110e and S120e is performed in the same manner as steps S110e and S120e in the cumulative load leveling processing in the 11th embodiment.

The maintenance necessity detection unit 57h determines whether the drive history information updated and stored in step S120e meets a component replacement condition (step S310). The component replacement condition is preset and stored in the storage device 62 as a condition under which the EDS 10h may be estimated to have deteriorated to such an extent that the replacement of a component in the EDS 10h is recommended. The component replacement condition in the present embodiment is that the cumulative load value as the drive history information is equal to or greater than a predetermined component replacement threshold. The component replacement threshold may be, for example, a threshold for the cumulative operating time of the drive motor 12, a threshold for the cumulative number of rotations of the drive motor 12, or a threshold for the cumulative driving current of the drive motor 12.

If the drive history information is determined to meet the component replacement condition (step S310: YES), the maintenance necessity detection unit 57h detects the necessity of component replacement (step S330). In response to the execution of step S330, the maintenance necessity detection processing is ended.

If the drive history information is determined not to meet the component replacement condition (step S310: NO), the maintenance necessity detection unit 57h determines whether the drive history information meets a periodic inspection condition (step S320). The periodic inspection condition is preset and stored in the storage device 62 as a condition under which the EDS 10h may be estimated to have deteriorated to such an extent that a periodic inspection of the EDS 10h is recommended. The periodic inspection condition in the present embodiment is that the cumulative load value as to the drive history information is equal to or greater than a predetermined periodic inspection threshold. The periodic inspection threshold is set at a value smaller than the component replacement threshold. In other words, each EDS 10h in the present embodiment undergoes a periodic inspection and then further operates before component replacement.

If the drive history information is determined to meet the periodic inspection condition (step S320: YES), the maintenance necessity detection unit 57h detects the necessity of a periodic inspection (step S340). In response to the execution of step S340, the maintenance necessity detection processing is ended.

If the drive history information is determined not to meet the periodic inspection condition (step S320: NO), the maintenance necessity detection unit 57h detects the lack of necessity of maintenance (step S350). The control unit 52h, after the execution of step S350, may give notification of the lack of necessity of maintenance. The notification of the lack of necessity of maintenance may be notification issued to the passenger of the eVTOL 100h through the notification unit 66 or may be notification issued to the external device 500 through the body communication unit 64. In response to the execution of step S350, the maintenance necessity detection processing is ended.

As shown in FIG. 26, the control unit 52h uses the results of the maintenance necessity detection processing to determine whether there is a maintenance request for at least one of the multiple EDSs 10h (step S105h). If the absence of a maintenance request is determined for any EDS 10h (step S105h: NO), the processing returns to step S300.

If the presence of a maintenance request is determined for an EDS 10h (step S105h: YES), or in other words, there is an EDS 10h that needs maintenance, the control unit 52h reads the drive history information updated and stored in step S120e of the maintenance necessity detection processing (step S125h). The control unit 52h uses the drive history information read in step S125h to determine the EDS 10h having the highest degree of deterioration among the other EDSs 10h except the EDS 10h that needs maintenance (step S130h). Step S130h is performed in the same manner as step S130 in the 13th embodiment.

The control unit 52h uses the drive history information read in step S125h to determine the EDS 10h having the lowest degree of deterioration among the EDSs 10h except the EDS 10h that needs maintenance (step S132h). Step S132h is performed in the same manner as step S130ea in the 13th embodiment. Step S132h may be performed before the execution of step S130h.

The control unit 52h issues the maintenance request for the EDS 10h for which the necessity of maintenance is detected in step S330 or S340 of the maintenance necessity detection processing and also issues a rotation request to interchange the EDS 10*h* determined in step S130*h* and the EDS 10*h* determined in step S132*h* (step S190*h*). The maintenance request and the rotation request may be issued to the passenger of the eVTOL 100*h* through the notification unit 66 or issued to the external device 500 through the body communication unit 64. In response to the execution of step S190*h*, the rotation request processing is ended.

In the present embodiment, the component replacement threshold and the periodic inspection threshold each correspond to a first threshold in the present disclosure.

The eVTOL 100*h* according to the 14th embodiment described above achieves the same effects as the eVTOL 100*e* according to the 13th embodiment. In addition, the maintenance necessity detection unit 57*h* is included to use the stored drive history information to detect the necessity or lack of necessity of maintenance on each of the multiple EDSs 10*h*, thus allowing the maintenance timing for each of the multiple EDSs 10*h* to be determined appropriately. The maintenance necessity detection unit 57*h* also detects the necessity of maintenance on an EDS 10*h* with its cumulative load value as the drive history information being equal to or greater than the predetermined threshold, and can thus detect the necessity or lack of necessity of maintenance with high accuracy. Furthermore, the necessity or lack of necessity of maintenance is detected with component replacement and a periodic inspection separated from each other, thus allowing the component replacement timing and the periodic inspection timing for each of the multiple EDSs 10*h* to be determined appropriately.

Additionally, in the rotation request processing, a rotation request is issued when there is a maintenance request for at least one of the multiple EDSs 10*h*, and the rotation between EDSs 10*h* can be performed along with the maintenance on the EDS 10*h* that needs maintenance. This efficient rotation enables the frequency of maintenance to be regulated more effectively.

O. 15th Embodiment

Figure 28:
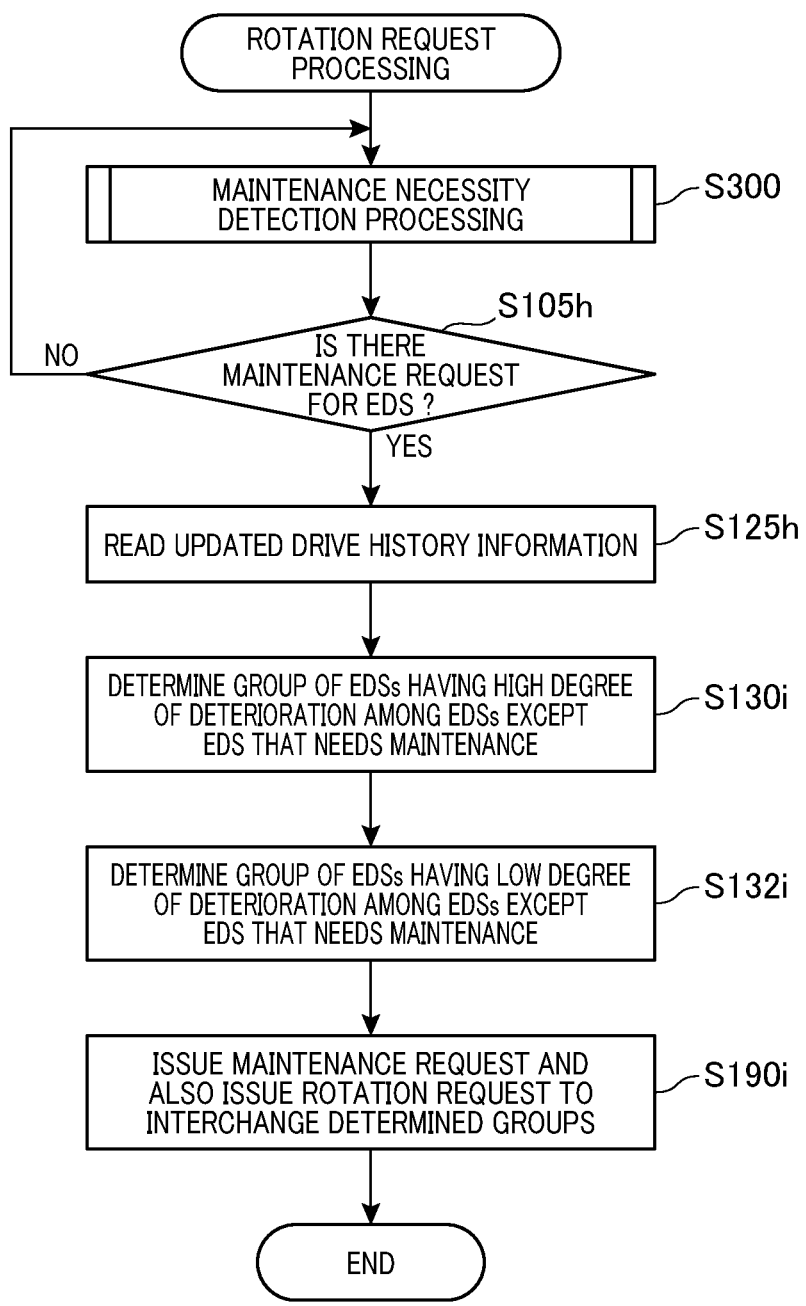
FIG. 28 is a flowchart showing the procedure of rotation request processing in a 15th embodiment.

As shown in FIG. 28, an eVTOL 100*h* according to a 15th embodiment is different from the eVTOL 100*h* according to the 14th embodiment in that the rotation request processing performed by the control unit 52*h* includes steps S130*i*, S132*i*, and S190*i* in place of steps S130*h*, S132*h*, and S190*h*. The other components including the device configuration are the same as in the eVTOL 100*h* according to the 14th embodiment, and thus a detailed description thereof will be omitted by using the same reference numerals to denote the same components.

The control unit 52*h* reads the drive history information updated and stored in step S120*e* of the maintenance necessity detection processing (step S125*h*). The control unit 52*h* uses the drive history information read in step S125*h* to determine the group of EDSs 10*h* having the highest degree of deterioration among the EDSs 10*h* except the EDS 10*h* that needs maintenance (step S130*i*). In the present embodiment, the multiple EDSs 10*h* are classified beforehand into multiple groups each composed of some EDSs 10*h*. The EDSs 10*h* may not be classified beforehand into groups, but may be grouped in step S130*i*. Furthermore, a group may be composed of EDSs 10*h* cooperating with each other. For example, when the three EDSs 10*h* that turn the three lifting rotors 31 to the right of the body 20 have a high degree of deterioration, the three EDSs 10*h* may be determined as a group in step S130*i*.

The control unit 52*h* determines a group of EDSs 10*h* having a low degree of deterioration among the EDSs 10*h* except the EDS 10*h* that needs maintenance (step S132*i*). In the example described above, when the three EDSs 10*h* that turn the three lifting rotors 31 to the left of the body 20 have a low degree of deterioration, the three EDSs 10*h* may be determined as a group in step S132*i*. The group determined in step S132*i* includes as many EDSs 10*h* as the EDSs 10*h* included in the group determined in step S130*i*. Step S132*i* may be performed before the execution of step S130*i*.

The control unit 52*h* issues a maintenance request for the EDS 10*h* for which the necessity of maintenance is detected in step S330 or S340 of the maintenance necessity detection processing and also issues a rotation request to interchange the group of EDSs 10*h* determined in step S130*i* and the group of EDSs 10*h* determined in step S132*i* (step S190*i*). In response to the execution of step S190*i*, the rotation request processing is ended. In the example described above, rotation is expected between the installation positions of the three EDSs 10*h* having the high degree of deterioration and the three EDSs 10*h* having the low degree of deterioration.

The eVTOL 100*h* according to the 15th embodiment described above achieves the same effects as the eVTOL 100*h* according to the 14th embodiment. In addition, a rotation request is issued to interchange a group of EDSs 10*h* having a high degree of deterioration among the multiple EDSs 10*h* and a group of EDSs 10*h* having a low degree of deterioration among the multiple EDSs 10*h*, enabling a delay in maintenance on each of the EDSs 10*h* having the high degree of deterioration. This can more effectively prevent variations among maintenance timings for the multiple EDSs 10*h* and regulate the frequency of maintenance on the eVTOL 100*h* as a whole.

P. 16th Embodiment

An eVTOL 100*e* according to a 16th embodiment is different from the eVTOL 100*e* according to the 13th embodiment in that the rotation request processing shown in FIG. 24 further including using path history information about a flight path history to detect the degree of deterioration in each EDS 10*e*. The other components including the device configuration are the same as in the eVTOL 100*e* according to the 13th embodiment, and thus a detailed description thereof will be omitted by using the same reference numerals to denote the same components.

The storage device 62 stores path history information about the flight path history of the eVTOL 100*e* as the drive history information. The path history information may be stored as the history of the flight path information set by the passenger of the eVTOL 100*e*, stored after being received from the external device 500, or stored as the history of the flight path information obtained through a camera or a radar (not shown) on the eVTOL 100*e*. Each flight path leads to a different operational load on each EDS 10*e*, or for example, varies the rotation frequency and the operating time of the drive motor 12. The same flight path leads to substantially the same operational load on each EDS 10*e*.

In steps S130*e* and S130*ea* shown in FIG. 24, the control unit 52 uses the path history information to detect drive load information indicating the drive load history of each EDS 10*e*, and uses the detected drive load information to detect the degree of deterioration in each EDS 10*e*. The control unit 52 determines the EDS 10*e* having the highest degree of deterioration among the multiple EDSs 10*e* (step S130*e*), and determines the EDS 10*e* having the lowest degree of deterioration among the multiple EDSs 10*e* (step S130*ea*).

The control unit 52 issues a rotation request to interchange the EDS 10e determined in step S130e and the EDS 10e determined in step S130ea (step S190). Then, the rotation request processing is ended.

The eVTOL 100e according to the 16th embodiment described above achieves the same effects as the eVTOL 100e according to the 13th embodiment. In addition, the path history information about the flight path history is further used to detect the degree of deterioration in each EDS 10e, thus enabling the degree of deterioration in the EDS 10e to be detected with high accuracy in accordance with the conditions of operation of the eVTOL 100e. The degrees of deterioration in the EDSs 10e can be detected with high accuracy even for regular flights along a flight path that leads to a greater operational load on a particular EDS 10e, such as a case in which the EDSs 10e installed on the left wing 27 have a greater operational load than the EDSs 10e installed on the right wing 26. This enables a rotation request to be issued more effectively in accordance with the degree of deterioration in the EDS 10e.

Q. 17th Embodiment

Figure 29:
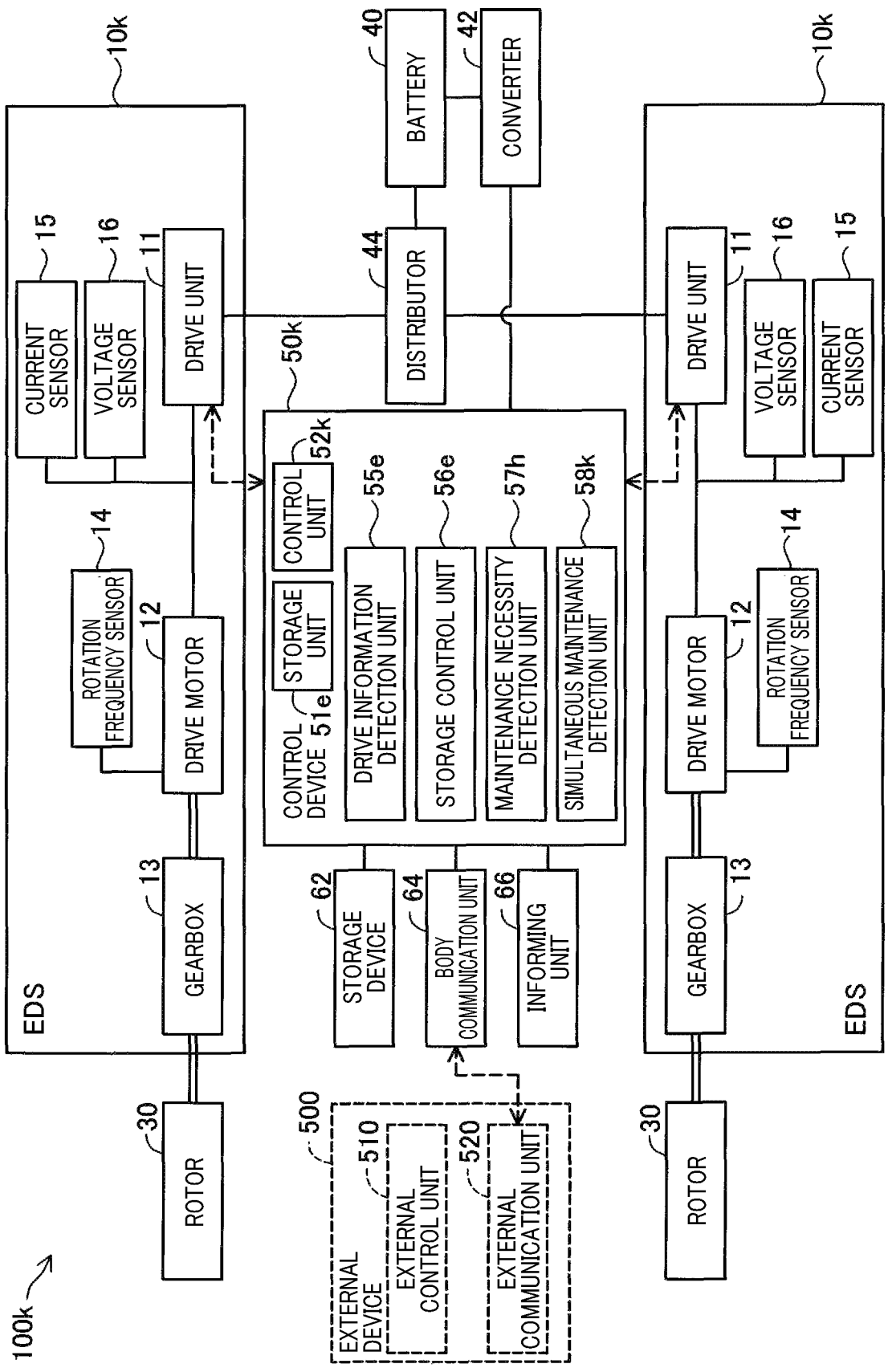
FIG. 29 is a schematic block diagram illustrating the configuration of an electric vertical takeoff and landing aircraft according to a 17th embodiment.

An eVTOL 100k according to a 17th embodiment shown in FIG. 29 is different from the eVTOL 100h according to the 14th embodiment in that the control device 50h is replaced with a control device 50k, and in place of the rotation request processing or in addition to the rotation request processing, processing is performed to issue a maintenance request to any EDS 10k to be subjected to maintenance simultaneously with maintenance on any EDS 10k of the multiple EDSs 10k (hereinafter referred to as the simultaneous maintenance request processing). The other components are the same as in the eVTOL 100h according to the 14th embodiment, and thus a detailed description thereof will be omitted by using the same reference numerals to denote the same components.

The control device 50k further includes a simultaneous maintenance detection unit 58k. The simultaneous maintenance detection unit 58k uses the drive history information stored in the storage device 62 to detect the presence or absence of an EDS 10k to be subjected to maintenance simultaneously with maintenance on any EDS 10k of the multiple EDSs 10k.

Figure 30:
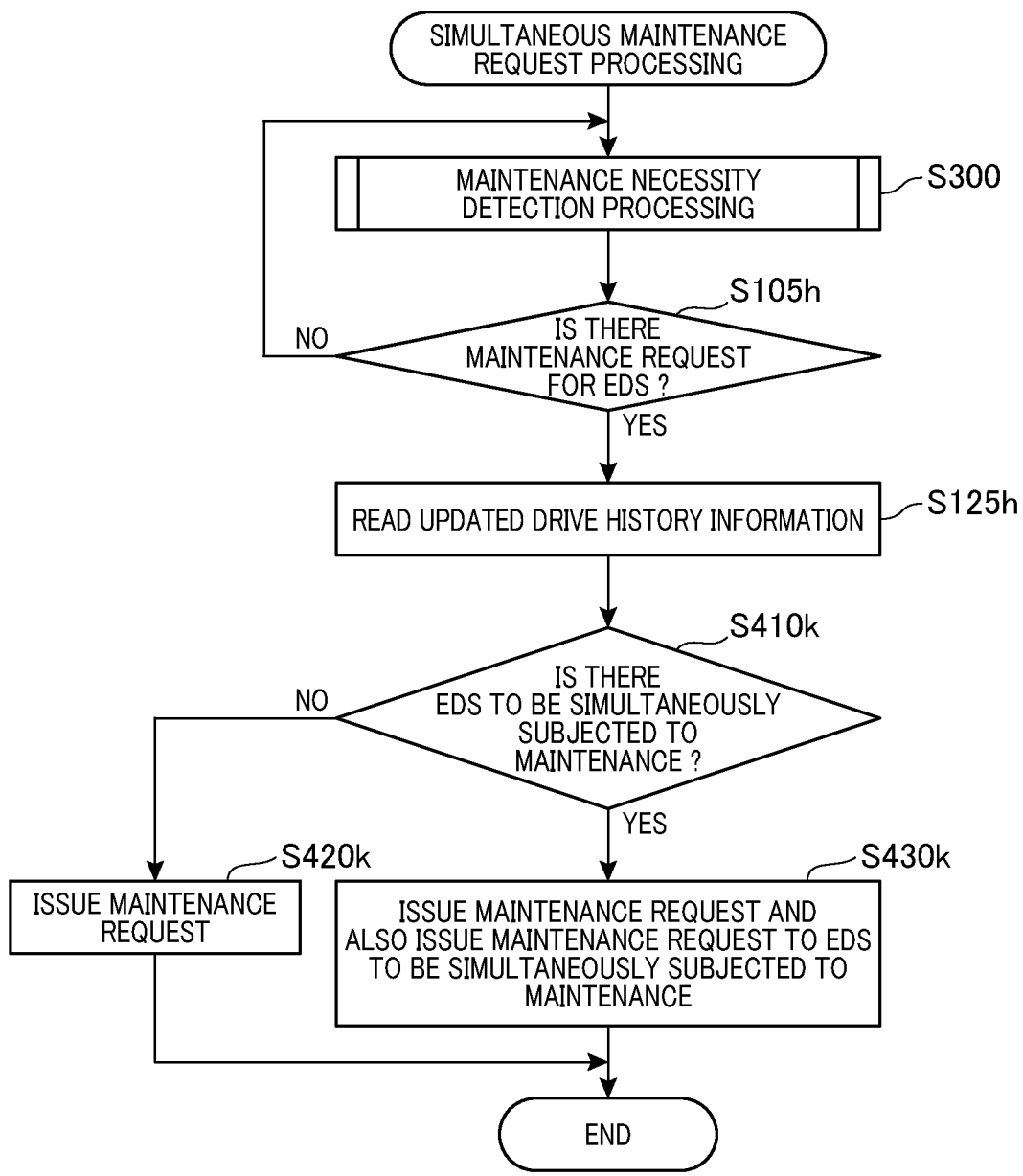
FIG. 30 is a flowchart showing the procedure of simultaneous maintenance request processing.

As shown in FIG. 30, the simultaneous maintenance request processing according to the present embodiment includes the maintenance necessity detection processing shown in FIG. 27. The simultaneous maintenance request processing shown in FIG. 30 is executed repeatedly by the control device 50k when the start switch of the eVTOL 100k is turned on.

A control unit 52k uses the results of the maintenance necessity detection processing to determine whether there is a maintenance request for at least one of the multiple EDSs 10k (step S105h). Step S105h is performed in the same manner as step S105h in the rotation request processing in the 14th embodiment. If the absence of a maintenance request is determined for any EDS 10k (step S105h: NO), the processing returns to step S300.

If the presence of a maintenance request is determined for an EDS 10k (step S105h: YES), or in other words, there is an EDS 10k to be subjected to maintenance, the control unit 52k reads the drive history information updated and stored in step S120e of the maintenance necessity detection processing (step S125h). Step S125h is performed in the same manner as step S125h in the rotation request processing in the 14th embodiment.

The simultaneous maintenance detection unit 58k uses the drive history information read in step S125h to detect whether the EDSs 10k except the EDS 10k that needs maintenance include an EDS 10k to be subjected to maintenance simultaneously with the EDS 10k that needs maintenance (step S410k). Step S410k may be performed, like steps S310 to S350 of the maintenance necessity detection processing shown in FIG. 27, using a threshold with component replacement and a periodic inspection separated from each other as maintenance.

Figure 31:
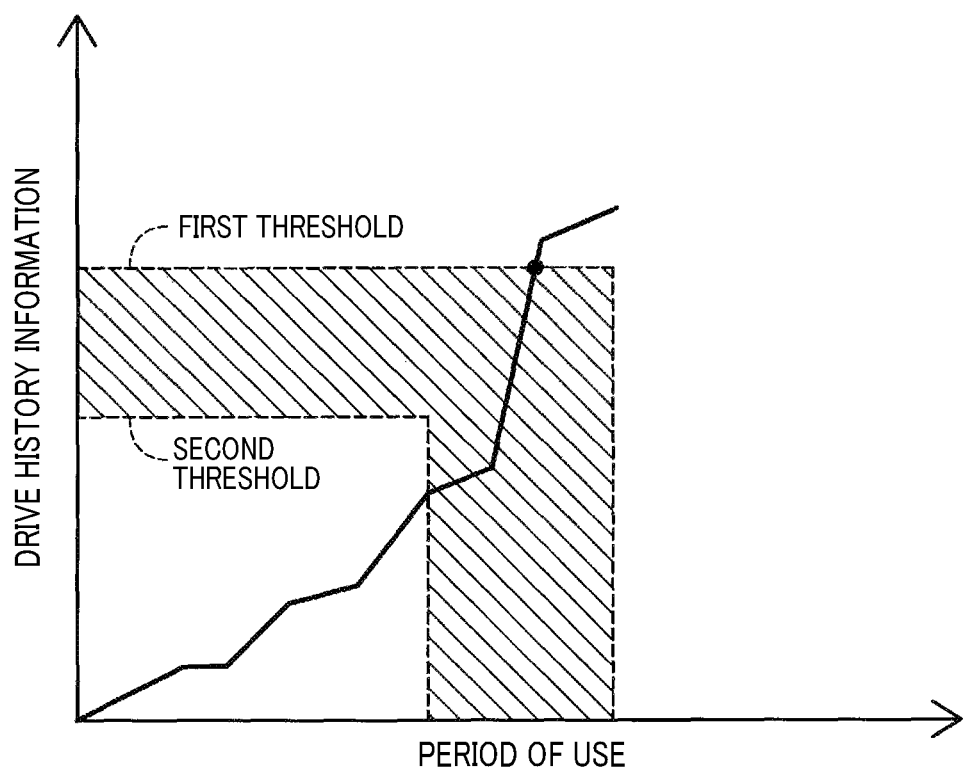
FIG. 31 is a diagram illustrating a method for determining an electric drive system to be simultaneously subjected to maintenance.

A method for determining an EDS 10k to be subjected to maintenance simultaneously with the EDS 10k that needs maintenance will now be described with reference to FIG. 31. Of the maintenance on an EDS 10k including component replacement and a periodic inspection, FIG. 31 shows an example of component replacement. In FIG. 31, the vertical axis represents drive history information, and the horizontal axis represents the period of use of the EDS 10k. The drive history information may be, for example, a cumulative load value such as the cumulative operating time of the drive motor 12, the cumulative number of rotations of the drive motor 12, or the cumulative driving current of the drive motor 12. The cumulative load value may be a value obtained by combining any types of drive information or a converted value obtained by changing the drive information in line with the deterioration rate of the EDS 10k. The period of use of the EDS 10k refers to the amount of time elapsed from the installation of the EDS 10k on the body 20 to the current time, irrespective of whether the EDS 10k is driven. The drive unit 11 of the EDS 10k may include a timer that automatically starts counting when connected to the battery 40, and the period of use may be determined based on, for example, information sent from the timer to the control device 50k.

A first threshold represents a component replacement threshold used in the maintenance necessity detection processing. In the maintenance necessity detection processing, an EDS 10k having a drive history information value equal to or greater than the first threshold is determined to need maintenance. A second threshold represents a component replacement threshold used in the simultaneous maintenance request processing. In the simultaneous maintenance request processing, an EDS 10k having a drive history information value equal to or greater than the second threshold is determined to be subjected to maintenance simultaneously with the maintenance on the EDS determined to need maintenance in the maintenance necessity detection processing. The second threshold is a value smaller than the first threshold, and preset and stored in the storage device 62. The second threshold may be, for example, set at a value equal to about 80 percent of the first threshold.

For an EDS 10k having a drive history information value equal to or greater than the second threshold and smaller than the first threshold. the drive history information value is estimated to become equal to or greater than the first threshold in the near future. Thus, by advancing the schedule of maintenance on the EDS 10k having the value equal to or greater than the second threshold, the maintenance is timed to coincide with maintenance on the EDS 10k that needs the maintenance. This can regulate the frequency of maintenance on the eVTOL 100k as a whole. In step S410k, the processing identifies all EDSs 10k to be subjected to maintenance simultaneously with the EDS 10k that needs maintenance.

As shown in FIG. 30, if no EDS 10k is determined to be subjected to maintenance simultaneously with the EDS 10k that needs maintenance (step S410k: NO), the control unit

52k issues simply the maintenance request for the EDS 10k needing maintenance, for which the necessity of maintenance is detected in the maintenance necessity detection processing (step S420K). Then, the simultaneous maintenance request processing is ended.

If an EDS 10k is determined to be subjected to maintenance simultaneously with the EDS 10k that needs maintenance (step S410k: YES), or in other words, there is an EDS 10k having a drive history information value equal to or greater than the second threshold, the control unit 52k issues the maintenance request for the EDS 10k that needs maintenance and also a maintenance request for the EDS 10k to be simultaneously subjected to maintenance (step S430k). Hereinafter, the request is also referred to as a simultaneous maintenance request. In response to the execution of step S430k, the simultaneous maintenance request processing is ended. The simultaneous maintenance request may be given variously. For example, when the display device in the passenger compartment indicates the installation positions of multiple EDSs 10k, the EDS 10k that needs maintenance may be indicated by a red lamp, and the EDS 10k to be simultaneously subjected to maintenance may be indicated by an orange lamp. The issue of the simultaneous maintenance request forms the expectation that the passenger or a maintenance worker for the eVTOL 100k will perform maintenance on all EDSs 10k to be subjected to maintenance at the same time as the EDS 10k that needs maintenance.

In the eVTOL 100k according to the 17th embodiment described above, the control unit 52k performs the simultaneous maintenance request processing and issues a simultaneous maintenance request for the EDS 10k to be subjected to maintenance simultaneously with maintenance on the EDS 10k that needs the maintenance. Thus, for the EDS 10k estimated to need maintenance in the near future, the schedule of the maintenance can be advanced and timed to coincide with maintenance on the EDS 10k that needs the maintenance. In other words, along with maintenance on the EDS 10k that needs the maintenance, other EDSs 10k can be subjected to maintenance. Thus, in the eVTOL 100k according to the 17th embodiment, the stored drive history information is used to perform the simultaneous maintenance request processing as processing as to maintenance on the multiple EDSs 10k, preventing variations among maintenance timings for the different EDSs 10k. This can regulate the frequency of maintenance on the eVTOL 100k as a whole.

Furthermore, after a maintenance request for a particular EDS 10k is detected in the maintenance necessity detection processing, it is determined whether there is an EDS 10k to be simultaneously subjected to maintenance. Thus, the drive history information updated in the maintenance necessity detection processing can be used to detect the presence or absence of an EDS 10k to be simultaneously subjected to maintenance. This enables the accuracy of detection to be maintained and the frequency of maintenance on the eVTOL 100k as a whole to be regulated more effectively. Moreover, an EDS 10k with its cumulative load value as the drive history information being equal to or greater than the predetermined threshold is determined to be simultaneously subjected to maintenance, thus allowing accurate detection of the presence or absence of an EDS 10k to be simultaneously subjected to maintenance.

R. Modified Embodiments

R-1. Modified Embodiment 1

The maintenance necessity detection processing performed in the above-described embodiments is given by way of example only and may be altered variously. In one example, the necessity or lack of necessity of maintenance on each EDS 10, 10a to 10d may be detected without separating component replacement and a periodic inspection from each other. More specifically, in one example, drive history information correlated with the degrees of deterioration in multiple components included in the EDS 10, 10a to 10d may be used to detect the necessity or lack of necessity of maintenance. In another example, drive history information correlated with the degree of deterioration in the component having the shortest maintenance interval among the components included in each EDS 10, 10a to 10d may be used to detect the necessity or lack of necessity of maintenance. In yet another example, in step S130, the component replacement condition may be replaced with a condition under which the entire EDS 10, 10a to 10d is replaced. In some cases, drive history information based on multiple types of drive information may be used to detect the necessity or lack of necessity of maintenance, or the drive history information may be combined with information about the period of use of the EDS 10 to detect the necessity or lack of necessity of maintenance. For example, thresholds such as a component replacement threshold and a periodic inspection threshold may be set based on different indicators of drive history information. For example, as thresholds such as a component replacement threshold and a periodic inspection threshold, a threshold for the motor information and a threshold for the drive unit information may be set based on the same indicator or different indicators. More specifically, for example, the threshold for the motor information may be set based on the cumulative number of rotations as the cumulative load value of the drive motor 12, and the threshold for the drive unit information may be set based on the cumulative output power as the cumulative load value of the drive unit 11. Both the threshold for the motor information and the threshold for the drive unit information may be set based on the cumulative operating time as the cumulative load value. In some aspects, for example, in place of the component replacement threshold or the periodic inspection threshold or in addition to the component replacement threshold or the periodic inspection threshold, the component replacement condition or the periodic inspection condition may be set based on a predetermined type of drive history information. In such an aspect, a variation in drive information within a predetermined time period may be set as a component replacement condition or a periodic inspection condition. For example, the condition may be that an increase in the cumulative driving current of the drive motor 12 is equal to or greater than a predetermined value within the predetermined time period. Such a modification also achieves the same effects as each of the embodiments described above.

R-2. Modified Embodiment 2

In the second embodiment, the maintenance necessity detection processing is performed by the control device 50 and the external device 500 in cooperation with each other, the external storage device 530 stores the drive history information on each EDS 10, and the external control unit 510 determines whether maintenance is necessary on each EDS 10. However, the present disclosure is not limited thereto. For example, as in the first and third to ninth embodiments, the drive history information on each EDS 10 may be stored in the storage device 62, 17a, 17b, 18b included in the eVTOL 100, 100a to 100d. For example, the external control unit 510 may not determine the necessity or lack of necessity of maintenance on each EDS 10, but the maintenance necessity detection unit 57 may determine the necessity or lack of necessity of maintenance on each EDS 10 to detect the necessity or lack of necessity of the maintenance. In this manner, at least a part of the maintenance necessity detection processing may be performed by the external device 500. In other words, typically, the eVTOL 100, 100a to 100d may include the storage control unit 56 that stores the drive history information about the history of the drive information on the EDS 10, 10a to 10d, and may include the maintenance necessity detection unit 57 that uses the stored drive history information to detect the necessity or lack of necessity of maintenance. Such a modification also achieves the same effects as the second embodiment.

R-3. Modified Embodiment 3

The maintenance necessity detection processing performed in the fourth embodiment is given by way of example only and may be altered variously. For example, upon completion of the diagnosis necessity detection processing (step S500), the maintenance necessity detection processing may be complete. In other words, the maintenance necessity detection unit 57 may detect simply the necessity or lack of necessity of diagnosis as the necessity or lack of necessity of maintenance on each EDS 10 instead of the necessity or lack of necessity of a component inspection. In other words, typically, the maintenance necessity detection unit 57 may detect the necessity or lack of necessity of maintenance on each of the multiple EDSs 10 based on the detected drive information. In this modification, the storage control unit 56 and the storage device 62 may be omitted. In one example, the diagnosis necessity detection processing may be performed by the control device 50 and the external device 500 in cooperation with each other. More specifically, in some aspects, drive information may be sent to the external device 500 through the body communication unit 64 and the external communication unit 520, and the external control unit 510 may determine whether the value of the drive information is within the normal range. In such an aspect, the necessity or lack of necessity of diagnosis can be detected with reference to the data stored in the external storage device 530. More specifically, for example, the necessity or lack of necessity of diagnosis can be detected with reference to data indicating that the profile of predetermined drive information may cause an accident. In this manner, the necessity or lack of necessity of diagnosis can be detected with reference to the data accumulated in the external storage device 530 larger in capacity than the storage device 62 in the eVTOL 100. This enables advanced determination and allows the necessity or lack of necessity of diagnosis to be detected with higher accuracy.

R-4. Modified Embodiment 4

The control device 50 according to each of the above-described embodiments is installed in the eVTOL 100, 100a to 100d. However, in some aspects, the control device 50 may be installed and used in the external device 500. In such an aspect, control signals may be communicated between the external communication unit 520 and the body communication unit 64 or the communication unit 19c connected to a control device installed in the eVTOL 100, 100a to 100d (a control device other than the control device 50). In other words, typically, the control device 50 may further include the external communication unit 520 capable of communicating with the body communication unit 64 included in the eVTOL 100, 100a to 100d, and may be outside the eVTOL 100, 100a to 100d. This configuration enables the external device 500 to control the maintenance necessity detection processing for multiple eVTOLs 100, 100a to 100d.

R-5. Modified Embodiment 5

The configuration of the eVTOL 100, 100a to 100d according to each of the above-described embodiments is given by way of example only and may be altered variously. In one example, the drive information detection unit 55, the storage control unit 56, and the maintenance necessity detection unit 57 in each of the above-described embodiments are implemented by the CPU included in the control device 50. However, at least one of the drive information detection unit 55, the storage control unit 56, and the maintenance necessity detection unit 57 may be installed in each EDS 10, 10a to 10d. In another example, the eVTOL 100, 100a to 100d according to the first and third to ninth embodiments may not include the body communication unit 64 or the communication unit 19c. In yet another example, the number of rotors 30 or the number of EDSs 10 may not be nine, but may be any number more than one, and they may be installed at any positions. In still another example, the lifting rotors 31 and the cruising rotors 32 may be replaced with tiltrotors. In yet still another example, the eVTOL 100, 100a to 100d may not be a manned aircraft but may be an unmanned aircraft.

R-6. Modified Embodiment 6

In the tenth embodiment, the bearing maintenance necessity detection processing is performed on the bearing. However, the present disclosure is not limited thereto. The necessity or lack of necessity of maintenance may be detected for any type of the expendables with a degree of wear varying with the operating time of the drive motor 12 and the magnitude of output torque. For example, the necessity or lack of necessity of maintenance may be detected for a fastening bolt for the EDS 10. This achieves the same effects as the tenth embodiment described above.

R-7. Modified Embodiment 7

The cumulative load leveling processing according to the 11th and 12th embodiments is given by way of example only and may be altered variously. In one example, when multiple EDSs 10e have at least a predetermined gap between their cumulative load values, the control unit 52e may level the cumulative load values. In other words, when the degrees of deterioration in multiple EDSs 10e vary greatly, the cumulative load values may be leveled. More specifically, for example, it is determined whether the variation among the degrees of deterioration is equal to or greater than a predetermined threshold. If the variation is determined to be equal to or greater than the predetermined threshold, the cumulative load values may be leveled. In another example, when the degree of deterioration in the EDS 10e having the highest degree of deterioration exceeds a predetermined threshold, the cumulative load values may be leveled. In yet another example, the multiple EDSs 10e may be classified into multiple groups each composed of cooperating EDSs 10e. The cumulative load values in each group may be leveled by weighting the requested output in accordance with each cumulative load value in the group. In still another example, as in the rotation request processing according to the 16th embodiment, path history information about a flight path history may be further used to detect the degree of deterioration in each EDS 10*e*. In yet still another example, in place of adjusting the requested output for the EDS 10*e* having the highest degree of deterioration or the EDS 10*e* having the lowest degree of deterioration, the requested output for an EDS 10*e* having any degree of deterioration may be adjusted. This adjustment may cause the requested output for an EDS 10*e* having a high degree of deterioration to be smaller than the requested output for an EDS 10*e* having a low degree of deterioration. Such a modification also achieves the same effects as the 11th and 12th embodiments described above.

R-8. Modified Embodiment 8

The rotation request processing according to the 13th to 16th embodiments is given by way of example only and may be altered variously. In one example, when multiple EDSs 10*e*, 10*h* have at least a predetermined gap between their cumulative load values, the control unit 52*e*, 52H may issue a rotation request. In other words, when the degrees of deterioration in multiple EDSs 10*e*, 10*h* vary greatly, a rotation request may be issued. More specifically, for example, it is determined whether the variation among the degrees of deterioration is equal to or greater than a predetermined threshold. If the variation is determined to be equal to or greater than the predetermined threshold, a rotation request may be issued. In another example, when the degree of deterioration in the EDS 10*e*, 10*h* having the highest degree of deterioration exceeds a predetermined threshold, a rotation request may be issued. In such a modification, too frequent issuance of a rotation request can be prevented, forming the expectation that rotation is performed more efficiently. In yet another example, in place of interchanging the EDS 10*e*, 10*h* having the highest degree of deterioration and the EDS 10*e*, 10*h* having the lowest degree of deterioration, for two or more EDSs 10*e*, 10*h* having any degrees of deterioration, a rotation request may be issued to interchange an EDS 10*e*, 10*h* having a high degree of deterioration and an EDS 10*e*, 10*h* having a low degree of deterioration. Such a modification also achieves the same effects as the 13th to 16th embodiments.

R-9. Modified Embodiment 9

The maintenance necessity detection processing performed in the 14th to 17th embodiments is given by way of example only and may be altered variously. In one example, the necessity or lack of necessity of maintenance may be detected without separating component replacement and a periodic inspection. In another example, in step S310, the component replacement condition may be replaced with a condition under which the entire EDS 10*h* is replaced. In some cases, drive history information based on multiple types of drive information may be used to detect the necessity or lack of necessity of maintenance, or the drive history information may be combined with information about the period of use of the EDS 10*h* to detect the necessity or lack of necessity of maintenance. In some aspects, for example, in place of the component replacement threshold or the periodic inspection threshold as the first threshold or in addition to the first threshold, the component replacement condition or the periodic inspection condition may be set based on predetermined drive history information. In such an aspect, a variation in drive information within a predetermined time period may be set as a component replacement condition or a periodic inspection condition. For example, the condition may be that an increase in the cumulative driving current of the drive motor 12 is equal to or greater than a predetermined value within the predetermined time period. Such a modification also achieves the same effects as the 14th to 17th embodiments described above.

R-10. Modified Embodiment 10

The simultaneous maintenance request processing according to the 17th embodiment includes the maintenance necessity detection processing. However, in some aspects, the maintenance necessity detection processing may be omitted. In such an aspect, for example, when the passenger or a maintenance worker for the eVTOL 100*k* finds an abnormality in an EDS 10*k* and performs maintenance on the EDS 10*k* in which the abnormality is found, it may be determined whether there is another EDS 10*k* to be subjected to maintenance simultaneously with the EDS 10*k*. In some aspects, the simultaneous maintenance request processing according to the 17th embodiment may have, in place of the second threshold or in addition to the second threshold, a component replacement condition or a periodic inspection condition set for simultaneous maintenance based on predetermined drive history information. Such a modification also achieves the same effects as the 17th embodiment.

R-11. Modified Embodiment 11

The control device 50*e*, 50*h*, 50*k* according to each of the above-described embodiments is installed in the eVTOL 100*e*, 100*h*, 100*k*. However, in some aspects, the control device 50*e*, 50*h*, 50*k* may be installed and used in the external device 500. In such an aspect, control signals may be communicated between the external communication unit 520 and the body communication unit 64 connected to a control device installed in the eVTOL 100*e*, 100*h*, 100*k* (a control device other than the control device 50*e*, 50*h*, 50*k*). In other words, typically, the control device 50*e*, 50*h*, 50*k* may further include the external communication unit 520 capable of communicating with the body communication unit 64 included in the eVTOL 100*e*, 100*h*, 100*k*, and may be outside the eVTOL 100*e*, 100*h*, 100*k*. This configuration enables the external device 500 to control the cumulative load leveling processing, the maintenance necessity detection processing, the rotation processing, and the simultaneous maintenance request processing for multiple eVTOLs 100*e*, 100*h*, 100*k*.

R-12. Modified Embodiment 12

The configuration of the eVTOL 100*e*, 100*h*, 100*k* according to each of the above-described embodiments is given by way of example only and may be altered variously. In some aspects, for example, the storage device 62 may be removed, and the drive history information may be stored in memory (not shown) included in the external device 500. In such an aspect, the storage control unit 56*e* may store the drive history information into the memory in the external device 500 through the body communication unit 64 and the external communication unit 520. In another example, each EDS 10*e* may include a storage device capable of storing the drive history information or include a communication device capable of communicating with the external communication unit 520. The storage device installed in each EDS 10*e* stores its drive history information, allowing the drive history information on the multiple EDSs 10*e* to be managed easily even after rotation is performed between EDSs 10*e*. More specifically, this can eliminate the need for sending the drive history information and the identification information on each EDS 10*e* to the control device 50*e*, and remove the need for storing the identification information on each EDS 10*e* into the storage device 62. In one example, although each EDS 10*e* includes the corresponding drive unit 11, a common drive unit 11 may drive different drive motors 12. In another example, the number of rotors 30 or the number of EDSs 10*e* may not be nine, but may be any number more than one, and they may be installed at any positions. In yet another example, the lifting rotors 31 and the cruising rotors 32 may be replaced with tiltrotors. In still another example, the eVTOL 100*e*, 100*h*, 100*k* may not be a manned aircraft but may be an unmanned aircraft.

The present disclosure is not limited to the above-described embodiments but may be implemented in various manners without departing from the spirit and scope thereof. For example, the technical features in each embodiment corresponding to the technical features in the aspects described in the Summary section may be replaced or combined as appropriate so as to solve some or all of the above-described problems or achieve some or all of the above-described effects. Unless described herein as being necessary, the technical features may be deleted as appropriate.

The control device, the external device, and their techniques described in the present disclosure may be implemented by a special purpose computer including memory and a processor programmed to execute at least one function embodied by a computer program. Alternatively, the control unit and its technique described in the present disclosure may be implemented by a special purpose computer including a processor formed of at least one dedicated hardware logic circuit. Alternatively, the control device, the external device, and their techniques described in the present disclosure may be implemented by at least one special purpose computer including a combination of memory and a processor programmed to execute at least one function and a processor formed of at least one hardware logic circuit. The computer programs may be stored in a non-transitory, tangible computer readable storage medium as instructions to be executed by a computer.

What is claimed is:

1. An electric vertical takeoff and landing aircraft with a plurality of electric drive systems each including a drive motor for turning a rotor and a drive unit for driving the drive motor, the electric vertical takeoff and landing aircraft comprising:
   a drive information detection unit configured to detect, for each of the plurality of electric drive systems, drive information including at least one of motor information serving as an indicator of a deterioration state of the drive motor and drive unit information serving as an indicator of a deterioration state of the drive unit;
   a maintenance necessity detection unit configured to detect necessity or lack of necessity of maintenance on each of the plurality of electric drive systems based on the detected drive information and drive history information about a history of the drive information, wherein the detection includes at least a component replacement request based on the drive history information and a diagnosis request based on the drive information, the drive information including a driving current value of the drive motor,
   wherein the drive history information is cumulative load information that is a history of the driving state of the electric drive system, and is updated by the drive information during flight; and
   a storage control unit configured to store the drive history information about the history of the drive information, wherein the drive history information includes at least the driving current value detected by a current sensor,
   wherein each of the plurality of electric drive systems includes:
      a drive motor;
      a drive unit configured as an electronic device including an inverter circuit and a controller that controls the inverter circuit; and
      the current sensor that measures the driving current supplied to the drive motor from the inverter circuit, and
   wherein each of the electric drive systems is connected to a different rotor.

2. The electric vertical takeoff and landing aircraft according to claim 1, wherein,
   the maintenance necessity detection unit detects the necessity or lack of necessity of maintenance determined by using the stored drive history information.

3. The electric vertical takeoff and landing aircraft according to claim 1, further comprising:
   a storage device configured to store the drive history information.

4. The electric vertical takeoff and landing aircraft according to claim 1, wherein
   the drive history information is a combination of at least two types of drive information.

5. The electric vertical takeoff and landing aircraft according to claim 1, further comprising:
   a body communication unit capable of communicating with an external communication unit included in an external device different from the electric vertical takeoff and landing aircraft, wherein
   the body communication unit sends the detected drive information to the external communication unit and receives the necessity or lack of necessity of maintenance determined in the external device by using the sent drive information, and
   the maintenance necessity detection unit detects the received necessity or lack of necessity of maintenance.

6. The electric vertical takeoff and landing aircraft according to claim 1, wherein
   the necessity or lack of necessity of maintenance includes necessity or lack of necessity of diagnosis.

7. A control device for an electric vertical takeoff and landing aircraft with a plurality of electric drive systems each including a drive motor for turning a rotor, a drive unit configured as an electronic device including an inverter circuit and a controller that controls the inverter circuit, and a current sensor that measures the driving current supplied to the drive motor from the inverter circuit, wherein each of the electric drive systems is connected to a different rotor, the control device comprising:
   a drive information detection unit configured to detect, for each of the plurality of electric drive systems, drive information including at least one of motor information serving as an indicator of a deterioration state of the drive motor and drive unit information serving as an indicator of a deterioration state of the drive unit;
   a storage control unit configured to store drive history information about a history of the drive information, wherein the drive history information includes at least a driving current value detected by the current sensor; and a maintenance necessity detection unit configured to detect necessity or lack of necessity of maintenance on each of the plurality of electric drive systems based on the detected drive information and the drive history information about the history of the drive information, wherein the detection includes at least a component replacement request based on the drive history information and a diagnosis request based on the drive information, the drive information including the driving current value of the drive motor, wherein the drive history information is cumulative load information that is a history of the driving state of the electric drive system, and is updated by the drive information during flight.

8. A control device for an electric vertical takeoff and landing aircraft with a plurality of electric drive systems each including a drive motor for turning a rotor, a drive unit configured as an electronic device including an inverter circuit and a controller that controls the inverter circuit, and a current sensor that measures the driving current supplied to the drive motor from the inverter circuit, wherein each of the electric drive systems is connected to a different rotor, the control device comprising:

a drive information detection unit configured to detect, for each of the plurality of electric drive systems, drive information including at least one of motor information serving as an indicator of a deterioration state of the drive motor and drive unit information serving as an indicator of a deterioration state of the drive unit;

a storage control unit configured to store drive history information about a history of the drive information, wherein the drive history information includes at least a driving current value detected by the current sensor;

a maintenance necessity detection unit configured to detect necessity or lack of necessity of maintenance on each of the plurality of electric drive systems by using the stored drive history information, wherein the detection includes at least a component replacement request based on the drive history information and a diagnosis request based on the drive information, the drive information including the driving current value of the drive motor, wherein the drive history information is cumulative load information that is a history of the driving state of the electric drive system, and is updated by the drive information during flight; and a control unit configured to use the stored drive history information to perform processing as to maintenance on the plurality of electric drive systems.

9. The control device for an electric vertical takeoff and landing aircraft according to claim 8, wherein
the drive history information includes a cumulative load value, and
the maintenance necessity detection unit detects necessity of maintenance for an electric drive system having a cumulative load value equal to or greater than a predetermined first threshold.

10. The control device for an electric vertical takeoff and landing aircraft according to claim 8, wherein
the control unit performs, as the processing, cumulative load leveling processing for causing requested output for an electric drive system having a high degree of deterioration to be smaller than requested output for an electric drive system having a small degree of deterioration.

11. The control device for an electric vertical takeoff and landing aircraft according to claim 8, wherein
the control unit performs, as the processing, rotation request processing for issuing a request to interchange an electric drive system having a high degree of deterioration and an electric drive system having a low degree of deterioration.

12. The control device for an electric vertical takeoff and landing aircraft according to claim 11, wherein
in the rotation request processing, the control unit issues a request to interchange a group of electric drive systems having a high degree of deterioration among the plurality of electric drive systems and a group of electric drive systems having a small degree of deterioration among the plurality of electric drive systems.

13. The control device for an electric vertical takeoff and landing aircraft according to claim 10, wherein
the drive history information includes path history information about a flight path history, and
the control unit is configured to:
detect drive load information about a drive load history of each of the plurality of electric drive systems by using the path history information; and
detect the degree of deterioration in each of the plurality of electric drive systems by using the detected drive load information.

14. The control device for an electric vertical takeoff and landing aircraft according to claim 8, further comprising:
a simultaneous maintenance detection unit configured to, by using the stored drive history information, detect presence or absence of another electric drive system to be subjected to maintenance simultaneously with maintenance on any electric drive system of the plurality of electric drive systems, wherein
in response to detection of the presence of another electric drive system to be simultaneously subjected to maintenance, the control unit performs, as the processing, simultaneous maintenance request processing for issuing a maintenance request to the other electric drive system.

15. The control device for an electric vertical takeoff and landing aircraft according to claim 9, further comprising:
a simultaneous maintenance detection unit configured to, by using the stored drive history information, detect presence or absence of another electric drive system to be subjected to maintenance simultaneously with maintenance on any electric drive system of the plurality of electric drive systems, wherein
in response to detection of the presence of another electric drive system to be simultaneously subjected to maintenance, the control unit performs, as the processing, simultaneous maintenance request processing for issuing a maintenance request to the other electric drive system.

16. The control device for an electric vertical takeoff and landing aircraft according to claim 15, wherein
in response to the maintenance necessity detection unit detecting the necessity of maintenance on the electric drive system, the simultaneous maintenance detection unit determines that another electric drive system having a cumulative load value equal to or greater than a predetermined second threshold smaller than the first threshold is to be simultaneously subjected to maintenance.

17. The control device for an electric vertical takeoff and landing aircraft according to claim 8, further comprising:
- an external communication unit capable of communicating with a body communication unit included in the electric vertical takeoff and landing aircraft, the external communication unit installed in an external device located outside the electric vertical takeoff and landing aircraft.

18. An electric vertical takeoff and landing aircraft comprising:
- the control device for an electric vertical takeoff and landing aircraft according to claim 8.

19. The electric vertical takeoff and landing aircraft according to claim 1, wherein the cumulative load value as the drive history information is equal to or greater than a predetermined component replacement threshold preset and stored for each of the electronic drive systems, and the maintenance necessity detection unit determines whether the drive history information updated and stored meets the component replacement condition for each electric drive system.

* * * * *